United States Patent
Tadokoro et al.

(10) Patent No.: US 6,463,352 B1
(45) Date of Patent: Oct. 8, 2002

(54) SYSTEM FOR MANAGEMENT OF CUTTING MACHINES

(75) Inventors: Masahiko Tadokoro, La Mirada; Apichat Treerojporn, Newport Beach, both of CA (US)

(73) Assignee: Amada Cutting Technologies, Inc., La Mirada, CA (US)

( * ) Notice: Subject to any disclaimer, the term of this patent is extended or adjusted under 35 U.S.C. 154(b) by 0 days.

(21) Appl. No.: 09/382,542

(22) Filed: Aug. 25, 1999

Related U.S. Application Data

(60) Provisional application No. 60/116,947, filed on Jan. 21, 1999.

(51) Int. Cl.[7] .............................................. G06F 19/00

(52) U.S. Cl. .................. 700/169; 700/96; 700/159; 700/180; 702/33; 709/223

(58) Field of Search ............................ 700/19, 50, 108, 700/109, 169, 174, 175, 179, 96, 9, 160, 167, 180, 159, 164.99, 83; 702/33, 34; 709/223, 224

(56) References Cited

U.S. PATENT DOCUMENTS

| | | | |
|---|---|---|---|
| 4,866,630 A | | 9/1989 | Beaman et al. ............. 700/160 |
| 4,901,218 A | * | 2/1990 | Cornwell ..................... 340/3.1 |
| 5,119,310 A | | 6/1992 | Moriya ....................... 700/192 |
| 5,291,416 A | * | 3/1994 | Hutchins .................... 700/174 |
| 5,307,346 A | * | 4/1994 | Fieldhouse ................. 370/254 |
| 5,418,729 A | | 5/1995 | Holmes et al. ............. 700/167 |
| 5,757,648 A | | 5/1998 | Nakamura .................. 700/169 |
| 5,884,682 A | * | 3/1999 | Kennedy et al. ......... 144/242.1 |
| 5,909,368 A | * | 6/1999 | Nixon et al. ................ 700/131 |
| 5,914,880 A | * | 6/1999 | Yasojima et al. .......... 700/108 |
| 6,038,486 A | * | 3/2000 | Saitoh et al. ................... 700/9 |
| 6,301,527 B1 | * | 10/2001 | Butland et al. ............. 700/286 |

OTHER PUBLICATIONS

A printout (labeled W–1) of a Web site relating to a "Global HMI API Meeting—Tokyo, Japan", 38 pages, printed Mar. 15, 2001.
A printout (labeled W–2) of a Web site relating to a "The Shop Floor Inter–Networking Leaders", 4 pages, printed Aug. 24, 2000.
A printout (labeled W–3) of a Web site relating to "Machine Event Monitoring", 2 pages, printed Aug. 24, 2000.
A printout (labeled W–4) of a Web site relating to "Our Products", 1 page, printed Aug. 24, 2000.
A printout (labeled W–5) of a Web site relating to "Products", 3 pages, printed Aug. 24, 2000.

(List continued on next page.)

*Primary Examiner*—Leo Picard
*Assistant Examiner*—Paul Rodriguez
(74) *Attorney, Agent, or Firm*—Greenblum & Bernstein, P.L.C.

(57) ABSTRACT

Controlling software components for cutting machines are distributed in nature, and can be placed on any convenient processor on a network. Each is provided with its own network address, or specific ports are assigned thereto at a shared (e.g., IP or network) address, and the functionality of each component is executed without reference to its physical location on the network. Virtual machine components handle the collection of data from cutting machines, while a machine monitor component collects data from the virtual machine components. User interface interpreting and serving components are also distributed and portable, and a controlling user interface may therefore be accessed, viewed, and take user input wherever such tasks are most convenient. The changeable user interface permits machines, jobs, materials, and cutting elements to be managed centrally, or from distributed locations in the facility or on the Internet at large. Cutting elements may be tracked for lifetime and for replacement reasons and other commentary data. The components at each cutting machine, in cooperation with the database accessible therefrom, track the usage (e.g., in hours or area cut) of any particular cutting element, and records are automatically maintained.

34 Claims, 51 Drawing Sheets

OTHER PUBLICATIONS

A printout (labeled W–6) of a Web site relating to "Seiki Flexlink machine tool communication software", 3 pages, printed Aug. 24, 2000.

printout (labeled W–7) of a Web site relating to "Major Manufacturers Sign Upfor e–MFG Internetworking", 1 page, printed Aug. 24, 2000.

A printout (labeled W–8) of a Web site relating to "Investments", 1 page, printed Aug. 24, 2000.

A printout (labeled W–9) of a Web site relating to "Hitachi Seiki USA First OEM to offer e–manufacturing Networks Machine Tool InterNetworking Products and Services", 2 pages, printed Aug. 24, 2000.

A printout (labeled W–10) of a Web site relating to "Company", 4 pages, printed Aug. 24, 2000.

A printout (labeled W–11) of a Web site relating to e–Manufacturing Networks Inc.—Corporate Profile "The Shop Floor Inter–Networking Leaders", 4 pages, printed Aug. 24, 2000.

A printout (labeled W–12) of a Web site relating to "News", 3 pages, printed Aug. 24, 2000.

A printout (labeled W–13) of a Web site relating to "Hitachi Seiki Introduces Seiki Open CNC/PC Network Connectivity", 1 page, printed on or about Aug. 24, 2000, Dec. 1999.

A printout (labeled W–14) of a Web site relating to "IMTS-Net—Manufacturing Technology Marketplace", 5 pages, printed Aug. 24, 2000.

Leaflet handouts (labeled W–15) from a trade show relating to "DrMachines.com", 2 pages, obtained on or about Oct. 5, 2000.

An article (labeled W–16) entitled "OMAC Embraces the Internet to Enable Machine Tool Collaboration", by Slansky et al, 5 pages, published Mar. 7, 2001.

A graphical leaflet (labeled W–17) relating to "NETCNC: High Speed Loader>>High Speed Loading", 1 page, printed on or about Aug. 24, 2000.

A graphical leaflet (labeled W–18) relating to "Machine Tool Interface Board", 1 page, printed on or about Aug. 24, 2000.

printout (labeled W–19) of a Web site relating to "Seiki FlexLinx software", 3 pages, printed Aug. 24, 2000.

A sales package (labeled W–20) relating to "Multi–DNC System using Comtrol RocketPort Hardware", obtained on or after Oct. 5, 2000.

HA–700 Horizontal Bandsaw Operator's Manual, Amada Company, Limited (undated).

* cited by examiner

Schedule

| Job | Material | Shape | Size X | Size Y | Size W | Size H | QTY | Cut length | Due date | Run on | Operator | Status | |
|---|---|---|---|---|---|---|---|---|---|---|---|---|---|
| J00014 | 1045 | H-Shape | 1.1 | 3.5 | 2.8 | 1 | 80 | 40 | 12/4/98 | ACT4 | orbit | ☺ Completed | Detail |
| we we | 1045 | Rectangle | 2 | 64 | 0 | 0 | 67 | 647.67 | 10/14/98 | N/A | N/A | ○ Waiting | Detail |
| we we | 1045 | Rectangle | 0 | 0 | 0 | 0 | 0 | 0 | 10/14/98 | N/A | N/A | ○ Waiting | Detail |
| 1234567 | 1045 | H-Shape | 9 | 10.5 | 0 | 0 | 0 | 0 | 9/23/98 | ACT1 | orbit | ○ Processing | Detail |
| J00015 | 1045 | Rectangle | 0 | 0 | 0 | 0 | 20 | 1.5 | 12/7/98 | ACT3 | orbit | ○ Processing | Detail |
| 13 | 1045 | Rectangle | 5.6 | 1.2 | 0 | 0 | 0 | 0 | 10/26/98 | N/A | N/A | ○ Waiting | Detail |
| J00006 | 12L14 | Rectangle | 3.48 | 0 | 0 | 0 | 250 | 4.5 | 11/26/98 | ACT2 | orbit | ○ Processing | Detail |
| J00002 | 12L14 | Round | 5.65 | 2.45 | 0 | 0 | 150 | 2.5 | 11/16/98 | ACT4 | orbit | ☺ Completed | Detail |
| J00012 | 12L14 | Rectangle | 2.3 | 2.7 | 0 | 0 | 90 | 5.7 | 12/1/98 | ACT4 | orbit | ☺ Completed | Detail |
| J00016 | 304 | Rectangle | 10 | 8.5 | 0 | 0 | 150 | 10 | 10/10/98 | ACT4 | orbit | ○ Waiting | Detail |
| J00011 | 304 | Rectangle | 1 | 3.8 | 3.1 | 1.25 | 200 | 10 | 12/4/98 | N/A | N/A | ☺ Completed | Detail |
| J00005 | 304 | H-Shape | 20 | 12 | 10 | 10 | 85 | 3.2 | 12/4/98 | ACT1 | orbit | ○ Waiting | Detail |
| robert | b-cupper | Round | 3 | 1 | 0 | 0 | 100 | 12.75 | 10/30/98 | N/A | N/A | ○ Waiting | Detail |
| jhkhj | D-2 | Tube | 3.5 | 0.5 | 0 | 0 | 11 | 12 | 9/20/98 | ACT1 | orbit | ○ Waiting | Detail |
| j00009 | D-2 | Tube | 3.5 | 0.5 | 0 | 0 | 220 | 10 | 12/4/98 | ACT2 | orbit | ☺ Completed | Detail |

Total 18 records
sort by ⦿ Material ○ date ○ number    Filter ☑ Waiting ☑ Processing ☑ Completed Showing records from 8/5/98
Refresh  Next Page

FIG. 10B

Job detail

| | | | |
|---|---|---|---|
| Job number | J00014 | Job Extension | 1 |
| Order date | 8/16/98 | Due date | 12/4/98 |
| Ship to | ASI | | |
| Special Instruction | N/A | | |
| Quantity | 80 | | |
| Shape | Rectangle | New Shape | |
| Material | 1045 | New Material | |
| Select machine | Not Specified | | |
| Cut length | 40 | Cut area | 10.5 |
| Bundle number | 20 | | |
| Size X | 1.1 | Size Y | 3.5 |
| Size W | 2.8 | Size H | 1 |
| FCV Position | 0 | PCV Position | 0 |
| Blade Speed | 0 | Run On | ACT4 |

[Back]

FIG. 10C

Schedule

| Job | Material | Shape | Size X | Size Y | Size W | Size H | QTY | Cut length | Due date | Run on | Operator | Status | |
|---|---|---|---|---|---|---|---|---|---|---|---|---|---|
| J00014 | 1045 | H-Shape | 1.1 | 3.5 | 2.8 | 1 | 80 | 40 | 12/4/98 | ACT4 | orbit | ⊙ Completed | Detail |
| we we | 1045 | Rectangle | 2 | 64 | 0 | 0 | 67 | 647.67 | 10/14/98 | N/A | N/A | ○ Waiting | Detail |
| we we | 1045 | Rectangle | 0 | 0 | 0 | 0 | 0 | 0 | 10/14/98 | N/A | N/A | ⊙ Waiting | Detail |
| 1234567 | 1045 | H-Shape | 0 | 0 | 0 | 0 | 0 | 0 | 9/23/98 | ACT1 | orbit | ○ Processing | Detail |
| J00015 | 1045 | Rectangle | 9 | 10.5 | 0 | 0 | 20 | 1.5 | 12/7/98 | ACT3 | orbit | ○ Processing | Detail |
| 13 | 1045 | Rectangle | 0 | 0 | 0 | 0 | 0 | 0 | 10/26/98 | N/A | N/A | ⊙ Waiting | Detail |
| J00006 | 12L14 | Rectangle | 5.6 | 1.2 | 0 | 0 | 250 | 4.5 | 11/26/98 | ACT2 | orbit | ○ Processing | Detail |
| J00002 | 12L14 | Round | 3.48 | 0 | 0 | 0 | 150 | 2.5 | 11/16/98 | ACT1 | orbit | ⊙ Completed | Detail |
| J00012 | 12L14 | Rectangle | 5.65 | 2.45 | 0 | 0 | 90 | 5.7 | 12/1/98 | ACT4 | orbit | ⊙ Completed | Detail |
| J00016 | 304 | Rectangle | 2.3 | 2.7 | 0 | 0 | 150 | 10 | 10/10/98 | ACT4 | orbit | ⊙ Completed | Detail |
| J00011 | 304 | Rectangle | 10 | 8.5 | 0 | 0 | 200 | 10 | 12/4/98 | N/A | N/A | ○ Waiting | Detail |
| J00005 | 304 | H-Shape | 1 | 3.8 | 3.1 | 1.25 | 85 | 3.2 | 12/4/98 | ACT1 | orbit | ⊙ Completed | Detail |
| robert | b-cupper | Round | 20 | 12 | 10 | 10 | 100 | 12.75 | 10/30/98 | N/A | N/A | ○ Waiting | Detail |
| jhkh | D-2 | Tube | 3 | 1 | 0 | 0 | 11 | 12 | 9/20/98 | ACT1 | orbit | ○ Waiting | Detail |
| j00009 | D-2 | Tube | 3.5 | 0.5 | 0 | 0 | 220 | 10 | 12/4/98 | ACT2 | orbit | ⊙ Completed | Detail |

Total 18 records
sort by ⊙ Material ○ date ○ number        Filter ☑ Waiting ☑ Processing ☑ Completed Showing records from 8/5/98    Refresh    Next Page

FIG. 11D

| Machine | Power | Blade | Run mode | Up | Down | Front | Back | Run Time | Qty | Area Cut | Status | |
|---------|-------|-------|----------|----|----|-------|------|----------|-----|----------|--------|--------|
| ACT1 | ☐ | ☐ | MANUAL | ☐ | ☐ | ☐ | ☐ | 0 | 0 | 0 | Idle | Detail |
| ACT2 | ☐ | ☐ | MANUAL | ☐ | ☐ | ☐ | ☐ | 0 | 0 | 0 | Idle | Detail |
| ACT3 | ☐ | ☐ | MANUAL | ☐ | ☐ | ☐ | ☐ | 0 | 0 | 0 | Idle | Detail |
| ACT4 | ☐ | ☐ | MANUAL | ☐ | ☐ | ☐ | ☐ | 0 | 0 | 0 | Idle | Detail |
| ACT5 | ☐ | ☐ | MANUAL | ☐ | ☐ | ☐ | ☐ | 0 | 0 | 0 | Idle | Detail |

Starting from [2 days] [8:00]

Machine Monitor

⊙ Blade on machine ACT3 exceeds 120 hours running time.

FIG. 12B

Machine Detail

| Job number | 1234567 |
|---|---|
| Job Extension | 0 |
| Machine Name | ACT1 |
| Model name | HA250 |
| Start time | 10/1/98 2:16:17 PM |
| End time | N/A |
| Bundle Number | 0 |
| Quantity | 0 |
| FCV Position | 0 |
| PCV Position | 0 |
| Blade Speed | 0 |
| Blade Type | MGLB |
| Serial Number | MGLB-00023 |
| Blade Brand | AMADA |
| Cut area | 0 |

Back

FIG. 12C

Start Job

| | | | |
|---|---|---|---|
| Job number | J00011 | Job Extension | 1 |
| Order date | 8/16/98 | Due date | 12/4/98 |
| Ship to | Pacific Corp. | | |
| Special Instruction | N/A | | |
| Quantity | 200 | | |
| Shape | Rectangle | | |
| Material | 304 | | |

Cut length

| | | | |
|---|---|---|---|
| Bundle number | 10 | Cut area | 85 |
| Size X | 20 | | |
| Size W | 10 | Size Y | 8.5 |
| FCV Position | 0 | Size H | 0 |
| Blade Speed | 0 | PCV Position | 0 |
| Select machine | ACT4 | | |
| Blade serial number | MGLB-00039 | | |

[Change Blade]

[Back] [Confirm]

FIG. 13B

Machine Table

| Machine Name | Model Name | IP Address/PC Name | Serial Number | Blade Brand | | |
|---|---|---|---|---|---|---|
| ACT1 | HA250 | apichat | MGLB-00023 | AMADA | Detail | Blade |
| ACT2 | HA400 | apichat | HILO-00028 | AMADA | Detail | Blade |
| ACT3 | C-4100 | apichat | SVGLB-00022 | AMADA | Detail | Blade |
| ACT4 | HA250 | apichat | MGLB-00039 | N/A | Detail | Blade |
| ACT5 | HA200 | apichat | HILO-00028 | Orbit | Detail | Blade |

[New Machine]

FIG. 14B

User Table

| Full Name | Login | Group | |
|---|---|---|---|
| Orbit | Orbit | System administrator | Detail |
| sdsds | cxcc | Manager | Detail |
| xx | xx3 | Shop floor operator | Detail |
| Wichan Jarasrattanapaiboo | xx1 | Shop floor operator | Detail |
| | | | Detail |

Add user

Total 17 record          From 1 to
                    Refresh    Next page ->

FIG. 15B

General Query

Summarize: Jobs

Blades
Machines
Users

Sort by: Material

Filter by: Machine Name

Condition: includes | ACT

Please specify period of time:

- ● Query on daily basis — Today | 8:00
- ○ Query on weekly basis — This week | 8:00
- ○ From: 1998 | Oct | 26 | 8:00
  To: 1998 | Oct | 27 | 8:00

[Submit]  [Back]

File  Edit  View  Go  Favorites  Help

Back  Forward  Stop  Refresh  Home  Search  Favorites  Print  Font  Edit

Summary

| Job number | Job Extension | Start Time | End Time | Run Time | Quantity | Cut area | Cut Rate | Material | Shape | Size X | Size Y | Size W | Size H | |
|---|---|---|---|---|---|---|---|---|---|---|---|---|---|---|
| J00005 | 1 | 9/16/98 11:53:56 AM | 9/16/98 1:36:59 PM | 1580 | 85 | 11.475 | 7.26265 | 304 | H-Shape | 1 | 3.8 | 3.1 | 1.25 | Details |
| J00003 | 1 | 9/16/98 2:13:33 PM | 9/16/98 2:13:57 PM | 1238 | 120 | 14.25 | 1.15105 | 304 | H-Shape | 1.25 | 4.7 | 2 | 1.25 | Details |
| J00004 | 1 | 9/16/98 2:14:12 PM | 9/16/98 2:14:17 PM | 2956 | 50 | 3.14159 | 1.06278 | 1045 | Tube | 2.5 | 0.5 | 0 | 0 | Details |
| J00010 | 1 | 9/16/98 2:15:22 PM | 9/17/98 3:17:20 PM | 0 | 100 | 4.90873 | 0 | 1045 | Round | 2.5 | 0 | 0 | 0 | Details |
| | | | Total | 5774 | 355 | 33.7753 | 5.84955 | | | | | | | |

Query starts from 3/26/1998 8:00 to 10/27/1998 8:00
On machine ACT1

Back

FIG. 16D

Job Detail

| | |
|---|---|
| Job number | J00005 |
| Job Extension | 1 |
| Shape | H-Shape |
| Material | 304 |
| Size X | 1 |
| Size Y | 3.8 |
| Size W | 3.1 |
| Size H | 1.25 |
| Quantity | 85 |
| Bundle number | 5 |
| Machine Name | ACT1 |
| Model Name | HA250 |
| FCV Position | 1.4 |
| PCV Position | 1.2 |
| Blade Speed | 9 |
| Operator | orbit |
| Ship to | Heavy Construction |
| Order date | 8/16/98 |
| due date | 12/4/98 |

Blade Query

| Serial Number | Blade Brand | Add Date | Remove Date | Run Time | Cut Area | Pitch | Size | |
|---|---|---|---|---|---|---|---|---|
| MGLB-00012 | AMADA | 9/24/98 | 9/24/98 | 2321 | 5650 | 8 | Medium | Detail |
| MGLB-00015 | AMADA | 9/16/98 | 9/16/98 | 2973 | 1324 | 8 | Medium | Detail |
| MGLB-00020 | AMADA | 9/16/98 | 9/16/98 | 2198 | 2490 | 4 | Medium | Detail |
| | | TOTAL | 3 recs | 2497.33 | 3154.66 | | | |

Blade type = "MGLB" From 1998/3/26 To 1998/10/27

[back]

FIG. 16G

Blade Inventory

| Serial Number | Blade Brand | Add Date | Remove Date | Run Time | Area Cut | Pitch | Size | | |
|---|---|---|---|---|---|---|---|---|---|
| MGLB-00012 | AMADA | 9/24/98 | 9/24/98 | 2321 | 5650 | 8 | Medium | Detail | Delete |
| SVGLB-00013 | Orbit | 9/29/98 | 9/29/98 | 3312 | 3430 | 8 | Large | Detail | Delete |
| HILO-00014 | AMADA | 9/16/98 | 9/16/98 | 1288 | 1560 | 8 | Medium | Detail | Delete |
| MGLB-00015 | AMADA | 9/16/98 | 9/16/98 | 2973 | 1324 | 8 | Medium | Detail | Delete |
| HILO-00017 | AMADA | 9/16/98 | 9/25/98 | 3112 | 5400 | 6 | Medium | Detail | Delete |
| HILO-00018 | AMADA | 9/16/98 | 10/13/98 | 1321 | 2321 | 6 | Large | Detail | Delete |

Total 6 record

From 1 To 6
Refresh

FIG. 17B

SYSTEM FOR MANAGEMENT OF CUTTING MACHINES

CROSS REFERENCES TO RELATED APPLICATIONS

This application claims the benefit of copending U.S. Provisional Patent Application No. 60/116,947, in the names of Masahiko TADOKORO et. al., entitled "System for Management of Cutting Machines", filed on Jan. 21, 1999, the disclosure of which is expressly incorporated herein by reference in its entirety.

REFERENCE TO MICROFICHE APPENDIX

This application includes a Microfiche appendix for Appendices A and B. The Microfiche appendix consists of five (5) microfiche showing 311 frames (including target and title frames).

BACKGROUND OF THE INVENTION

1. Field of the Invention

The present invention relates to a system for management of cutting machines.

2. Description of Relevant Materials

Presently, management of cutting machines (e.g., band saws, etc.) is usually carried out on a relatively inflexible basis. Management, in this context, refers to the monitoring of cutting machines, cutting elements, jobs, and users, the collection and analysis of data, and intervention taken to address problems or requests.

Typically, a facility employing several cutting machines will use pencil and paper, or, at best, use computing tools in an ad-hoc fashion to manage their equipment, tool inventory, and work flow. Historical and current status data are not collected and stored in an easily accessible manner, nor can such data be easily organized and centralized.

Programmable band saw systems, in which job programs may be downloaded from a supervisor's computer on-site, are known (e.g., U.S. Pat. No. 5,418,729, "Communication Linkage System for Programmable Bandsaw", issued May 23, 1995). These band saw systems also permit the retrieval of limited saw and job programming information from the band saw to the supervisor's computer, as well as contemporaneous programming of jobs from the supervisor's computer and/or the bandsaw itself while a job is running. The systems also permit simple conflict detection of job number assignment, and restricted access to saw function values. However, the known systems have many shortcomings for the overall management of a facility or multiple facilities.

The known systems connect the programmable logic controllers (PLCs) of multiple bandsaws to a single general purpose computer, typically operated by a supervisor. The programmable controllers have specific programming installed at the (saw maker's) factory level, and a limited interface device having only a numeric and function keypad and a LCD display having one or two lines of character output. The user interface is therefore static and inflexible, and may not be changed without drastic system overhaul such as replacing the PLCs at each saw. Moreover, only saws specifically designed to interact with the system may be used. The connections to the supervisor computer are over dedicated serial lines, which may not share bandwidth with other signals. Only a rudimentary PLC microprocessor and central computer are contemplated, and the enabling software designed for each microprocessor to permit interaction may only function on the contemplated processor.

No external connections are contemplated, so consultation with the manufacturer or interaction with sales and service providers is impossible. At the same time, management of machines, jobs, and blade inventory at diverse facilities is not facilitated by the known systems. No archiving of data for management purposes, whether locally or available to privileged off-site users, is contemplated. At best, querying of existing machines or jobs involves stepping through a list of assigned job numbers.

Monitoring functions are similarly limited. The distribution of work flow and inventory controls may only be performed from the central computer—a supervisor on the shop floor may not access the system at a supervisor access level, nor would the supervisor enjoy the same monitoring and editing capabilities found at the supervisor station.

Furthermore, although such systems purport to improve work flow, efficiency, and inventory control, they do not contemplate control or management of cutting elements. No data on cutting elements is kept or may be accessed. Since each saw or cutting machine uses replaceable blades or cutting elements, the improper management of which results in work flow bottlenecks, work stoppages, and potential damage to cutting machines and workpieces, the absence of any control over cutting elements in the known systems permits numerous and chronic work flow interruptions.

3. Acronyms

The following is a listing of acronyms used throughout the following disclosure of the present invention.

| | |
|---|---|
| ASP | - Active Server Page |
| CGI | - Common Gateway Interface |
| COM | - Component Object Model |
| CORBA | - Common Object Request Broker Architecture |
| DCE | - Distributed Computing Environment |
| DCOM | - Distributed COM |
| DHTML | - Dynamic HTML |
| HTML | - Hypertext Markup Language |
| HTTP | - Hypertext Transport Protocol |
| IIOP | - Internet Inter-ORB Protocol |
| IIS | - Internet Information Server |
| ISA | - Industry Standard Architecture |
| ISDN | - Integrated Services Digital Network |
| JDBC | - Java Database Connectivity |
| ODBC | - Open Database Connectivity |
| ORB | - Object Request Broker |
| Perl | - Practical Extraction and Reporting Language |
| POS | - Persistent Object Service |
| PPP | - Point-to-Point Protocol |
| RMI | - Remote Method Invocation |
| RPC | - Remote Procedure Call |
| SGML | - Standard Generalized Markup Language |
| SQL | - Structured Query Language |
| TCP/IP | - Transport Control Protocol/Internet Protocol |
| URL | - Uniform Resource Locator |
| VPN | - Virtual Private Network |
| XML | - eXtensible Markup Language |

SUMMARY OF THE INVENTION

The system for management provides unexpected benefits for different interested parties—each facility employing cutting machines, a company with several facilities, and the manufacturer of cutting machines.

According to a first aspect of the invention, a system for management of cutting machines and allocation of jobs among the cutting machines, includes a plurality of cutting machines, each cutting machine having a monitor input device through which monitor data indicating the status of the cutting machine is input, and a plurality of virtual machine components for collecting the monitor data, each virtual machine component corresponding to a cutting machine. A database serving component that communicates with the machine monitoring component, records and reads descriptive data including a machine table for describing the cutting machines and a job table describing jobs to be performed on the cutting machines, associates the job table with the machine table, and for records and reads usage data derived from the monitor data and descriptive data. A machine monitoring component retrieves the monitor data from all of the plurality of virtual machine component and generates the usage data, and provides the monitor data and usage data to the database serving component. A user interface serving component communicates with the database serving component and the machine monitoring component, and serves dynamic interactive user interface elements containing portions of the usage data, monitor data and identifying data. The content of the dynamic interactive user interface elements is different depending on the content of the usage data, monitor data and descriptive data. At least one user interface interpreting component displays the dynamic interactive user interface elements.

In this manner, the system is distributed, and the operative components may be placed at any processor in the facility—e.g., all components may run and interact on a single processor, or separate but networked components may be provided on individual processors for each cutting machine, for a machine monitor, for a database server, for a web server, and for client browsers. Two or more of the components may be provided on the same processor when such a configuration takes advantage of existing facility layout. Since the monitoring components (particularly the virtual machine components, and machine monitor component) are platform-independent, the present system may be applied to a system of diverse manufacturer's cutting machines, as a special purpose data interface is not required.

A further feature of the invention is that each of the plurality of virtual machine components, the machine monitoring component, the database serving component, the user interface serving component, and at least one user interface interpreting component has an identity, and communication in the system is addressed according to the identity independently of physical location. In this case, optionally, in response to a request from the user interface interpreting component, the user interface serving component retrieves the monitor data from the machine monitor component and serves a monitoring user interface including the monitor data to the user interface interpreting component. Alternatively or additionally, in response to a conditioned query from the user interface interpreting component, the user interface serving component communicates with the database serving component, the database serving component sends records complying with the conditioned query to the user interface serving component, and the user interface serving component serves a result user interface including the complying records to the user interface interpreting component.

In a preferred embodiment, when a job record in the job table and a machine record in the machine table correspond, the user interface serving component generates a job usage record in a job usage table indicating a paired machine and record.

In another preferred embodiment, the database further includes an alert table specifying alert conditions in the job table and the machine table, and whenever the user interface serving component serves a user interface to the at least one user interface interpreting component, the user interface serving component checks the alert table and attaches an alert indicator to specified records in the job table and the machine table meeting the alert conditions, the user interface interpreting component interpreting the alert indicator. In this manner, alerts are provided and are accessible and configurable on a distributed basis, permitting rapid response to any problems.

Preferably, the monitor data includes operating data representative of settings of each machine. Alternatively or additionally, the monitor data includes load detection data that indicate the operating load on the machine. Still further, the monitor data may include interlock detection data that indicate whether the machine is capable of running or is locked and prevented from running.

Preferably, the system includes a plurality of microprocessors connected via a network for running the components, each of the components hosted by one of the microprocessors, and the components communicate with each other via a network transport layer of the network.

The machine monitor component may generate the virtual machines according to the machine table for describing the cutting machines. In this manner, the monitoring components, especially the virtual machine components, are sent over the network to operate at the destination processor—and therefore may be updated, reset, or custom configured without visiting the hosting processor physically.

In one implementation, each virtual machine component runs on a separate processor at the corresponding machine. In this case, the separate processor at the corresponding machine preferably further runs one of the at least one user interface interpreting components. Alternatively or additionally, the monitor input device may include a data acquisition device for acquiring data connected to a plurality of detectors on the cutting machine, each data acquisition device being controlled by the corresponding separate processor.

In another implementation, the database serving component and user interface serving component are run on a same processor. In this case, the same processor may further runs the machine monitor component.

In another aspect of the invention, a cutting machine management network system, includes a variable number of instrumented cutting machines, each cutting machine including a processor with a virtual machine component that scans instrumentation on the cutting machine and maintains status information representative of the status of the instrumentation. A database server maintains a database of descriptive information describing the instrumented cutting machines and that is responsive to queries. A machine monitor is networked to each instrumented cutting machine, the machine monitor including a processor with a machine monitor component that scans the virtual machine components and maintains a status array including the status information from each virtual machine component. A web server processes requests from distributed clients and serves hypertext documents. A dynamic content server interprets dynamic content markup documents including code segments, queries the database server to retrieve the descriptive information, retrieving the status array from the machine monitor, and generating hypertext documents in response to requests from the distributed clients and internal interpretation of the code segments. The hypertext documents include differing user interaction elements and displayed information depending on the content of the descriptive information and the status array.

In this manner, the user interface provided at each browser station is flexible and changes according to access level and served data. In this manner, for each facility employing at least one (usually several) cutting machines, the system permits the monitoring and process management of work status and work flow from anywhere within the facility but also prevents inappropriate access. Since the same protocol is used for the facility system and the Internet at large, communications and -access are provided at all levels (facility-wide communications as well as extra-facility communications from any client browser at which a privileged user logs in).

Further preferably, the descriptive data includes a cutting element table describing consumable cutting elements for the cutting machines, and wherein each job record and each machine record is selectively associated with a cutting element record, and the machine monitor component generates a cumulative running value for each cutting element record representative of the amount of use of a corresponding cutting element of the cutting machine. Still further preferably, the descriptive data includes a user table describing users of the system and operators of the machine and wherein each job record and each machine record is selectively associated with an operator record. In this manner, machine usage is also monitored and controlled, for example, job, blade, or personnel scheduling conflicts may be reviewed via the system.

In still another aspect of the invention, a cutting machine management network system includes a plurality of replaceable cutting elements for shaping workpieces, and a variable number of cutting machines in which a cutting element may be installed to shape workpieces, each cutting machine associated with a processor having a virtual machine component that scans at least cutting element status on the cutting machine and maintains status information representative of the status of the cutting elements. A database server maintains a database of information describing the instrumented cutting machines, stores usage information for each cutting element, and is responsive to queries. A machine monitor is networked to each cutting machine, and includes a processor with a machine monitor component that scans the virtual machine components, maintains a status array including the cutting element status from each virtual machine component, and generates the usage information depending on the status array. A user interface serving component communicates with the database server and the machine monitor, and serves interactive user interface elements containing the cutting element usage information. At least one user interface interpreting component displays the user interface elements.

Accordingly, cutting element usage, and therefore inventory and costs, can be monitored and controlled. In particular, running jobs are monitored, associated with the cutting element in use, and cumulative usage for each cutting element in inventory is computed and recorded.

BRIEF DESCRIPTION OF THE DRAWINGS

The present invention is further explained in the description which follows with reference to the drawings, illustrating, by way of non-limiting examples, various embodiments of the invention, with like reference numerals representing similar parts throughout the several views, and wherein:

FIG. 10B shows a first page of an exemplary user interface generated by the schedule routine of FIG. 10A;

FIG. 10C shows an exemplary user interface generated by a job detail routine of FIG. 10A;

FIG. 11D shows modifications to an exemplary (schedule) user interface generated according to the alarms set in the alarm set routine of FIG. 10A;

FIG. 12B shows an exemplary user interface generated by the machine monitor routine of FIG. 12A;

FIG. 12C shows an exemplary user interface generated by a machine detail routine of FIG. 12A;

FIG. 13B shows an exemplary user interface generated by the start job routine of FIG. 13A;

FIG. 14B shows an exemplary user interface generated by the machine table routine of FIG. 14A;

FIG. 15B shows an exemplary user interface generated by the user table routine of FIG. 15A;

FIG. 16B shows an exemplary input user interface generated by the general query routine of FIG. 16A;

FIG. 16C shows an exemplary input user interface generated by a summary query routine as applied by the routine of FIG. 16A;

FIG. 16D shows an exemplary result user interface generated by the summary query of FIG. 16C;

FIG. 16E shows an exemplary job detail user interface generated as part of the interface of FIG. 16D;

FIG. 16F shows an exemplary input user interface generated by a blade (cutting element) query routine as applied by the routine of FIG. 16A;

FIG. 16G shows an exemplary result user interface generated by the blade query of FIG. 16F;

FIG. 17B shows an exemplary user interface generated by the blade table routine of FIG. 17;

BRIEF DESCRIPTION OF THE MICROFICHE APPENDIX

Appendix A of the Microfiche appendix includes exemplary source code of COM/DCOM components that demonstrate one possible implementation for generating the Virtual Machine and Machine Monitor components for the system for management of cutting machines of the present invention; and Appendix B of the Microfiche appendix includes exemplary source code of ASP mark-up documents, incorporating VBScript (e.g., Visual Basic Script) and/or JScript (e.g., JavaScript), that demonstrate one possible implementation for generating the flexible user interface for the system for management of cutting machines of the present invention.

DETAILED DESCRIPTION OF THE PREFERRED EMBODIMENTS

Figure 1:
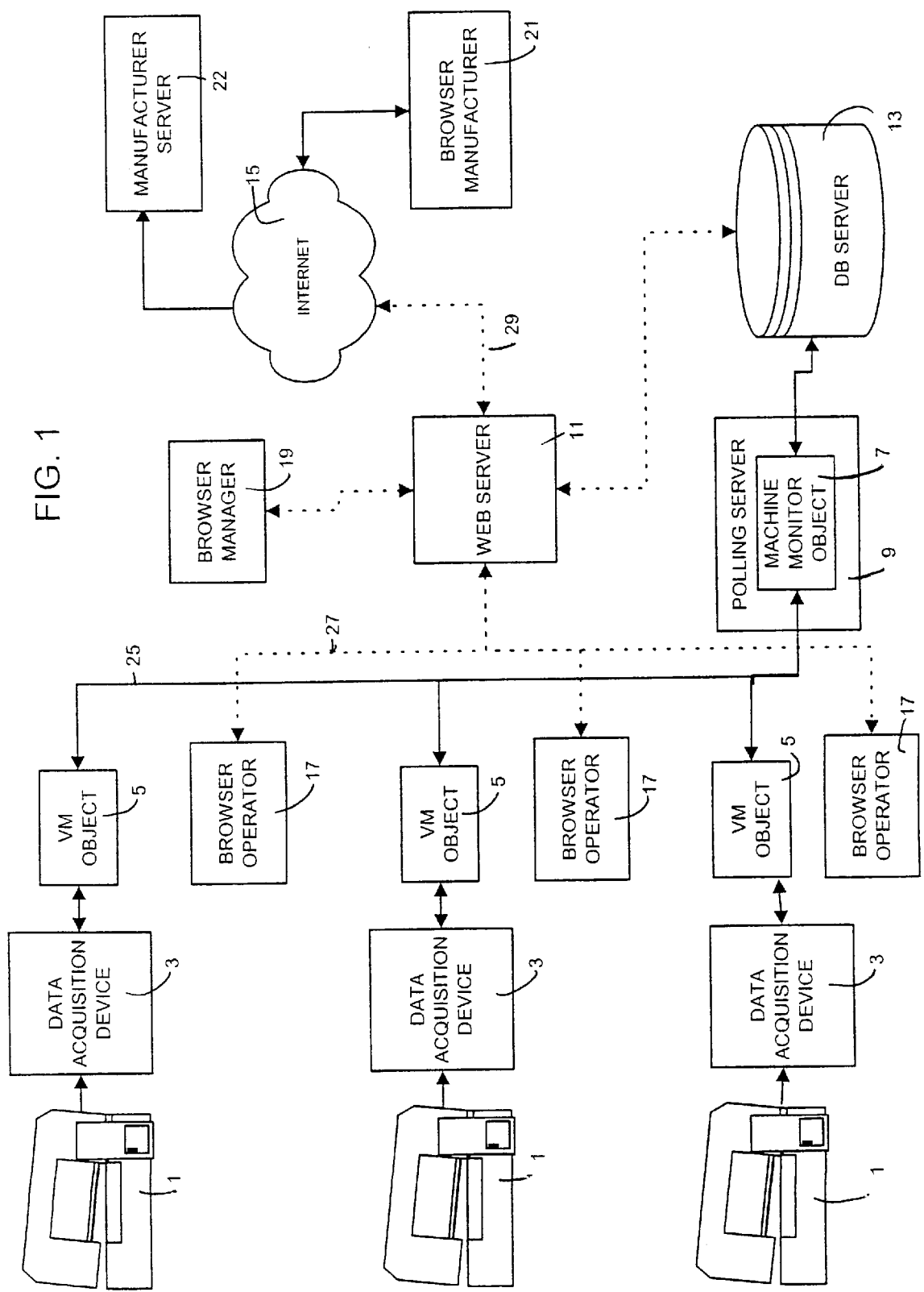
FIG. 1 shows a schematic overview of the system for management of cutting machines.

FIG. 1 shows, in schematic form, an overview of elements and connections by which the system for management of cutting machines according to the invention is implemented. One or many cutting machines 1 are arranged, for example, on the shop floor of a facility. Each cutting machine 1 is instrumented with various outputs and sensors (an example is described in FIG. 2). The outputs and sensors are connected to a data acquisition device 3 via inputs on the device 3. Typically, the data acquisition device 3 has several analog or digital inputs, and can connect to another device via a bus or interface, thereby providing a signal including values for all or some of the inputs. The data acquisition device 3 may also have analog or digital outputs.

Each data acquisition device 3 sends its signals to a "virtual machine" (VM) object or component 5.

In the context of the present specification, the terminology "component" and "object" have their normal meanings in the field of object-oriented programming and distribute object technology, and more specifically, in distributed computing. A component may be single function or multi-function, and simple and complex examples are described herein. A system may include one or more components. Components may have one or more objects. Objects conventionally have one or more methods (routines), and one or more properties (variables). In the present specification, where "component" is used, more than one object may be present, or the component may be sufficiently complex to be considered a system. Components, in general, can query one another to find out characteristics and how to communicate, can make their properties visible to other components, handle their own events or those of other components, and preserve their own states for later use. Preferably, the VM object or component 5 is a standalone software component including at least one object that has at least three functions: polling the data acquisition device by timer or upon request, maintaining polled values, and reporting maintained values by timer or upon request. When the VM component 5 reports maintained values, identification information corresponding to the VM component and matching cutting machine 1 is included. The VM component 5 may be deployed on any appropriate processor connected to and capable of communicating with the data acquisition device 3.

Each VM component 5 is connected to a "machine monitor" object or component 7. The machine monitor component 7 may be deployed on a polling server 9 processor connected to all of the VM components 5 via a reporting channel 25. The machine monitor 7 is also preferably a standalone software component including at least one object that has at least three functions: polling the VM components 5 for status by timer or upon request, returning an array including the machine status by timer or request, and writing all the polled values and secondary values, along with appropriate temporal (date and time) and identification information, to a database residing on a database (DB) server 13 connected to the machine monitor 7. That is, the machine monitor 7 handles the periodic writing of status information to the DB server 13, and responds to requests for status information. Previously written information is not necessarily overwritten, so the database may record past status information as well.

Accordingly, a database of current status and/or past status information corresponding to one or many cutting machines 1 is maintained on the DB server 13. In order to make this information available, a "Web" server 11 is connected to the DB server, as well as to the machine monitor 7. In this context, a Web server 11 is an application that has several functions, including responding to access over intranet or Internet connection, mediating access and security levels, and interpreting and executing server-side scripts and queries. The Web server serves connected browser or other clients with Web-protocol hypertext or multimedia markup documents which are, in general, interpreted at the client browser. However, in the present application, the markup documents are dynamically generated, and typically contain display elements, text, and embedded hyperlinks which direct the Web server to take action such as serving a subsequent markup document, querying the database, or running a server-side script. The markup documents may be static, or, in the case of the present invention, dynamically generated by the Web server.

Accordingly, facility-based client browsers 17 (operator) and 19 (manager) may access the Web server 11 via a monitoring intranet, network, or channel 27. Since each operator browser 17 is connected to the Web server 11, which may read status information from the DB server 13 and/or from the machine monitor 7, each operator browser may be permitted to view information regarding an associated cutting machine 1 via the monitoring network 27. That is, although the operator browser 17 may be proximate in space to an associated cutting machine 1, status information is first sent via the data acquisition device 3, VM component 5, and machine monitor 7 to the database on the DB server 13 or Web server 11, and "returns" to the operator browser 17 site via the Web server 11 and monitoring network 27. At the same time, the manager browser 19 may be permitted to view information regarding any facility cutting machine 1 via the monitoring network 27.

Preferably, the Web server 11 is further connected, via an Internet connection 29, to the Internet 15 at large. In this manner, the manufacturer may query status and historical data from the database on the DB server 13 via the Web server 11. Moreover, the operator browsers 17 and manager browsers 19 may connect to the manufacturer's server 22, which stores, for example, accumulated or interpreted cutting machine data, as well as on-line documentation, for cutting machines at various facilities.

Figure 2A:
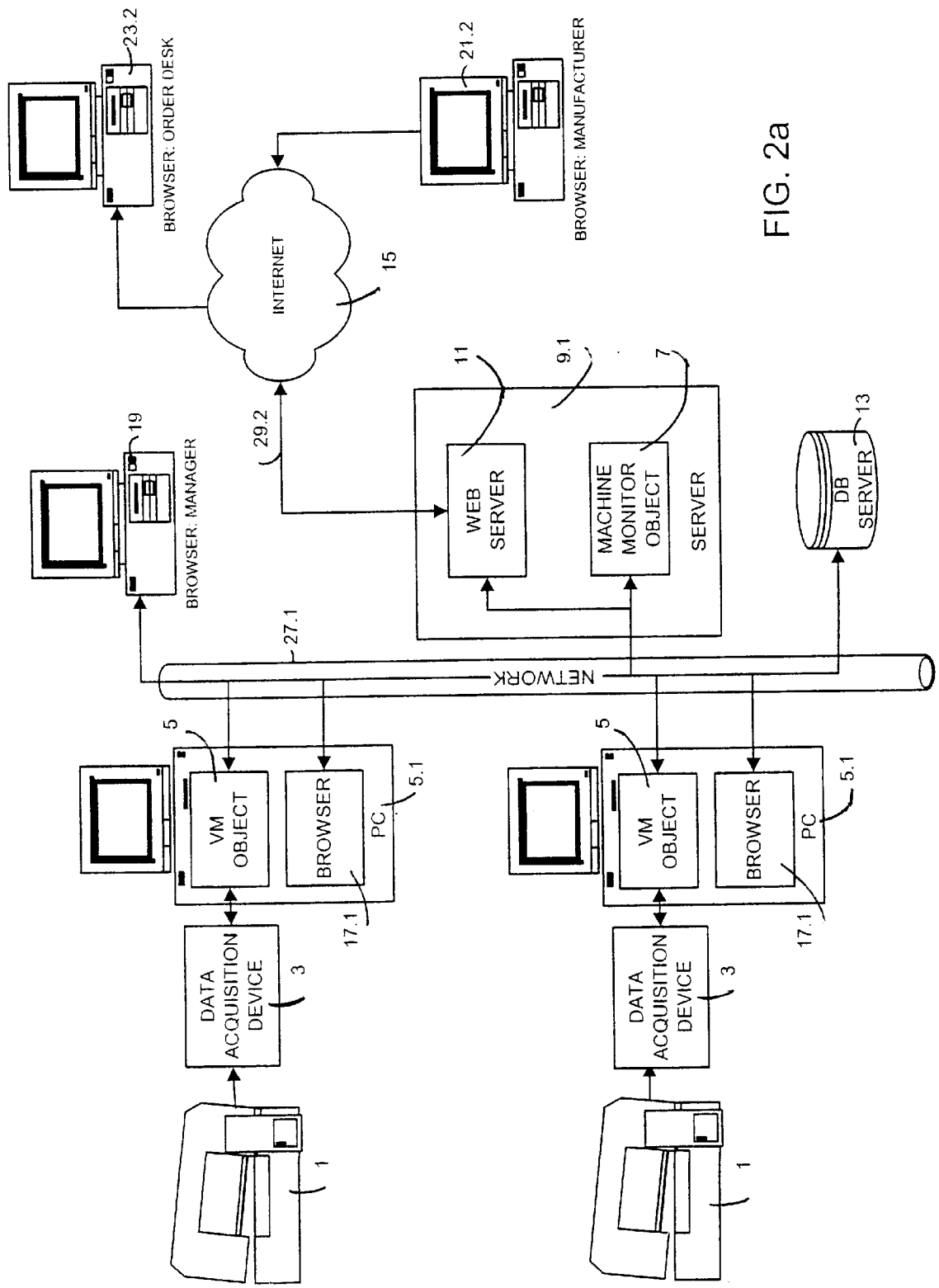
FIG. 2A shows a first embodiment of the system for management of cutting machines.
Figure 3:
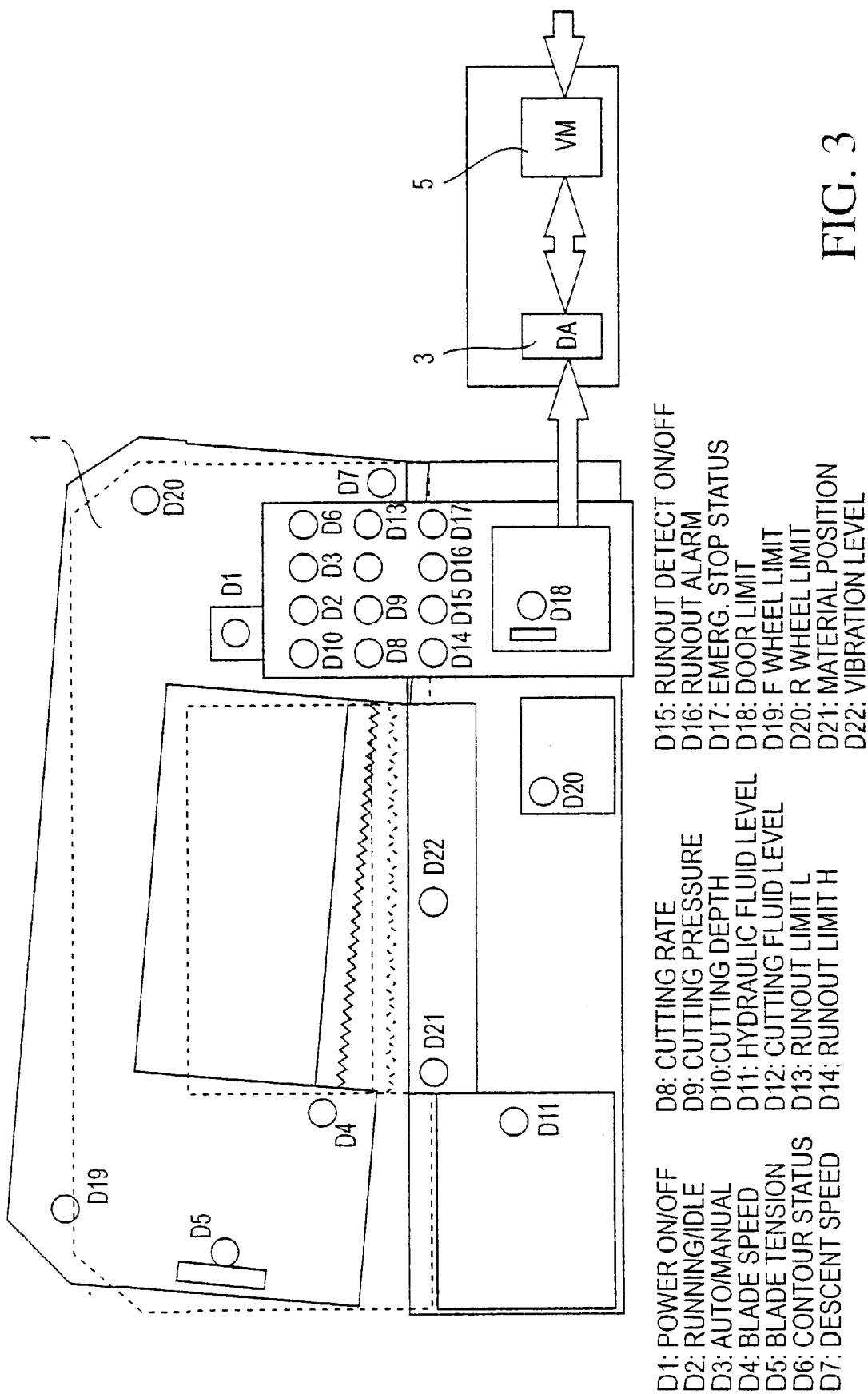
FIG. 3 shows a schematic view of a first embodiment of an instrumented cutting machine.

FIG. 2A shows a first embodiment or preferred structure for implementing the system for management of cutting machines according to the invention. Instrumented cutting machines 1, described in more detail below with reference to FIG. 3, are scanned by a data acquisition device 3. The data acquisition device 3 is one portion of a monitor input device, further including sensors or manual input through which live status may be input. One example of a suitable data acquisition device 3 is the National Instruments Corporation Austin, Tex.) PC-OPDIO-16 I/O card, an expansion card which fits in a card slot connected to the bus (in this case, ISA) of a personal computer 5.1. The PC-OPDIO-16 card has 8 optically isolated inputs (e.g., 8 channels of ON/OFF data) sensing digital levels up to 24V. Optical isolation isolates the computer housing the board from surges, ground loops, and other problems. Although only 8 bits of information (e.g., 8 ON/OFF states; or 4 ON/OFF states and a 16-value (4 bit) variable, and combinations thereof) are available with the PC-OPDIO-16 card, a suitable device or card having any number of analog or digital inputs may be substituted. The data acquisition device 3 is accessed by the operating system (and. e.g., by programs and objects) of the hosting computer via the bus using a conventional device driver.

In the embodiment shown in FIG. 2A, the data acquisition device 3 is installed in an ISA bus card slot of the personal computer 5.1—a conventional x86 architecture personal computer with appropriate display, input devices and network connections. At the same time, the VM component 5 and operator browser 17.1 run from the same personal computer 5.1. In this manner, the number of processors required at the operator station is reduced. The VM component runs as a standalone process under a (multitasking) operating system on the personal computer 5.1, and may have its own unique IP address, or may have specific ports assigned thereto at a shared IP address. As described herein, an IP address, port at an IP address (or, e.g., URL) are considered an "identity" at which communication is addressed independently of physical location. Moreover, since every URL corresponds to an IP address, such are considered equivalent. In the preferred embodiment shown in FIG. 2A, the VM component is a Component Object Model (COM) object coded according to the Microsoft COM specification (Microsoft Corporation, Redmond, Washington), or preferably a Distributed COM (DCOM) object under the Microsoft DCOM specification. COM and DCOM objects run under a variety of operating systems, in this case a variant of Microsoft Windows (e.g., 3.x, 95, 98, NT, 2000, CE, and successors). In general, COM objects are used for various component functions on a single computer, and DCOM objects are used in a distributed architecture having a plurality of network-connected processors or computers, and may communicate with each other via at least TCP/IP and HTTP addressing. The COM and DCOM specifications and protocols are described in detail on the Microsoft Corporation website (microsoft.com).

All of the distributed components described herein are preferably network-aware on a fundamental level. That is, for each distributed component, there is no need to include routines for recognizing and interacting with a network transport layer. Moreover, any distributed object may request services from another object without having to "know" the location or interface for the other object. Distributed objects or components all inherently (as part of the underlying functionality and concept of "distributed") include routines for interacting with network transport layers (e.g., TCP/IP), and each has an (e.g., IP) address, or specific port at a shared IP address, at which it may be found on a network (e.g., LAN, WAN, intranet and/or Internet, etc.). If a component not incorporating distributed functionality is used, it may, e.g., be addressed via another component providing network transport layer access. For example, instead of a single DCOM (or equivalent) object, a first COM (or equivalent) object with the intended function and a second COM (or equivalent) object with network transport layer functionality could be used, each having a unique IP address, or specific ports assigned thereto at a shared IP address.

The VM components 5 are described in further detail later in the specification (with reference to FIG. 4). It should be noted that in all instances herein, the particular architecture and software specified in the embodiments are merely examples. Where alternatives are known, they may be identified herein, but it is intended that hardware and software having essentially similar functions and interacting in the same or a similar manner are considered equivalents. Alternative architectures to x86 (including Pentium-class x86) currently available include, but are not limited to, Intel StrongARM, DEC Alpha, HP Ultra, Silicon Graphics, MIPS, PowerPC, IBM mainframe and emulators, etc—i.e., general purpose microprocessors and processors. Alternative operating systems to Windows include, but are not limited to, Unix and variants (Linux, etc.), Solaris, OpenVMS, Java, Mac OS, etc—i.e., general purpose operating systems. Alternative methods to ASP of providing application server functionality such as server-side action or dynamic content include, but are not limited to, CGI scripts (implemented via C, Perl, Delphi, etc.), ChiliASP, Cold Fusion (Allaire, Inc., Cambridge, Mass.), WebObjects (Apple Computer Co., Cupertino, Calif.), proprietary or purpose-built solutions, etc. Alternative methods to COM and DCOM of providing component, distributed component or object capabilities include, but are not limited to, CORBA, e.g., with IIOP (Object Management Group), Java or JavaBeans, e.g., with RMI (Sun Microsystems, Inc., Palo Alto, Calif.), proprietary or purpose-built solutions, etc. In general, each of DCOM, CORBA/IIOP, and Java/RMI provides gateway capabilities for interoperability with the others. Alternative markup languages to HTML, displayable by a browser, include, but are not limited to, variants of HTML such as DHTML or XML—subsets or supersets of SGML, as well as proprietary display languages (e.g., Display Postscript, Envoy), as long as the display or markup language permits the same or a similar: level of interaction by the user and server. Those skilled in the art may use readily available software and hardware tools to implement the invention discussed herein without undue experimentation.

In FIG. 2A, the operator browser 17.1, having the same functions as previously described, is preferably a "Web browser" such as Netscape Navigator or Communicator (Netscape Communications, Inc., Mountain View, Calif.), Microsoft Internet Explorer, etc., able to request, receive, interpret, and/or execute Web protocol files—HTML and variants (e.g., DHTML, XML, SGML), Java or Visual Basic applications/applets/scriptsand variants, ActiveX controls, specific plug-in protocols (Quicktime, Shockwave, etc.), and the like. It should be noted that these standard file types are periodically superseded by new generations of the same specification, or by faster or more efficient types having essentially the same functions. Superseding standards, files types, protocols, language variations, and/or new generations of each, are expressly considered equivalents.

The operator browsers 17.1 are deployed as a second (multitasked) process on the personal computers 5.1, and have no interaction with the VM components 5 other than preemption or time-slice multitasking. Each browser also has a unique IP address, or may have specific ports assigned thereto at a shared IP address. In this instance, even though the VM components 5 and the operator browsers 5.1 corresponding to the same cutting machine 1 both are deployed on the same processor, as described previously, all interactions of the operator browser 17.1 with a cutting machine 1 are routed back through the network, e.g., via a Web server 1I and machine monitor component 7.

Each personal computer 5.1 is connected to a network 27.1. In the preferred embodiment, this is a conventional local Ethernet network, but may be another type of local area network, or may be connected to a wide area network via leased lines, frame relay, virtual private network (VPN) structures, Internet protocol "tunneling", and the like. More specifically, the network 27.1 is defined by connections to a set of computing devices considered to be within the facility in question—that is, a facility having a number of cutting machines 1 to be managed together. Although separate connections are shown in FIG. 2A for each VM component 5 and. operator browser 17.1, in the physical embodiment, the personal computer 5.1 could use a single network card, and each process interacts with the network protocols via the single network card. Such network cards, when multiple components are run on the same processor, may be able to handle more than one network (e.g., IP) address, e.g., one for each component. Alternatively, when more than one component operates or is deployed on the same processor, the components may interact via different ports at the same IP address. In the preferred embodiment, the network is run under a TCP/IP protocol—the current standard for Internet communications, as well as some Intranets. An "Intranet" is usually considered a local area network run under Internet-protocols. In this manner, both the VM component 5 and operator browsers 17.1 may access the network with a single protocol. Again, superseding protocols and network standards, and/or new generations of each, are expressly considered equivalents.

The network 27.1 also includes connections to the machine monitor component 7, the Web server 11, and the database server 13, as well as to a manager browser 19.

The machine monitor component 7 is another standalone process under a (multitasking) operating system deployed on a server computer 9.1, a conventional x86 architecture server computer with appropriate display, input devices and network connections. The machine monitor component may have a unique IP address, or may have specific-ports assigned thereto at a&shared IP address. In the preferred embodiment shown in FIG. 2A, the machine monitor 7 is another COM or DCOM object, described in further detail below with reference to FIG. 5;

In the preferred embodiment shown in FIG. 2A, the server computer 9.1 is preferably an x86 architecture computer running Windows NT and Windows NT Server with Internet Information Server (IIS), all available from Microsoft. Windows NT Server and IIS are run as subsequent standalone processes, and IIS is able to interpret script-embedding HTML pages, under the Microsoft standard known as Active Server Pages (ASP). IIS and ASP specifications and protocols are described in detail on the Microsoft Corporation website (microsoft.com). In this context, the "Web Server" is NT Server, and the "Application server" is IIS. Throughout this specification, a Web server 11 is considered to have both Web serving and application serving functions, but a division of functionality between the Web server deployed on one processor and the Application server deployed on another processor may be considered equivalent. For example, the interpretation of script-embedding pages may be performed at an Application server on an additional processor intervening between the web server 11 and database server 13, in which case the Web server would only serve pages assembled by the application server without interpreting their content, passing all HTTP requests on the Application server for page assembly.

In the embodiments, NT Server and IIS together provide one example of a Web server-Application server configuration considered to have dual functionality of the "Web server" 11 as described, and the combination may have one or more unique IP addresses corresponding to the combined server and user interface (application) serving component, or may have different ports at the same IP address. Active Server Pages, in their current incarnation, are platform independent, and may embed JScript/JavaScript, VBScript, Perl, or other scripts, which are interpreted by IIS on the server computer 9.1. The server computer 9.1 then performs whatever queries, calculations, and HTML page assembly is required, and serves an HTML page to the connected browser. At the same time, in, the first embodiment, the machine monitor 7 and Web server 11 run from the same server computer 9.1. In this manner, the number of processors required to collect and maintain data, and to respond to queries, is reduced. Nonetheless, each component is separately addressable via the network.

The DB server 13, in the preferred embodiment shown in FIG. 2A, is an additional x86 architecture computer on which is deployed an ODBC-compliant database, in this case, Windows NT, Microsoft SQL server and/or Windows NT Server (all available from Microsoft). The DB server also may be provided with a unique IP address, or may have specific ports assigned thereto at a shared IP address. Again, ODBC-compliant or other structured query database servers (E.g., JDBC-compliant, POS under CORBA) take many forms, and those having essentially the same or similar functions or interactions are considered equivalents (E.g., Oracle or Sybase, etc.). The DB server 13 responds to queries using standard SQL syntax under ODBC protocols. The database residing on the DB server 13 is a relational database having various tables, and is described in detail below with reference to FIG. 7.

The manager browser 19, having the same functions as previously described, is essentially identical to the operator browser 17.1, in physical architecture and connections, except that there is no need to run a VM component 5 on the same PC. Each browser, operator, manager, or otherwise, may have a unique IP address, or may have specific ports assigned thereto at a shared IP address. A difference between the manager browser 19 and the operator browser 17.1 is in the identity and access information stored and exchanged between the browsers 17.1 and 19 and the Web server 11—the Web server 11 responds differently to each browser 17.1, 19, depending on, the access and identity information of the browser 17.1, 19. The manager browser 19, as described below, is permitted a higher level of access to the database, and more and. different HTML, pages. are served to the manager browser 19.

The Web server 11, running on the server 9.1, is provided with an Internet connection 29.2 to the Internet 15 at large. Any Internet connection is sufficient, e.g., modem via PPP, ISDN, T1, ATM, cable modem, or the like. A "firewall" may be introduced to provide additional security at the facility without affecting the basic functionality of the system. The Internet connection 29.2 has sufficient bandwidth and speed to carry a suitable number of transactions, as the Web server 11 is responsive to HTTP connections via the Internet connection 29.2 as well as on the network 27.1.

As previously noted, from the Internet 15, remote users at an order desk browser 23.2 and manufacturer browser 21.2 have HTTP access to the Web server 11. The browsers 23.2 and 21.2 are essentially identical to the manager browser 19, in physical architecture, except that each is also provided with an Internet connection and IP address through which the browsers 23.2, 21.2 may access the Internet and thus the Web server 11. Again, a difference between the manager and operator browsers 17.1, 19 and the order desk and manufacturer browsers 23.2, 21.2 is in the identity and access information stored and exchanged between the various browsers and the Web server 11—the Web server 11 responds differently to each browser 17.1, 19, 23.2, 21.2 depending on the access and identity information of the browser 17.1, 19, 23.2, 21.2. The order desk and manufacturer browsers 23.2, 21.2, are permitted a tailored or limited level of access to the database, and different HTML pages are served to the order desk and manufacturer browsers 23.2, 21.2.

Figure 2B:
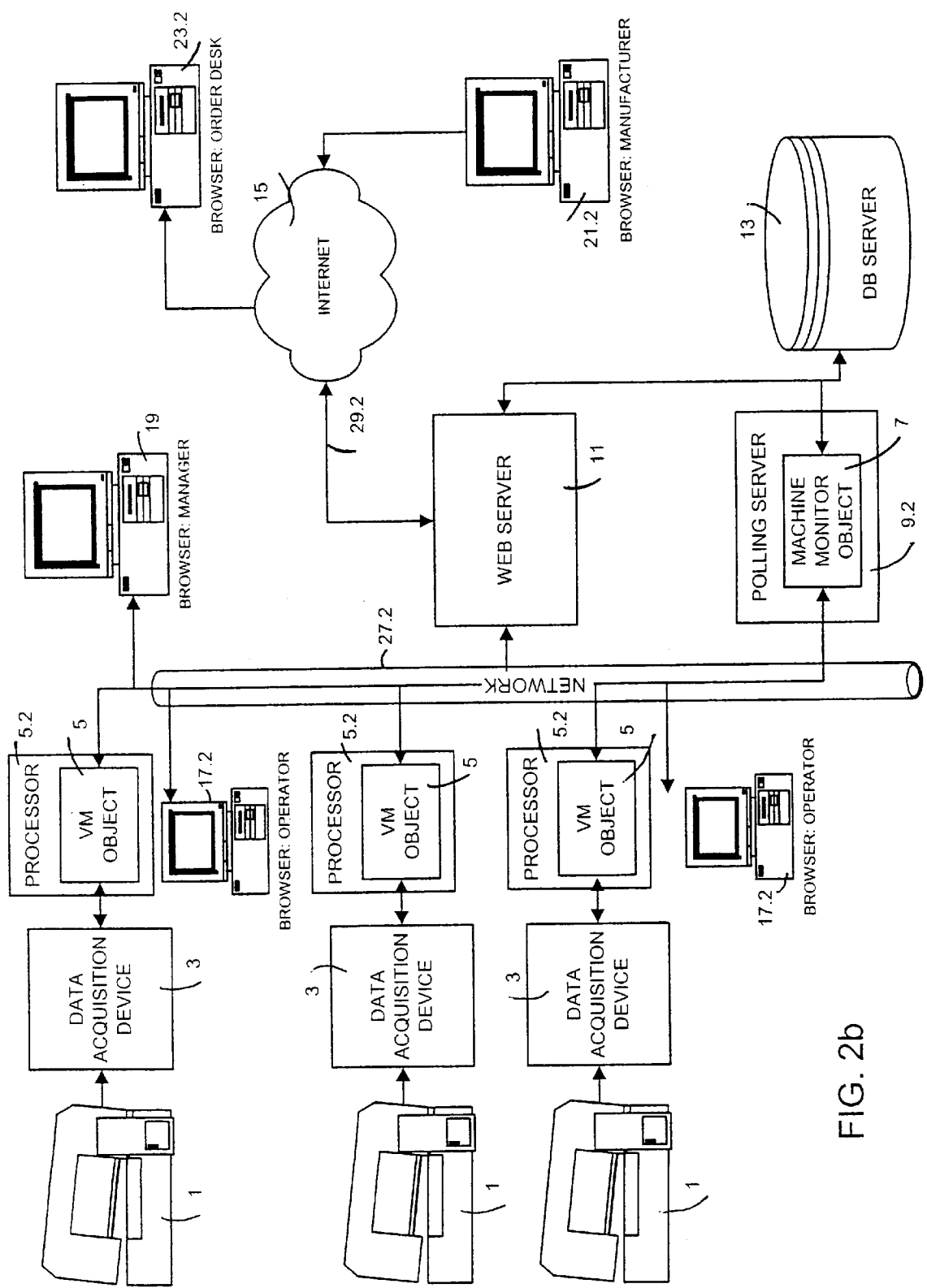
FIG. 2B shows a second embodiment of the system for management of cutting machines.

FIG. 2B shows a second embodiment of the system for management of cutting machines according .to the invention. In the case of FIG. 2B, the functionality of each component is the same as that of FIG. 2A. However, in FIG. 2B, each VM object or component 5 runs on a dedicated processor 5.2, and has a specific IP address. In this manner, the processor 5.2 need only have sufficient processing capability to handle a driver for the data acquisition device 3, the VM object 5, and a network connection. Such a processor could be an embedded system or single-chip microcomputer.

The operator browsers 17.2 are run from their own computers or stations—accordingly, one operator browser 17.2 may serve to monitor two cutting machines, indicated in FIG. 2B where the lower two cutting machines 1 are associated with by the lower operator browser 17.2. Moreover, the machine monitor component 7 is run on a dedicated computer (polling server) 9.2 with a unique IP address, as is the Web server 11 (also having its own IP address). The network connection to the DB server 13 is separate from a general-purpose network 27.2. In this manner, requests made to the Web server 11 via the Internet (29.2, 15) do not require that data be retrieved from the DB server 13 via the facilities general-purpose network 27.2. Accordingly, FIG. 2B shows that the components of the system are distributed and portable, and may be placed differently from FIG. 2A, such that the demands on internal resources and processors are balanced according to need. Other variations are possible.

FIG. 3 shows a schematic view of an instrumented cutting machine 1, and examples of instrumentation thereon. One candidate machine is the AMADA HA-700 horizontal bandsaw. The instrumented cutting machine is provided with sensors, detectors, relays, and limit switches, all of which are described below as detection channels.

It should be noted that the present system is applicable to any kind of cutting or processing machine that uses cutting or processing elements that wear and/or require periodic replacement, and that operates on raw or preprocessed workpieces—stock or parts—to form the workpieces to a desired size or shape. In the context of the present specification, a "cutting element" includes processing tools such as bandsaw blades, circular blades, reciprocating blades, jet heads or nozzles, laser heads or other high-energy heads, milling tools, grinding tools, drilling tools, etc. The bandsaw disclosed herein as a preferred embodiment is merely one example of a type of cutting machine to which the present invention may be applied. However, the present disclosure also describes features that have particular advantage for bandsaw machines, and the distinctiveness of bandsaw-specific features, e.g., with respect to other cutting machines, is not disclaimed as part of the invention.

The instruments (channels) of the instrumented cutting machine 1 generate monitor data. Monitor data, or "status", indicates data that is representative of physical conditions, signal level conditions, or other conditions, and is current or substantially real-time.

Channel D1 provides a power ON/OFF signal, and may be taken directly as a 1-bit digital voltage from the ON/OFF switch as AC current and stepped down. That is, if necessary, a step-down transformer and/or capacitor may be used to change AC power to, e.g., a 1-bit 24V digital signal. Accordingly, this channel provides a binary indication of whether the cutting machine 1 is turned on, or is off.

Channel D2 provides a RUNNING or IDLE signal, and may be taken as a 1-bit digital voltage directly from a RUNNING/IDLE light on the control panel of the cutting machine 1, or as stepped down AC current. That is, this channel provides a binary indication of whether the cutting element or saw blade is running or idle, i.e., whether the saw blade is moving or stationary.

Channel D3 provides an AUTO or MANUAL signal, and may be taken as a 1-bit digital voltage from an AUTO/MANUAL toggle on the control panel of the cutting machine 1. When the saw is in the manual mode, the machine stops as soon as the saw head reaches a lower limit position after, cutting the work. In the auto mode, feeding and cutting are automatic, so the saw feeds the work and cuts it to preset length. This channel provides a binary indication of the mode set on the cutting machine.

Channel D4 detects blade speed, and may be taken either from a blade speed setting potentiometer or a blade speed meter on the control panel of the cutting machine 1, either as an analog voltage level (subsequently A/D converted) or a multi-bit digital value. The output is therefore a variable value representative of the blade speed.

Channel D5 provides a blade tension signal, and may be taken from a blade tension setting potentiometer or a blade tension meter on the cutting machine 1, either as an analog voltage level (subsequently A/D converted) or a multi-bit digital value. The output is therefore a variable value representative of the blade tension, mechanically set at the cutting machine.

Channel D6 provides a contour status signal ("ROUND" or "SQUARE"), and may be taken as a 1-bit digital voltage from a "ROUND/SQUARE" toggle on the control panel of the cutting machine 1. Contour Status reflects the shape of the workpiece (round or rectangular), and changes cutting machine operating parameters depending on the status. The output is therefore a binary value representative of the Contour Status set on the cutting machine.

Channel D7 provides a descent speed signal, and may be manually input as a valve position at the operator browser 17, or taken from a valve position/descent speed setting potentiometer on the cutting machine 1, either as an analog voltage level (subsequently A/D converted) or a multi-bit digital value. In the preferred embodiment, positions of a flow control valve (FCV) and/or pressure control valve (PCV) on the head descent hydraulics determine the head descent speed of the saw, and these values may be manually entered into the database (e.g., by the operator).

Channel D8 provides a cutting rate (e.g., $cm^2$/min.) signal, and may be taken from a cutting rate meter on the cutting machine 1, either as an analog voltage level (subsequently A/D converted) or a multi-bit digital value. The output is therefore a variable value representative of the cutting rate as detected.

Channel D9 provides a cutting pressure signal, and may be taken from a cutting pressure regulating potentiometer on the cutting machine 1, either as an analog voltage level (subsequently A/D converted) or a multi-bit digital value. The output is therefore a variable value representative of the cutting pressure as set by the operator.

Channel D10 provides a cutting depth (cm) signal, and may be taken from a cutting depth preset potentiometer on the cutting machine 1, either as an analog voltage level (subsequently A/D converted) or a multi-bit digital value. The output is therefore a variable value representative of the cutting depth as set by the operator.

Channels D11 and D12 provide, respectively, hydraulic fluid level and cutting fluid level signals, and each may be taken from a 1-bit digital voltage from a high/low float limit switch in the fluid tanks of the cutting machine 1. Each output is therefore a binary value or a variable value representative of the fluid levels as detected.

Channel D13 and D14 provide, respectively, lower and upper (L and H) runout limit switch signals, and may be directly taken as 1-bit digital voltages from L/H runout limit switches or indicator lights on the control panel of the cutting machine 1. Each output is therefore a binary or alert value representative of excessive runout levels as detected.

Channel D15 provides a runout detection ON/OFF signal, and may be taken as a 1-bit digital voltage directly from a runout detection ON/OFF switch or indicator light on the control, panel of the. cutting machine 1. The. output is therefore a binary or alert value representative of the status-of the runout detector as detected.

Channel D16 provides a runout alarm ON/OFF signal, and may be taken as a. 1-bit digital voltage directly from a runout alarm indicator light on the control panel of the cutting machine 1. In general, the cutting machine is controlled such that all machine operations stop after the runout alarm is ON for approximately 90 seconds (when the H or L runout limit switches are tripped). The output is therefore a binary value representative of the runout alarm status as set by the operator.

Channel D17 provides an emergency stop status signal, and may be taken as a 1-bit digital voltage directly from an emergency stop button on the control panel of the cutting machine 1. The emergency stop button is an interlock switch that disables many operations of the cutting machine 1. The output is therefore a binary or alert value representative of the emergency stop status as detected, e.g., as set by the operator.

Channel D18, D19, and D20 provide status signals for the control panel door limit switch, front blade wheel limit switch, and rear blade wheel limit switch, and may be taken as 1-bit digital voltages directly from the limit switches on the cutting machines. Each of these limit switches is an interlock that disables selected functions of the cutting machine 1. Each output is therefore a binary or alert value representative of the limit switch status as detected.

Channel D21 provides a material position signal, and may be taken from a material position potentiometer on the cutting machine 1, either as an analog voltage level (subsequently AID converted) or a multi-bit digital value. The output is therefore a variable value representative of the material position as detected.

Channel D22 provides a vibration level signal or vibration alarm signal, and is taken from a vibration sensor provided on the workpiece vise and holding assembly, either as an analog voltage level (subsequently A/D converted) or a multi-bit digital value, or as a one-bit digital voltage for the: alarm. The output is therefore a variable value, or a binary or alert value, representative of the vibration level or an excessive vibration level, as detected.

Accordingly, monitor data is largely representative of machine status. Monitor data includes, as expressed in the above channels: settings for functions of the machines (e.g., runout limits); operating parameters of the machine indicating how the cutting element and machine will affect the material (e.g., decent speed, cutting pressure, cutting depth, contour status, blade speed, blade tension). Further, monitor data includes detections that indicate the load on the machine: control detections that indicate whether or not functions of the machine are active (e.g., On/off, running/idle, runout detect on/off); Alert/safety/alarm detections that, in general, will stop the machine (e.g., runout alarm, emergency stop, door limit switches, wheel limit switches, vibration alarm); status detections that provide feedback as to cutting or processing operation (e.g., cutting rate, vibration); secondary consumable levels that indicate remaining supplies (e.g., hydraulic fluid level, cutting fluid level); and material handling parameters that indicate the condition of the material in the machine (e.g., material position). From the monitor data and identifying data, usage data may be generated, e.g., blade usage (at least both running time and running area).

Figure 4:
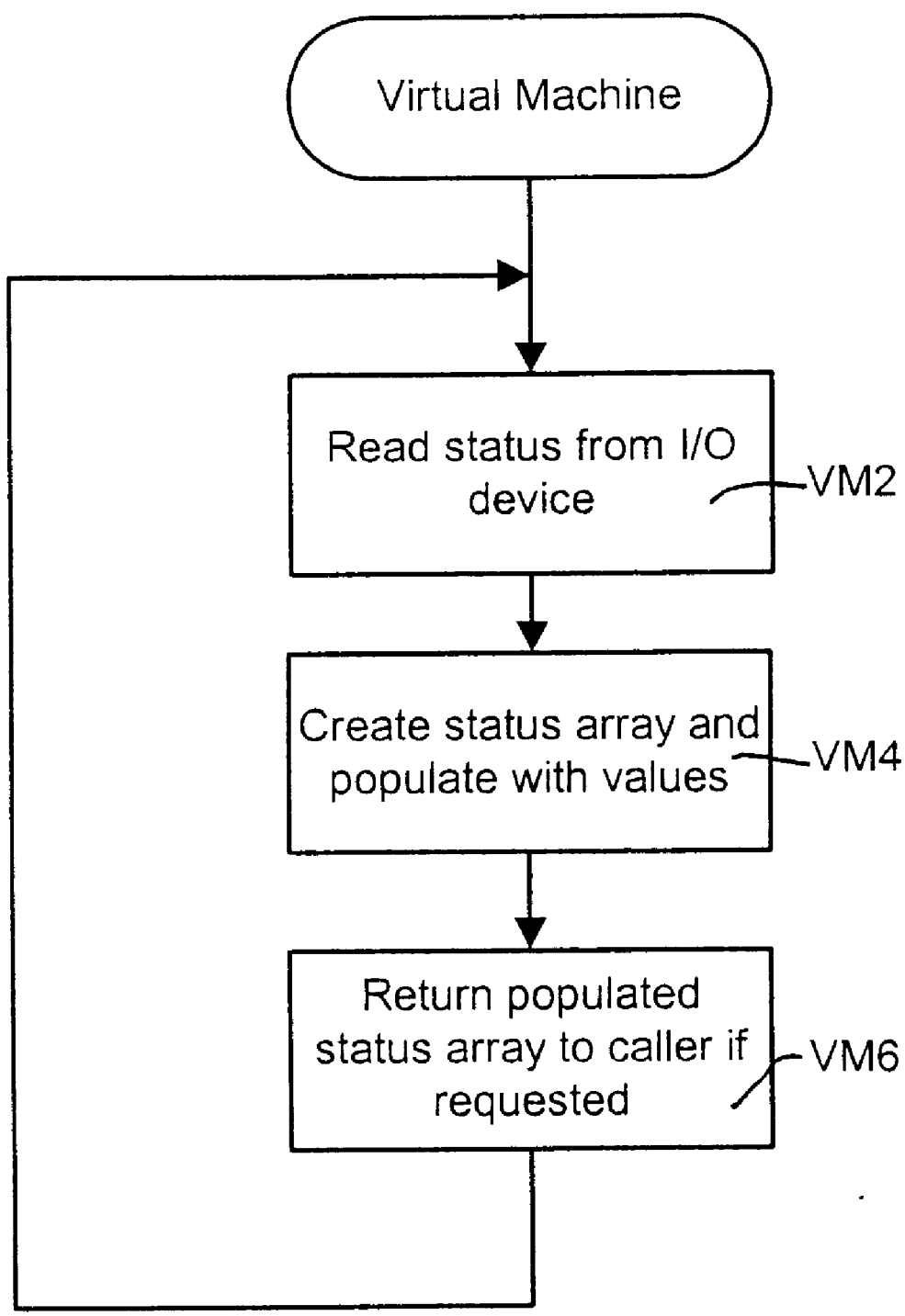
FIG. 4 is a flowchart showing process flow of a virtual machine (VM) component provided on a processor associated with the instrumented cutting machine of FIG. 3.

FIG. 4 is a flowchart representative of a distributed and portable (e.g., DCOM) object suitable for use as the VM object or component 5. One example of source code that implements a suitable VM object may be found in a section entitled CUTTING MACHINE (VIRTUAL MACHINE) in the Microfiche appendix, Appendix A. It should be noted that the VM components 5 are, in the present embodiment, created, modified, or instantiated by the machine monitor 7 as necessary, e.g., soon after a new cutting machine I is added and identifiers thereto are added to the database on the DB server 13.

The VM component 5 or "collecting object" is a standalone component object that reads data from sensors and, raw voltages, via the monitor input device (e.g., data acquisition card 3 and sensors/channels on the machine 1) and stores them until requested. The VM component 5 is thus connected to the machine 1 and to the MM component 7, and operates under self-control and control of the MM component 7. One VM component 5 per machine 1 is preferred, but a single VM component 5 could alternatively collect data from a subset of machines 1 (e.g., when a group of machines 1 is considered a working unit).

The process shown in FIG. 4 is repeated on a predetermined cycle, e.g., once every second. In step VM2, the VM component 5 reads the status of the I/O device, in this case filling a utility array with raw data from the data acquisition device 3.

In step VM4, the VM component 5 creates a status array that fits the parameters of the tables on the DB server 13, and populates the status array with the appropriate values.

In step VM6, the VM component 5 returns the populated status array of status information to a calling component (if the populated status array has been requested), in this case the machine monitor 7. The cycle then repeats.

Accordingly, the VM component 5 performs at least two functions: reading the status array of the cutting machine 1, and responding to requests for a new status array of status information.

Figure 5A:
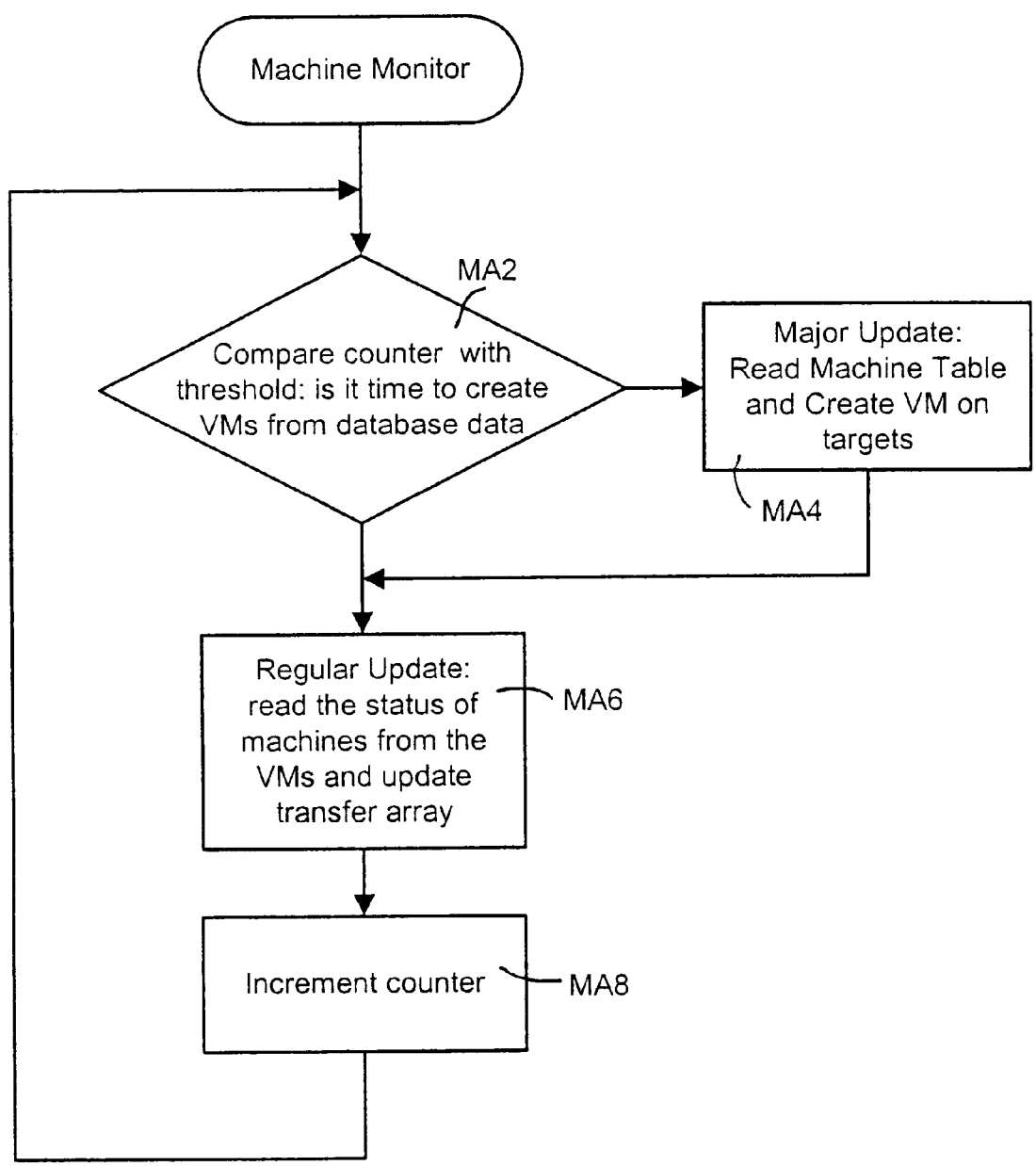
FIG. 5A is a flowchart showing process flow of a status array object of a machine monitor (MM) component provided on a server associated with one or more VM components as shown in FIG. 4.
Figure 5B:
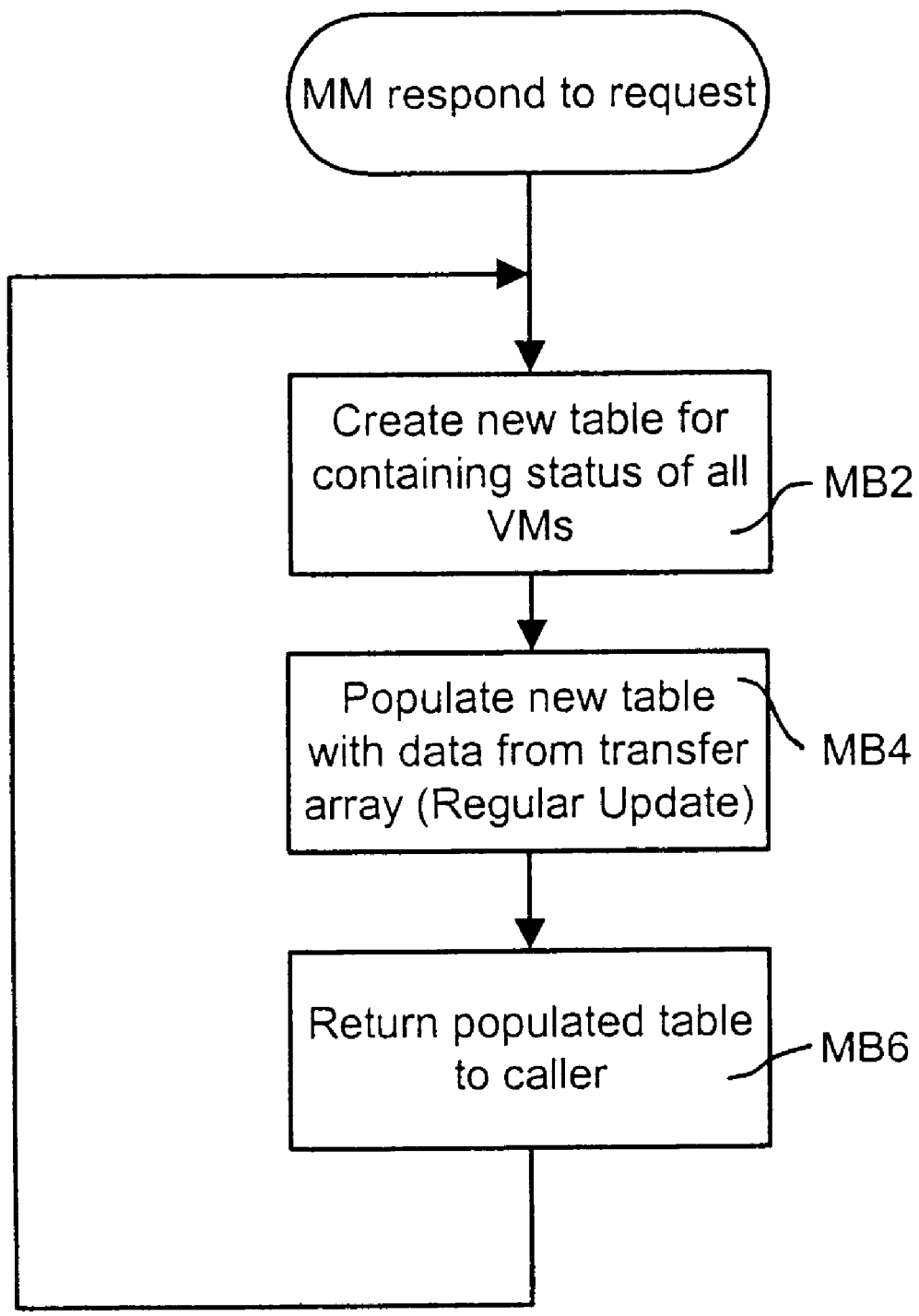
FIG. 5B is a flowchart showing process flow of a machine factory object of the MM component.

FIGS. 5A and 5B are flowcharts representative of a set of distributed and portable (e.g., DCOM) objects or a component suitable for use as the machine monitor (MM) component 7. One. example of source code that implements suitable MM component(s) may be found in a section entitled STATUS ARRAY & MACHINE FACTORY (MACHINE MONITOR) in the Microfiche appendix, Appendix A. The MM component 7 performs several functions: reading the status of all the cutting machines 1 (via the VM components 5), arranging the status information into a transfer array. of the appropriate format, minor, conversions to secondary data. for fields in the transfer array, and writing the transfer array to the database, and responding to requests for a new transfer array of current status information.

The MM component 7 is a standalone component object that polls the VM components 5 and forwards the data. The MM component 7 is thus connected to the VM components 5, to a user interface serving component (Web server 11), and to a database serving component (DB server 13). The MM component 7 operates under self control and control of the user interface serving component. A single MM component 7 is preferred, but more than one may be used, e.g., an MM component 7 for each of different groups of VM components 7 (e.g., when the capacity of a single standardized MM component 7 is exceeded).

The process shown in FIG. 5A (regular and major updating) is repeated according to two predetermined cycles, e.g., a first cycle for updating the database (e.g., every second), and a second cycle for creating VM components 5 at all the cutting machines 1 (e.g., every 100 cycles of the first cycle). The process shown in FIG. 5B (response to status request) is performed upon request.

In step MA2 of FIG. 5A, the MM component 7 checks a counter to see if the VM components 5 should be created or re-created on the processor at each cutting machine 1. The MM component 7 will, e.g., perform this operation every time the counter is divisible by 100.

If the counter has reached the threshold level, the logic branches to step MM4, where the MM component 7 reads the table of machines (e.g., referring to FIG. 6), including values (as described in detail later in the specification) of Machine_ID, Machine_Name, and Machine_IP (e.g., identity, name, and network address). Whether or not new machines have been entered in the table, the MM component destroys or overwrites existing VM components 5 on each candidate processor at each cutting machine 1, and writes and executes a new VM components at each machine 1 (each VM component having a unique identity and address). The MM component then returns to the main MM routine at step MA6 to update the tables.

In step MA6, the MM component 7 sends a request to every VM component 5 for a new status array of machine status. Upon receiving each status array, the MM component 7 stores the received status array, and augments, for each VM component 5 (each cutting machine 1), a transfer array of data corresponding to fields in the database. Minor status conversions and generation of secondary data values are done at this point—e.g., if the status of the cutting machine 1 changes from RUNNING to IDLE since the last cycle, the MM component 7 generates and records in the transfer array an END_TIME database table entry indicating the time and date at which the cutting machine 1 stopped running. Other secondary data is generated as necessary.

Depending on the characteristics of the records in the database, records may be overwritten (since they contain current status), but "historical records" (e.g., the time of a change in a status record, or the amount of time a status record has-remained unchanged) may be written as new records.

In step MA8, the MM component 7 increments the counter, and the process is repeated.

In step MB2 of FIG. 5B, the MM component 7 creates a new table that is suitable for containing the status of all the machines 1.

In step MB4, the MM component fills the table with the most recent results of the regular update (e.g., step MA6). In step MB6, the MM component returns the table to the requester—in most cases, the Web server 7.

Figure 6:
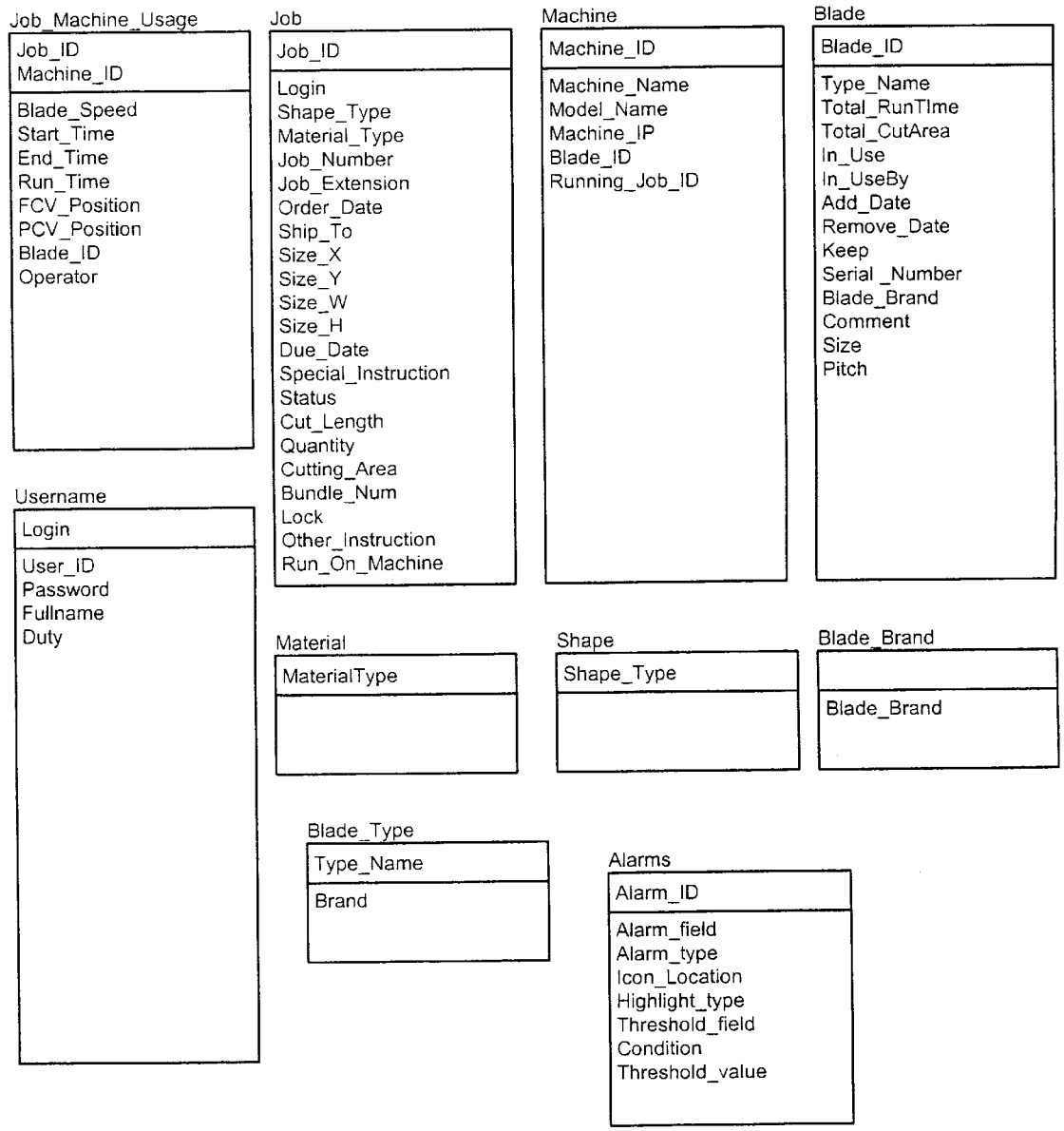
FIG. 6 shows an exemplary table structure for a database.

FIG. 6 shows an exemplary table structure of a relational database permitting the storage, association, and querying of data indicating cutting machine, job, and other relevant status. As is common practice in the art, underscore blanks are used in variable names to indicate a contiguous variable, record, or field name, as distinguished from a description thereof The database serving component(e.g., DB server 13 in FIGS. 2A or 2B) is a standalone program that maintains the database. The database serving component reads and writes to the database, maintains relations between records and fields, copies and mirrors values between associated fields, generates data in some fields based on functions and the contents of other fields, responds to queries by searching according to specified condition, and organizes or sorts results before returning them. The database serving component, in general, takes no action on its own in this case, but could be set to archive, collate, rationalize data on preset conditions or timer. The database serving component is connected to the MM component 7 and the user interface serving component (e.g., Web server 11). The database serving component generates data based on inputs, and therefore is considered to combine and relate the monitor data and identifying data to create usage data.

Identifying data is data that outlines the characteristics of machines, jobs, users, and cutting elements or tools. Identifying data includes names, dates, descriptive information, characteristics, and instructions. Identifying data also includes relationships between the machines, jobs, etc. Identifying data is typically input by a user manually, but can be generated or assigned default values. Identifying data does not usually include the current status data or monitor data.

Core tables include Job, Machine, Blade, Username, and Job_Machine_Usagetables. "Core table" does not indicate that a table is necessary, merely that it is preferred.

The Job table includes information relating to specific Jobs. A Job is a work assignment for a specific product configuration to be produced. The records in the Job table are preferably primarily indexed on a Job_ID field, which is assigned a unique code when a record is created. Fields in the Job table include:

Login—records the user who created the job, and taken from the Login field of the Username table at the time of job creation;

Shape_Type—records the shape of the material to be processed, and is limited to entries in an editable secondary look-up table (Shape);

Material_Type—records the material to be processed, and is limited to entries in an editable secondary look-up table (Material);

Job_Number—records a job number for identifying the job in the work schedule and other records;

Job_Extension—records a job extension, modifying or type/class information, for identifying the job;

Order Date—records the date on which the job record is entered into the system;

Ship_To—records the destination of the processed product to be delivered;

Size_X, Y, W, H—records physical dimensions of the material to be processed;

Due_Date—records the date upon which the job is to be finished for delivery;

Special_Instruction—records any additional comments to be brought to the attention of a person reviewing the job record;

Status—records the current status of the Job, and is limited to values of Waiting (i.e., entered in the system but not yet started, or interrupted); Processing (i.e., currently being processed on a cutting machine); and Completed (i.e., completed and ready to ship);

Cut_Length—records the length to which workpieces will be processed;

Quantity—records the number of pieces to be produced;

Cutting_Area—records the cross-sectional area of the material, and may be calculated from the Size_# dimensions or may be directly input;

Bundle Number—records the number of material pieces in a bundle to be simultaneously cut;

Lock—records whether or not the record may be (or, alternatively, the locked or unlocked status) altered by a lower level of access privilege (i.e., whether an operator may change the record, or only a manager);

Other_Instruction—records additional processing instructions to be reviewed by an operator; and Run_On_Machine—records the Machine_ID of the machine upon which the Job is to be processed, and is limited to Machine_IDs in the Machine table.

The Machine table includes information relating to cutting machines in the facility. The records in the Machine table are preferably primarily indexed on a Machine_ID field, which is. assigned a unique code when a record is created. Fields in the Machine table include:

Machine_Name—records the name or number of the cutting machine as commonly known in the facility;

Model_Name—records the type or model of machine by, e.g., model name or manufacturer and product code;

Machine_IP—records a unique (static) IP address on the network for addressing the machine. That is, the VM component 5 for the corresponding machine I may be addressed and communicated with at the IP address for that machine.

Blade_ID—records the blade currently installed in the machine, and limited to Blade_ID entries in the Blade table; and Running_Job._ID—records the Job currently being processed on the cutting machine, and limited to Job_ID entries in the Jobs table. It should be noted that in the embodiment, only one job is assigned to each machine, but the use of multi-value fields, e.g., in Run_On_Machine in the Job table and Running_Job_ID in the Machine table would permit jobs to be shared between machines or machines to process more than one job.

In the context of cutting machines, blades or other cutting elements are a unique consumable resource. They encounter wear, degradation, and failures due to heat, stress, fatigue, overload, or accumulation of cuttings or other byproducts. Different types, brands, and lots of cutting elements perform differently. At the same time, the same cutting element will perform differently on properly configured machines and on those that are not. Accordingly, the reason that a cutting element fails or needs to be replaced, and lifetime of each cutting element, or time between failures, are important, since they offer useful data as to the machine and blade performance as well as to whether the appropriate cutting program was chosen. Moreover, cutting elements can be returned to inventory and reused on another job or machine if still of acceptable quality.

Of course, a "cutting element" can be a bandsaw blade, circular blade, or reciprocating blade, a mill or drill bit, a nozzle or pressure head, or a laser or other high-energy cutting head. The Blade table includes information relating to blades in inventory, in use, and after use in the facility. The records in the Blade table are preferably primarily indexed on a Blade_ID field, which is assigned a unique code when a record is created. Fields in the Blade: table include:

Type_Name—records the blade type (e.g., the model name), and is limited to entries in an editable secondary look-up table (Blade_Type: Type_Name;

Total_RunTime—records accumulated hours in operation of each blade;

Total_CutArea—records cumulative cut area (cross-sectional) of each blade;

In_Use—records whether or not the blade is currently in use;

In_UseBy—records the machine in which the blade is installed if in use, and is limited to Machine_ID entries in the Machine table;

Add_Date—records the date that the blade record was added to the Blade table;

Remove_Date—records the date that the blade was removed from service;

Keep—records whether or not the blade is still good for service when removed;

Serial_Number—records the serial number of the blade;

Blade_Brand—records the blade manufacturer, and limited to entries in an editable secondary look-up table (Blade_Type: Type_Name: Brand);

Comment—records, e.g., reasons why the blade was removed from service;

Size—records the size of the blade; and

Pitch—records the tooth pitch of the blade.

The Usemame table includes information relating to users of the system. The records in the Username table are preferably primarily indexed on a Login field, which is assigned a unique code when a record is created. Fields in the Username table include:

User_ID—records a unique user name for login to the system;

Password—records a password corresponding to the User_ID, for login to the system;

Fullname—records the fill name of the user for display and reporting purposes; and Duty—records the access level or user privileges of the user, corresponding to the user's job responsibilities.

Usage data, as described below, is generated or input directly, and reflects the usage of resources (Machines, Blades, Users with respect to Jobs). Accordingly, usage data can include status or monitoring data, if that particular monitoring data indicates how the resource: was or is. being used. The usage data also includes cumulative or historical data, which can extend between periods in time (including to the present), or indicate a status at a point in time.

The Job_Machine_Usagetable includes information relating to current Jobs actually running on a cutting machine in the facility. The records in the Job_Machine-Usage table are preferably primarily indexed on both of a Job_ID and Machine_ID field, which correspond to those in the Job and Machine tables. Since processing Jobs are processed on a machine, every currently processing Job will have both a corresponding Job_ID and a Machine_ID. Fields in the Job_Machine_Usage table, although not shown in FIG. 6, may include fields corresponding to all the detection channels D1–D22 (as shown in FIG. 3), which are updated with the status of those channels as described below. In the table, those fields having the same name as the above-described channels D1–D22 contain updated values for detection on that channel. When the channels detect binary, On/Off or True/False values, the fields may be boolean, and when the channels detect variable values, may be integer or floating point fields. In addition to the channel fields, the Job_Machine_Usagetable includes fields as follows:

Start_Time—records the most recent time when a specific Machine and Blade is started;

End Time—records the time at which a specific Machine and Blade is stopped. This information may be blank if the machine is still processing.

Run_Time—records accumulated running time of a machine in the current running session, and is reset for a new Start_Time. Run Time stops increasing when the machine is stopped.

Blade_ID—records the blade in use for the current job/machine combination, and limited. to Blade-ID entries in the Blade table.

The Alarms table includes information relating to alarms (alerts or highlights) set by a user. The records in the Machine table are preferably primarily indexed on a Alarm_ID field, which is assigned a unique code when a record is created. Fields in the Alarms table include:

Alarm_field—records the field upon which the system will apply an alert or highlight when that field appears on a user interface or page;

Alarm_type—records whether the alarm is a highlight or alert-type alarm;

Icon_location—for an alert, records the location of the alert as appended to the page (e.g., top, bottom, separate frame);

Highlight_type—for a highlight, records what manipulation of existing display information will be performed (e.g., styled, colored, blinking, or colored background text, or a colored icon);

Threshold_field—records the field which will be checked against specified conditions in order to trip an alarm;

Condition—records the condition upon which the Threshold_field will trip the alarm (>, <, =, includes, etc.); and Threshold_value—records the value against which the Threshold_field will be compared to trip the alarm (numeric or text value, or "conflict" having job allocation or other conflict rules, as discussed in brief below).

In addition, several lookup tables are used to store lists of possible field entries. In this regard, Material, Shape, Blade_Type, and Blade_Brand look-up tables are provided. These tables are editable, and are used-to list-entries that may be selected, e.g., from a list. Accordingly, the database maintains-records of Job, Machine, Blade, User, and current status properties. As described in detail below,: the database can be displayed in part, queried, or events conditioned on the content of the database.

Figure 7:
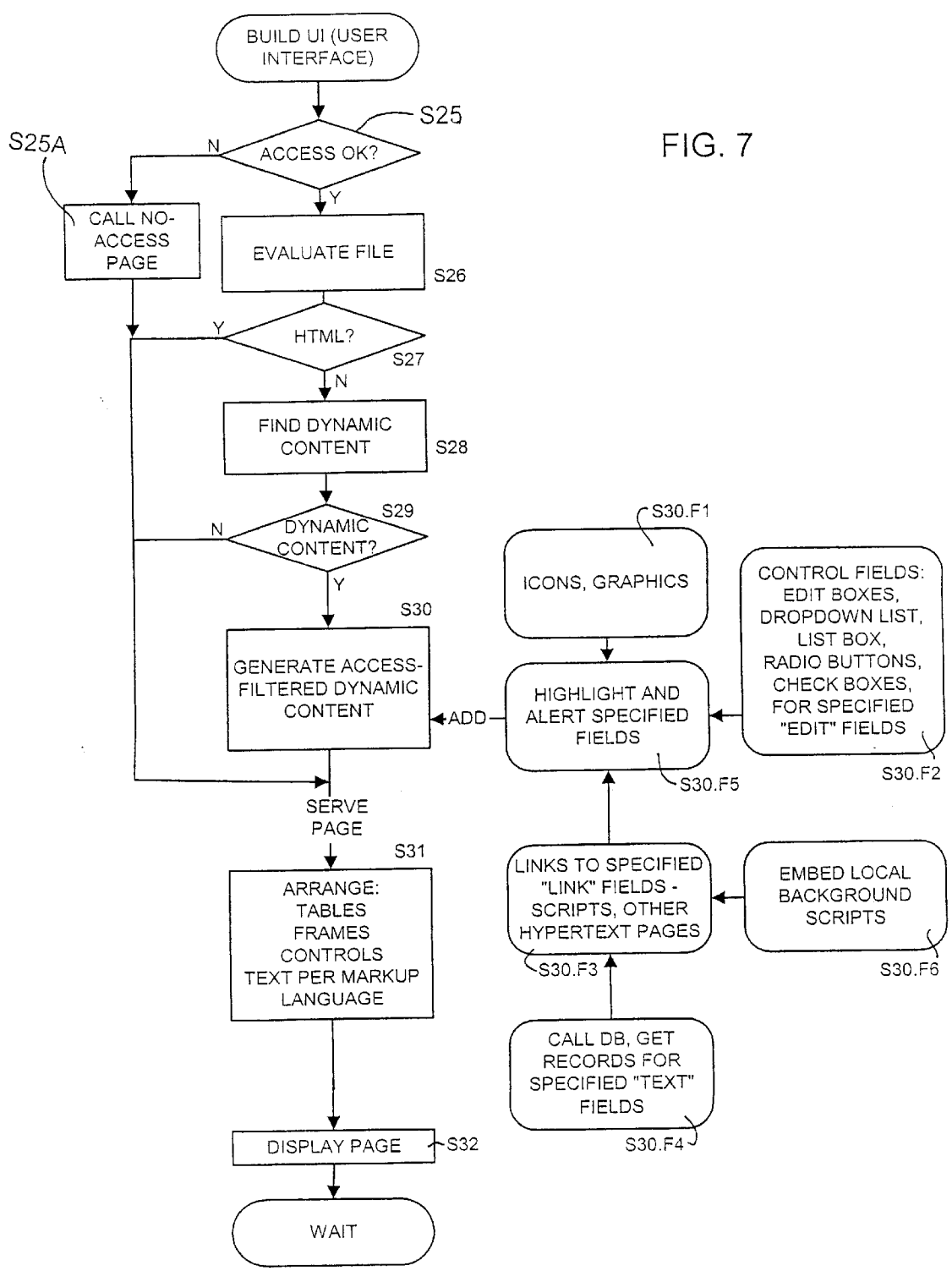
FIG. 7 is a flowchart showing process flow of a routine to dynamically generate a user-responsive dynamic mark-up document in the system.

FIG. 7 shows the operation of the user interface serving component—Web server 11 as shown in FIGS. 2A and 2B—in building and serving a dynamic content page. As noted above, the Web server 11 is preferably a Windows NT server with Internet Information Server, but may be any alternative Web server 11 able to interpret dynamic mark-up documents on the server 11 side, and may be run on any suitable platform. The server 11 software enables dynamic content and database connectivity. In the preferred embodiment, a "Web server" is used, but any device capable of serving flexible and dynamically changing user interface elements to a responsive client, as well as interpreting instructions embedded therein, may be considered equivalent.

The user interface serving component (e.g., Application or Web server 11) is a standalone program that controls how a user interface is presented to a client, and also does most of the work of analysis, also known as an "Application server". The user interface serving component is connected to the MM component 7 and to the database serving component (e.g., DB server 13), and to clients (e.g., browsers 17, 19, 21, 23), and can retrieve status data from the MM component 7, identifying data from the database serving component, and usage data from the database serving component, or can generate usage data. The user interface serving component is self-controlled and also responsive to client instruction. Depending on the client instruction and modifying conditions, including the retrieved data itself, the user interface serving component generates dynamic content. The dynamic content may present further choices for the client.

Dynamic content or dynamic interactive:user interface elements present data to the client differently depending on conditions. The data presented also include further choices for generating dynamic, content. Some conditions (not an exhaustive list) are user access level, query conditions, alarms and functions operative on retrieved data, the amount of retrieved data, or whether dependent data exists. The dynamic content operates by fundamental rules, e.g., the served content will not be completely variable. Base rules and conditions include titles shown on the page, the output format for data to be shown. The appearance of the output is not critical. E.g., given an instruction with or without conditions, the dynamic content output depends on inputs and rules, and the output is formatted appropriately in any acceptable appearance format.

This routine summarizes steps taken in dynamically building an hypertext page to be served to a client browser, and steps taken when a user at the client browser interacts with the page. In this sense, the "build UI" routine represents distributed actions taken at both the server and client. The routine generally reflects the "build UI" subroutines of FIGS. 8A, 9A, 10A, 11A, 12A, 13A, 14A, 15A, and 16A, although in each figure, some discrete functions are shown specifically. Source ASP code that implements suitable user interfaces (UI) may be found in the Microfiche appendix, Appendix B. It should be noted that several routines in Appendix B of the Microfiche appendix constitute "include" files that are included in other UI implementations or initialization routines that precede others, e.g., string_utils.inc; std_include.inc; string_const.inc; db_constant.inc; and global.asa.

In step S25 (FIG. 7), the Web server 11 examines the Duty field of the Username: Duty record entry corresponding to the logged-in browser. Each set of user interfaces described hereinafter is set with an appropriate duty level. For example, an Add User page, described below with reference to FIGS. 15A–15C, may be permitted only to those users with Administrator duty. As another example, a set of Job Order pages, described below with reference to FIGS. 9A–9E, may be permitted to both of Administrator and Supervisor duty, but. not to Operator: Duty. If the user's (client browser's) access level (Duty) is suitable, control proceeds to step S26. If the access level is forbidden, control proceeds to step S25A, where a simple page or notification is retrieved and served to the client.

In steps S26 and S27, the Web server 11 looks at the file extension of the file to be served to the requesting browser. For ASP, if the file extension is, e.g., .html or .htm, (indicating that the file is a static HTML page), the Web server 11 passes the file to the requesting browser (S31), and loops back to wait for the next request (not shown).

However, if the file incorporates code segments to be interpreted by the Web server 11, (in the ASP regime, this is indicated by a filename ending in, e.g., .asp or .asa) the Web server 11 opens the file and looks for tags marking server-side code or embedded scripts (S28). For ASP, each portion of ASP code or embedded script will be surrounded by "<%" and "%>". It should be noted that if no code or scripts are found therein, even though the extension indicates dynamic content, the file is served as a standard HTML page (step S29 passing control to step S31).

If tags are included, the Web server 11 evaluates the code (S30), takes any appropriate action, e.g., replaces the code with HTML code and included dynamic content. It should be noted that the fields and records to be served, similarly to the pages themselves as described above, are filtered according to access level (e.g., the Duty field of the Username table associated with the currently logged-in user/browser). In this manner, for example, pages used for editing may be used merely for display by disabling links for "Save" or "Confirm" as described herein below. In general, more sensitive information filtered out and editing capabilities disabled for lower access levels (e.g., Operator), while higher access levels (e.g., Supervisor, Administrator) will permit more editing capabilities.

In the context of the present specification, the page building portion of a "build UI" routine (e.g., FIGS. 8A, 9A, 10A, 11A, 12A, 13A, 14A, 15A, and 16A, and corresponding and similar routines, although unshown, for the remaining described "Detail" pages) is carried out according to the dynamic content code (e.g., ASP) in the relevant "page". As it is the information content, and not the "page" layout or aesthetic design, which is significant, the discussion in the present specification of user interface is limited to inputs, outputs, and actions taken, although examples are given for some "page" layouts. In the "build UI" routines discussed hereinafter, at least six kinds of information are used as inputs and outputs (Text, Highlights, Alerts, Edit, Links, Scripts).

In each drawing representative of a "build UI" operation, the displayed information is shown in round-corner boxes connected to the "build UI" operation. "Text" information includes uneditable text or graphical output information (S30.F4, S30.F1). For example, a word, number, or graphical representation (icons, etc.) of data is served to the user. "Highlights". and "Alerts" refer to additional indicators that another piece of information is of importance. Examples include flashing, change in color, appended banners, sounds, etc. In the present specification, "Highlight" is used to indicate modifications of other information, while "Alerts" is used to indicate additional information added. For example, "Highlights" would include, e.g., a change in color of "Text" or "Links", or emphasis of an "Edit" box (to indicate missing information), while "Alerts" would include headline banners or added text (S30.F5). "Edit" information refers to blank fields to be filled with text information by the user, or to lists of information from which one or more elements are to be selected. Lists may be expressed in many ways; standard methods include drop-down menus, "radio" buttons, check boxes, or text list boxes (S30.F2). "Link" information refers to underlined text, buttons, or icons that are responsive to selection by the user to prompt additional action (S30.F3). "Script" information refers to embedded scripts (code segments) in the served page (S30.F6), which may be, e.g., run on the browser in an event-driven fashion (e.g., when a link is clicked, a timer expires, a value meets a condition), or continuously run in an invisible (undisplayed) frame. An invisible frame may be used to continuously update or refresh a user interface (as described below with reference to FIG. 17)

The resulting file, dynamically assembled, is passed to the requesting browser, considered a user interface interpreting component. The user interface interpreting component only shows the dynamic content to the user, and responds to user interface serving component operation, interpreting action taken with respect to the shown user interface and passing on the instructions to the user interface serving component (Web server 11). The user interface interpreting component (client browsers) accepts link activation and data input. Data input is forwarded to the user interface serving component (Web server 11) in the format specified by the served user interface, and links indicate some action to be taken by the user interface serving component (Web server 11). If action is taken locally, the user interface serving component (Web server 11) can be considered to have a portion of its functionality distributed to the user interface interpreter location—e.g., the user interface interpreter (client browser) incorporates a limited-function user interface serving component (capable of running local scripts or routines).

In step S31, the browser arranges the page as specified in the received markup code. In step S32, the page is displayed, and any necessary scripts specified to run as the page is served are run on the browser side. It should be noted that "page" does not necessarily mean a full-screen page; structured markup languages such as HTML permit several pages to displayed simultaneously (e.g., in frames), or, as noted, displayed "invisibly" (a hidden frame that carries out a-specified-function).

Figure 8A:
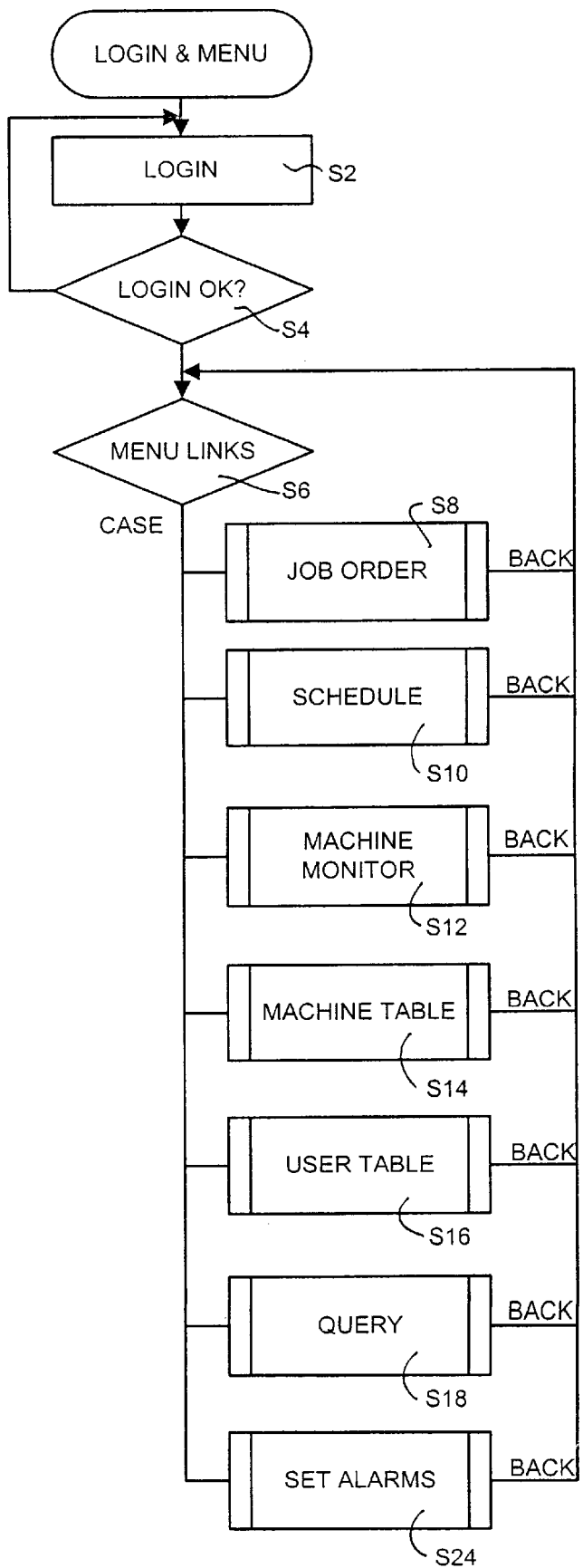
FIG. 8A is a flowchart showing process flow of a login and menu main routine of the system.

FIG. 8A shows an exemplary flow for the process in which a login and menu page (preferably framed) is assembled and served to-a requesting browser, and in which the Web server 11 creates links for further action. Examples of source ASP code and scripts that implement a suitable login and menu interface and responsive structure may be found in the Microfiche appendix, Appendix B, as login.asp; verify_login.asp; logout.asp; session_expired.asp; setup_main_frame.asp; global_nav.asp; mainview.asp; and nav.js.

Figure 8B:
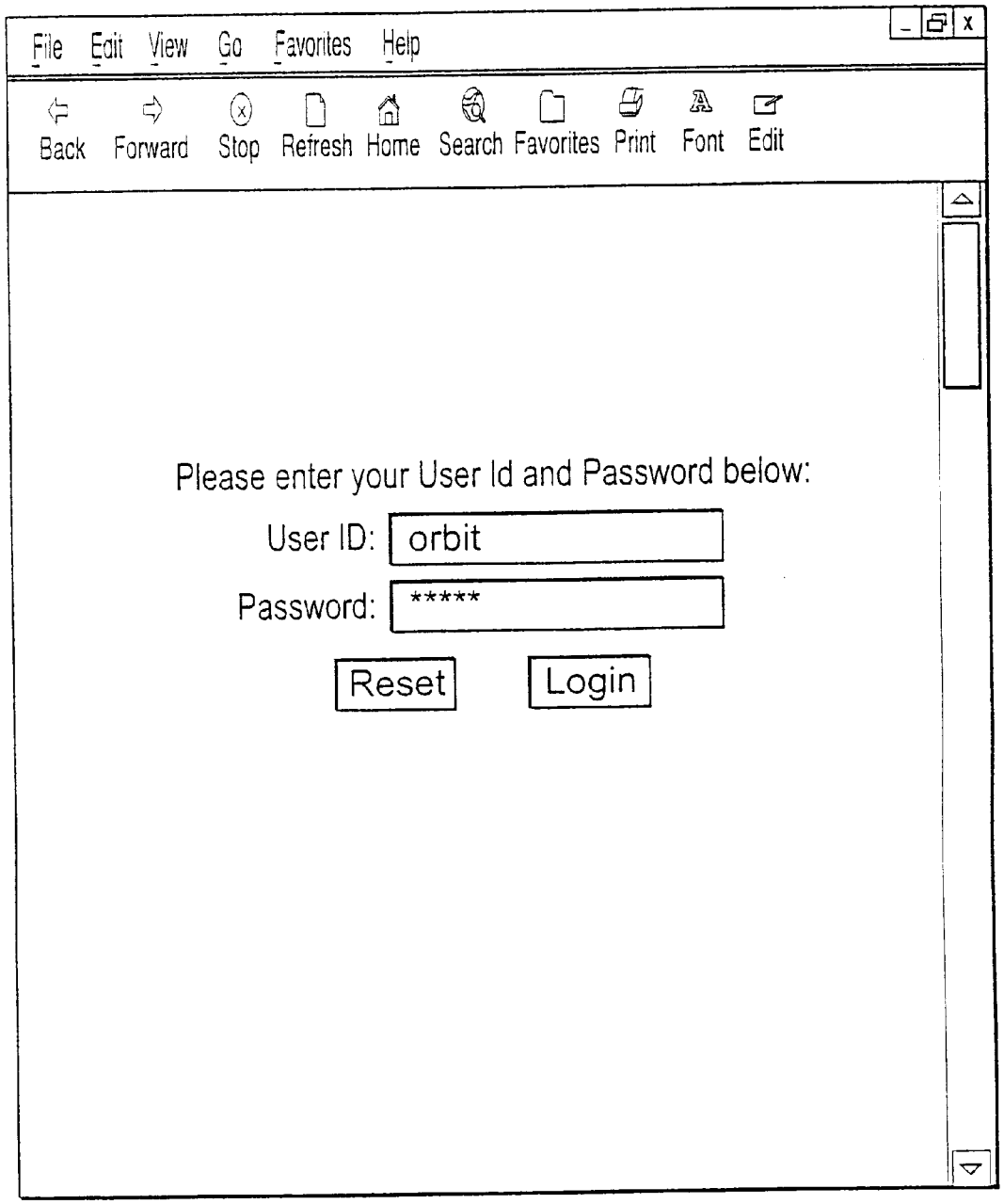
FIG. 8B shows an exemplary user interface generated by the login and menu routine of FIG. 8A.

In step S2, a "home page" user interface is presented to the client browser for login purposes. An exemplary page is shown in FIG. 8B. It should be noted that a client browser inside a facility will have the IP address or URL of this page set as the "home page" on the browser software, and that a client browser outside the facility can access this page via an appropriate HTTP address, theoretically from anywhere in the world (under the constraints of whatever security and firewall provisions are taken at the facility). The login interface presents fields for User_ID and Password.

In step S4, an entered User_ID and Password are compared against valid entries in the Username table. If the-user is permitted access, control proceeds to step S6. If a matching user record does not exist, the login screen is again presented. Of course, after a suitable number of retries, the system may be set to reject further access attempts.

When the user is permitted access, the browser at that IP address will be considered to have an access level according to the corresponding Duty field in the Username table. This access level is used to limit the served pages and limit the served fields on pages. E.g., users, supervisors, and external parties have different duties and access levels. An administrator duty will permit access to virtually all parts of the system.

In step S6, a user interface with appropriate menu links is served. The menu links are preferably presented in a secondary frame that remains active at the client browser even when other pages are requested. FIG. 9B, which shows a job order user interface, also shows appropriate menu, links. along the left hand side. When one of the links is activated, the appropriate routine is called, e.g., the appropriate user interface is requested from the Web server 11. Steps S6–S24 can therefore be considered to be continuously available to the user via the frame, and any other routine may be interrupted by activating one of the links described therein (as the browser sends a new http request to the Web server 11, interrupting most processing in progress. Step S8 requests a job order routine, as discussed below with reference to FIG. 9A. Step S10 requests a schedule routine, as discussed below with reference to FIG. 11A. Step S12 requests a monitor routine, as discussed below with reference to FIG. 12A. Step S14 requests a machine table routine, as discussed below with reference to FIG. 14A. Step S16 requests a user table routine, as discussed below with reference to FIG. 15A. Step S18 requests a query routine, as discussed below with reference to FIG. 16A. Step S24 requests a set alarm routine, as discussed below with reference to FIG. 11A. In each case, control loops back to the menu link step S6.

Figure 9A:
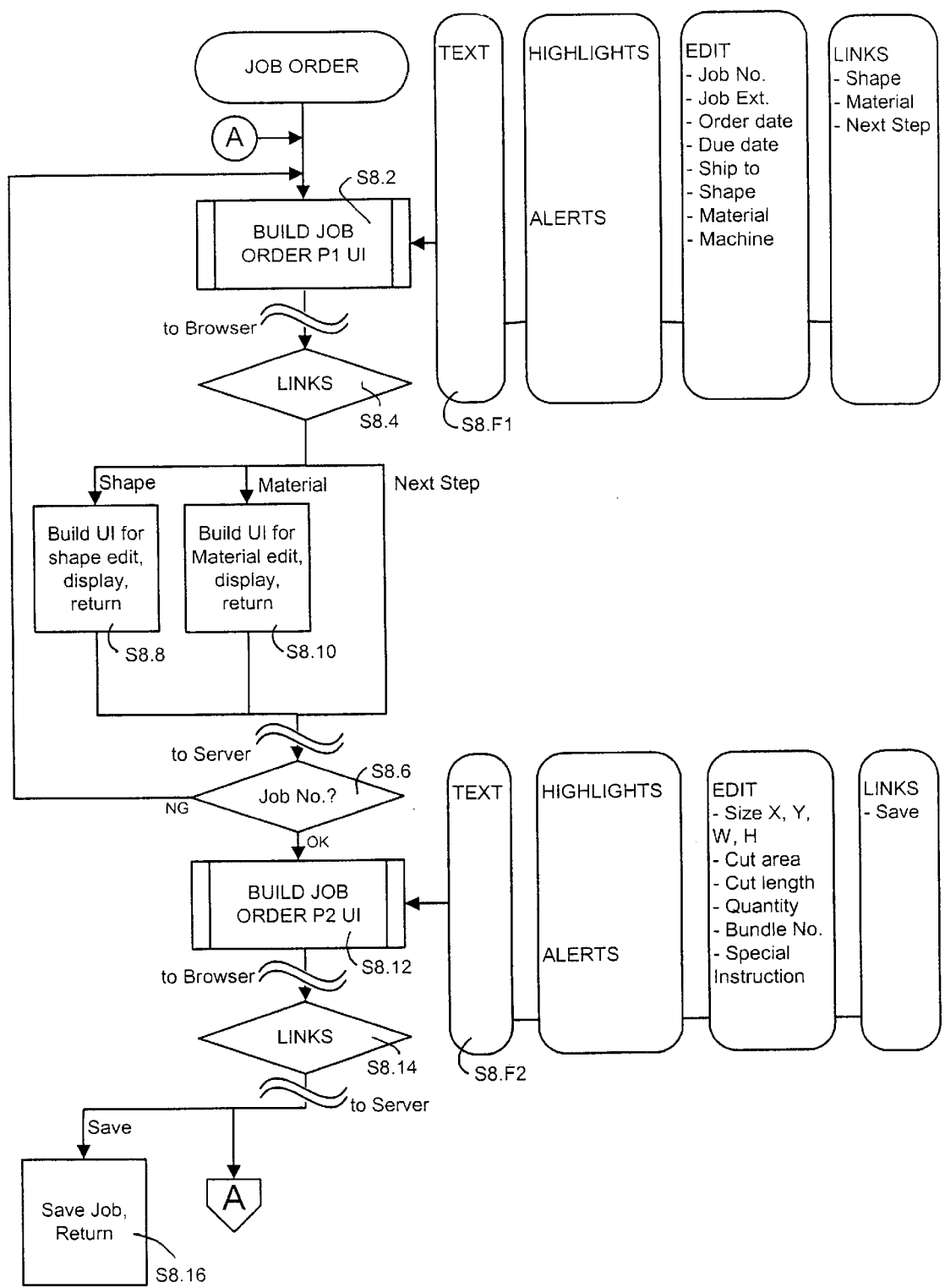
FIG. 9A is a flowchart showing process flow of a job order routine of the system.
Figure 9B:
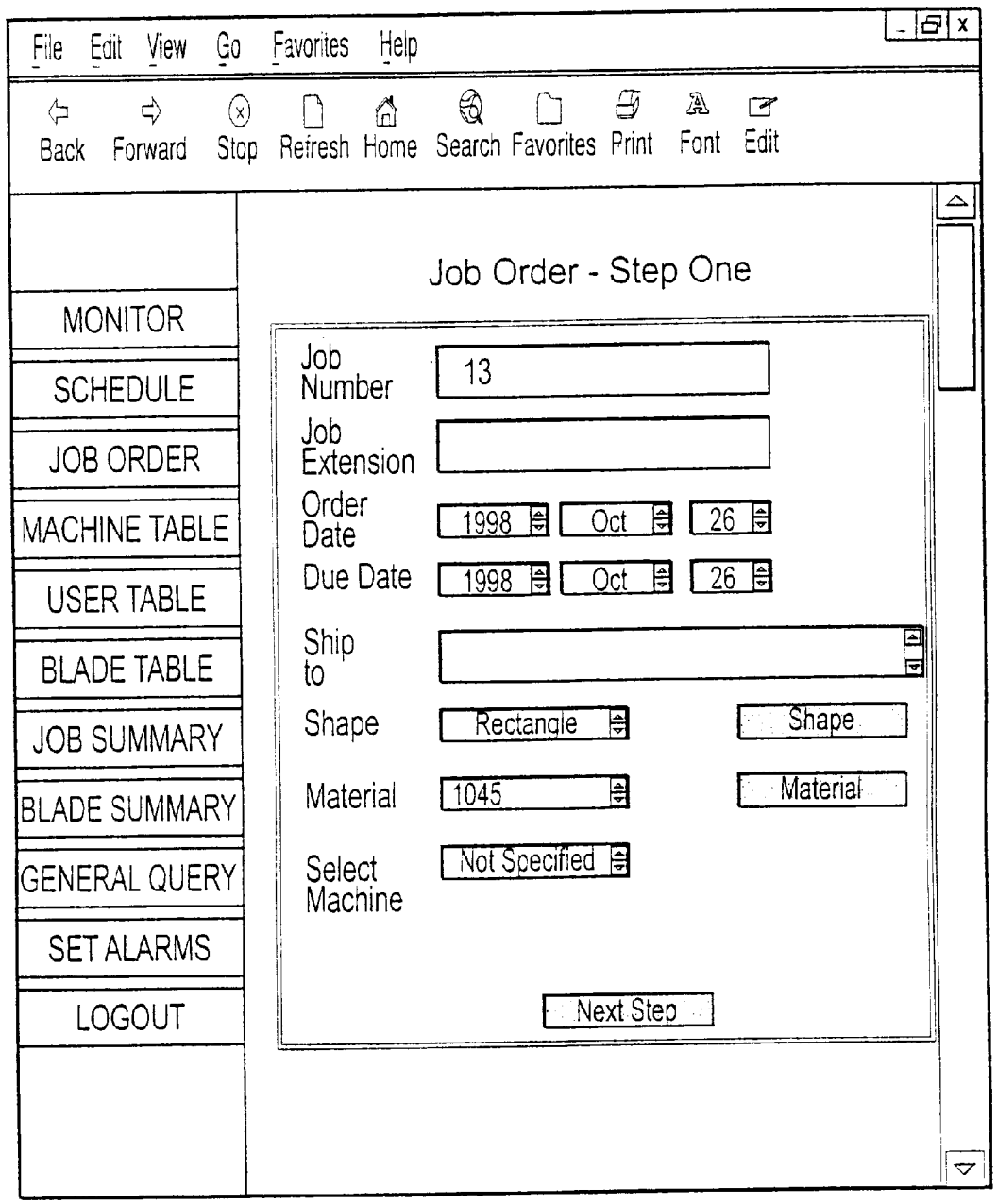
FIG. 9B shows a first page of an exemplary user interface generated by the job order routine of FIG. 9A.

FIG. 9A shows an exemplary flow for the process in which a job order page is assembled and served to a requesting browser, and in which the Web server 11 creates links for further action. Examples of source ASP code and scripts that implement a suitable job order interface and responsive structure, similar to that in FIGS. 9A through 9E, may be found in the Microfiche appendix, Appendix B, as edit_job.asp; edit_job1.asp; sd_edit_job.asp; edit_shape.asp; sd_edit_shape.asp; delete_shape.asp; edit_material_type.asp; new_material_type.asp; delete_material_type.asp; and sd_edit_material_type.asp.

It should be noted that the embodiment is a distributed system, and processing takes place at various sites, in the system. Accordingly, although the descriptive flowcharts herein show a continuous flow of logic and processing events, the flowcharts are further marked with indications of where processing is handed from processor to processor; e.g., from the Web server to a browser, from the browser to the database, etc.

In step S8.2, a build job order user interface (UI) routine, specifically for building a first page of user interface for the job order, is executed. The "build UI" routine generally corresponds to the routines discussed earlier in the specification with reference to FIG. 7 After the "build UI" routine is complete, the completed file is served to a browser that interprets its content as a form having the denoted information. An example of the appearance of a suitable form appears in FIG. 9B. As noted, "Edit" fields are provided for, corresponding to fields in the Job table (database tables in FIG. 6), Job Number (Job_Number), Job Extension (Job_Extension), Order date (Order_Date), Due Date (Due_Date), Ship to (address or customer—Ship_To), Shape (via Shape: Shape_Type), Material (via Material: MaterialType), and Machine (Run_On_Machine). Each of Shape, Material, and Machine is provided with a list (generated from the Shape, Material, and Machine tables) from which valid entries may be selected.

When the form is displayed at the receiving browser, at least three hyperlinks are provided: "Next Step", "Shape", and "Material" (S8.4). The served page includes a routine that will reject the form if a job number is not entered (S8.6). The Shape and Material links are provided for the addition of new shapes and materials to the source database. If the Shape link is activated(S8.8), a user interface permitting the entry of a new shape is served, and the database updated (Shape: Shape Type) if appropriate information is input. FIG. 9D shows a suitable form for inputting a new Shape. If the Material link is activated (S8.10), a user interface permitting the entry of a new material is served, and the database updated (Material: MaterialType) if appropriate information is input. FIG. 9E shows a suitable form for inputting a new Material. If Next Step is activated, a second page is served to the requesting browser (S8.12).

Figure 9C:
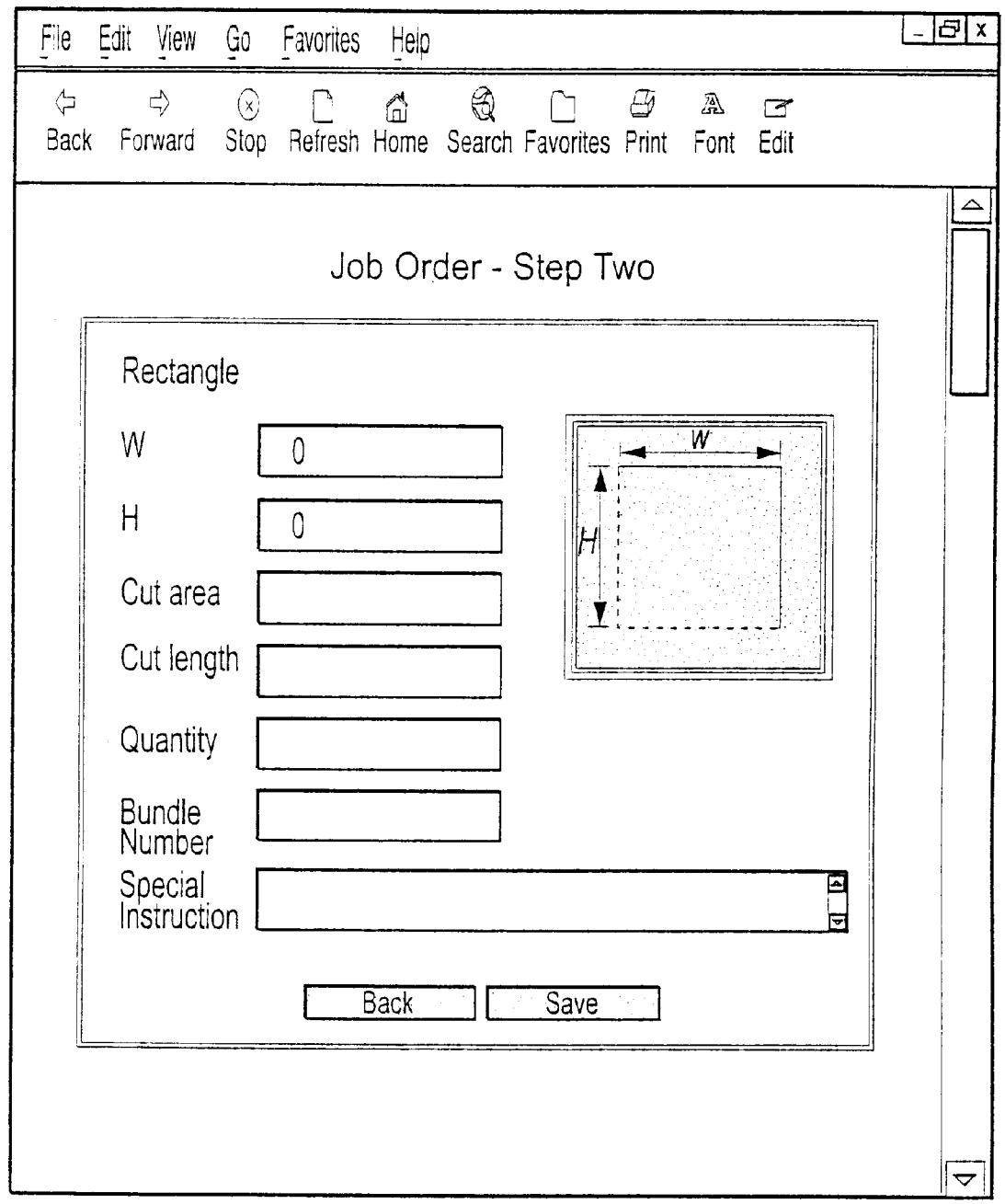
FIG. 9C shows a second page of an exemplary user interface generated by the job order routine of FIG. 9A.
Figure 9D:
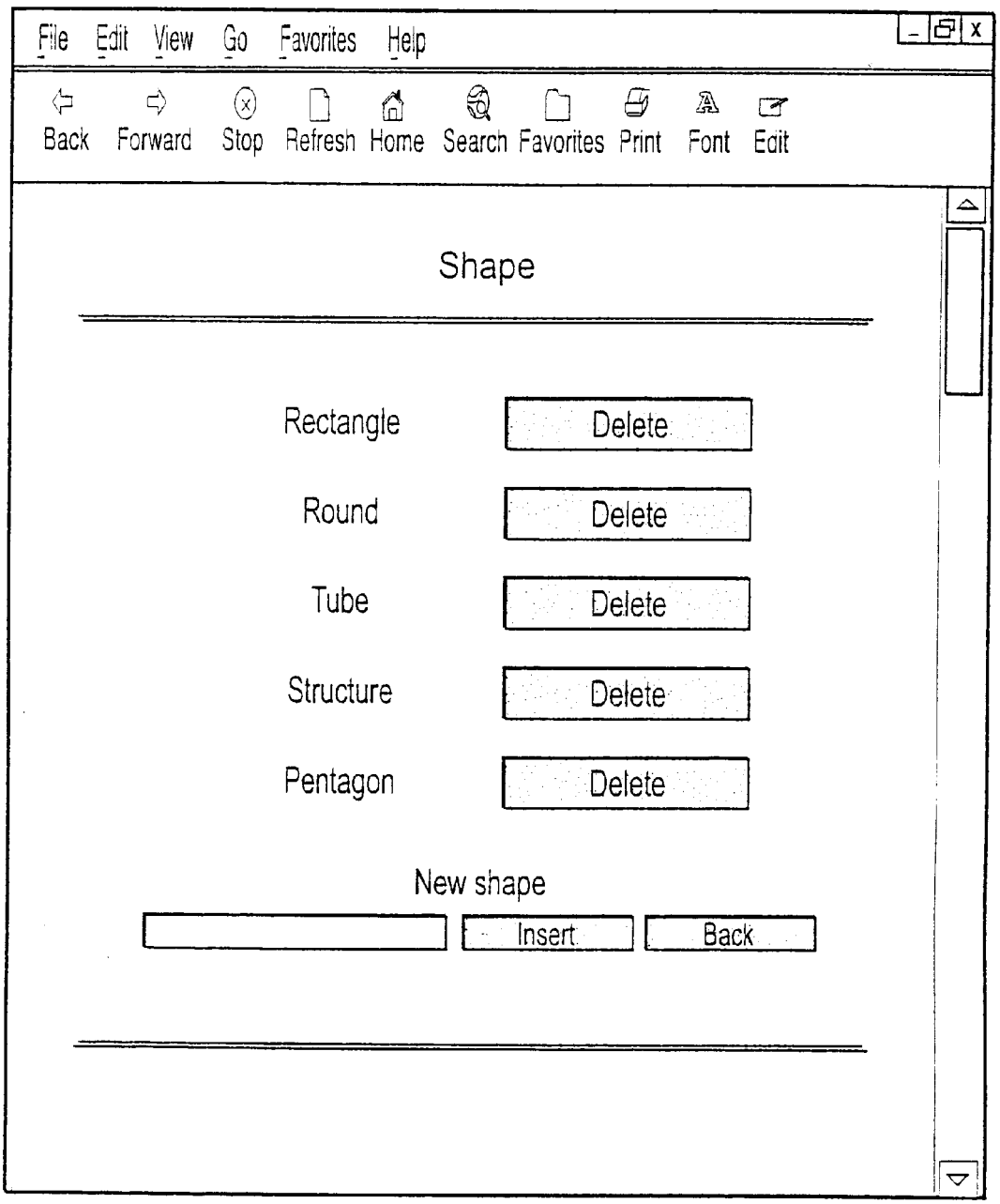
FIG. 9D shows an exemplary user interface generated by an edit shape routine of FIG. 9A.
Figure 9E:
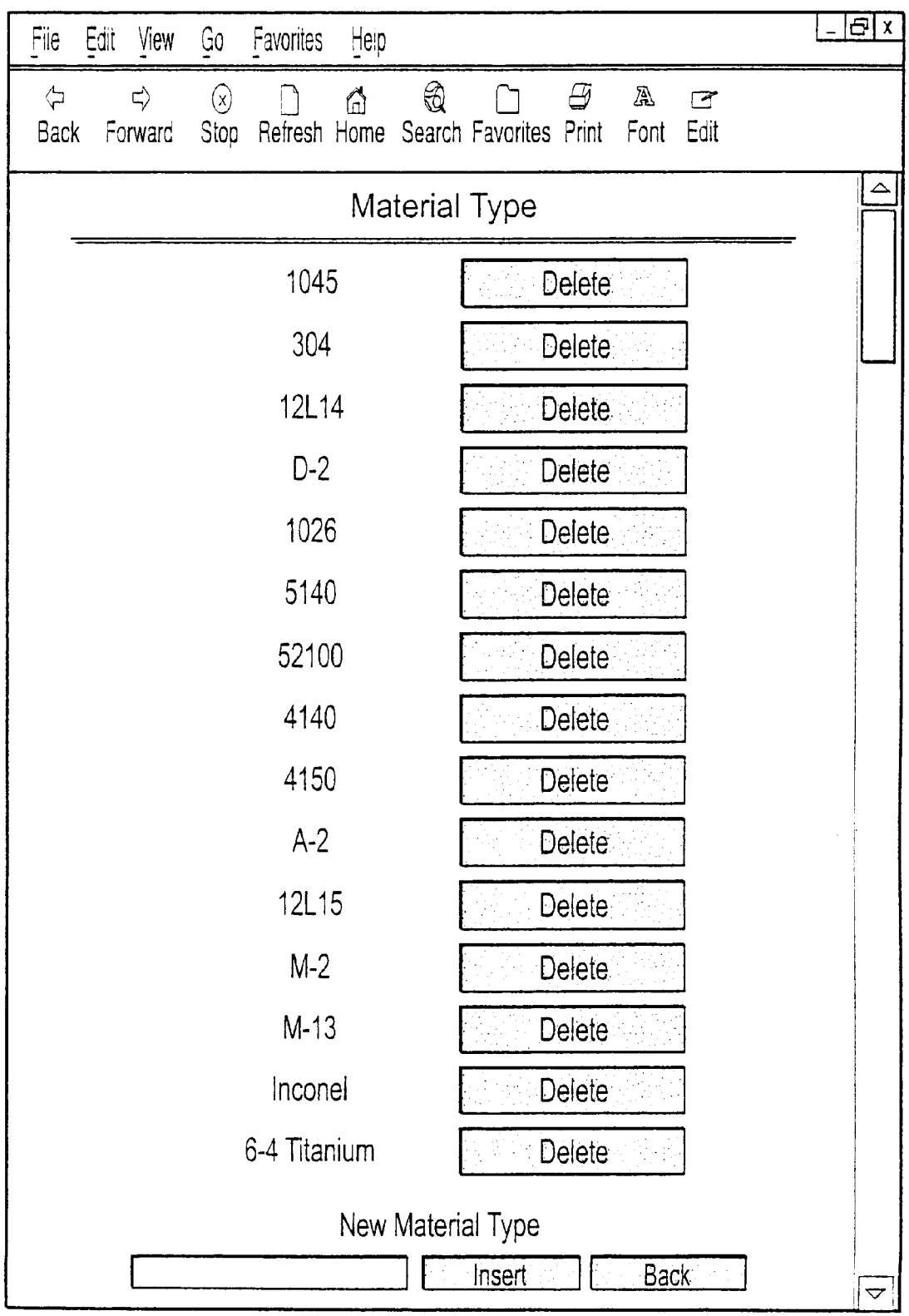
FIG. 9E shows an exemplary user interface generated by an edit material type routine of FIG. 9A.

An example of the appearance of the second page of a suitable form appears in FIG. 9C. As noted, "Edit" fields, corresponding to fields in the Job. table, are provided for Sizes (Size_X, Y, W, H), Cutting area (Cutting_Area), Cut length (Cut_Length), Quantity (Quantity), Bundle Number (Bundle_Num), and Special Instruction (Special_Instruction). The cutting area may be calculated from size measurements. In such a case, a graphic displaying the size measurements depends on the previously selected shape (from UI page P1, S8.2), and is selected from a library of appropriate graphics. Appropriate size entry fields appear for shapes in the library, e.g., a tube Shape will permit the entry of inner and outer diameter, or an I-beam shape will permit the entry of height and width). Cutting area is then calculated from an appropriate formula. At the same time, defaults of X, Y, W, or H Sizes appear for shapes having no defined area formula, and the Cut area is directly entered.

When the second page form is displayed at the receiving browser, at least two hyperlinks are provided: "Save" and "Back" (S8.14). The Back link, when activated, serves the first page of the job order form again, with the previously entered values in each field. In this manner, the user may edit both pages. When the Save link is activated (S8.16), all of the data stored in each field is sent to the Web server, which writes the data as a new record under a Job_ID in the Job table (database tables in FIG. 6). It should be noted that when a new Job record is entered, a unique Job_ID is created and written, and fields for Status and Lock are given default values (e.g., "waiting", "false").

Figure 10A:
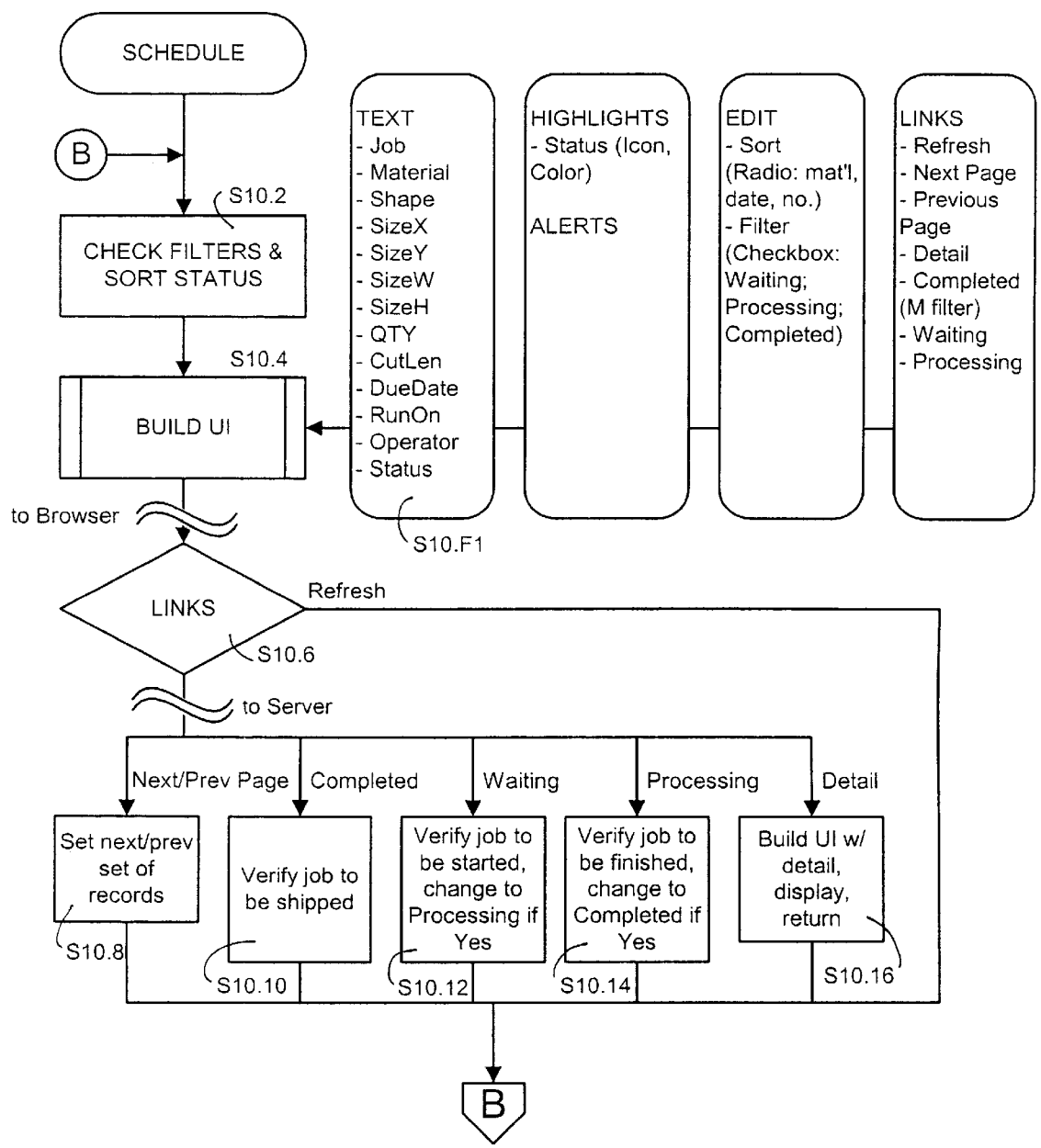
FIG. 10A is a flowchart showing process flow of an schedule routine of the system.

FIG. 10A shows an exemplary flow for the process in which a schedule summary page is assembled and served to a requesting browser, and which creates links for further action. Examples of source ASP code and scripts that implement a suitable schedule summary interface and responsive'structure, similar to that in FIGS. 10A through 10C, may be found in the Microfiche appendix, Appendix B, as schedule.asp; jobdetail3.asp; and jobdetail.asp.

In step S10.2, the Web server checks for any input filters or sort status. The filters or sort status are specified as default the first time the page is served, and are described below.

In step S10.4, a build user interface (UI) routine, specifically for building a user interface for the schedule summary page, is executed. The "build UI" routine generally corresponds to the routines discussed earlier in the specification with reference to FIG. 7. After the "build UI" routine is complete, the completed file is served to a browser that interprets its content as a form having the denoted information. An example of the appearance of a suitable form appears in FIG. 10B.

As noted, "Text" fields. corresponding to fields drawn from the Job and Username tables (database tables in FIG. 6), are provided for Job (Job_ID), Material (Material), Shape (Shape), Sizes (Size_X, Y, W, H), Quantity (Quantity), Cut length (Cut_Length), Due Date (Due_Date), Run on (Run_On_Machine), Operator (via Username: Login: Fullname), and Status (Status). Each appearance of a Status value is highlighted according to the parameters specified in Status. In particular, an icon representing a status light is changed in color (e.g., green, white) depending on the status. Initially, each field value for all the job records is arranged on the page, although a second or subsequent iteration of the served page, as modified by sort and filter conditions, may show only selected records.

"Edit" fields are provided for Sort and Filter conditions. For example, a "Sort" field may have a list of fields upon which a sort may be performed—in this case, a list of three fields (Material, Date, or Job. No.)—selectable by "radio" button. Of course, the schedule summary may be alternatively sorted by more than one key, and upon any field. A "Filter" field may have a list of field conditions or values from which records are selected or excluded—in this case, the Status field may filter the records (showing only those records that have Waiting; Processing; or Completed status)—selectable by checkbox. Of course, the schedule summary may be filtered by more than one condition, and upon any field.

When the form is displayed at the receiving browser, many hyperlinks are provided: "Refresh", "Next Page"/ "Previous Page", "Detail" for each record, and "Completed", Waiting" or "Processing" for each record, depending on the status (S10.6).

If there are more records than may be displayed on a single page, the first page only includes, e.g., the first 20 records. If the "Next Page" or "Previous Page" link is activated, records starting from the last record on the first page are designated, and the schedule summary is built and shown again using the same routines, except that the subsequent records are shown.

The Detail links, one for each record, are provided for the review of detailed information regarding the record. If the Detail link is activated (S10.16), a user interface permitting the review of details for the record is served, and further details extracted from the database. FIG. 10C shows a suitable page for reviewing details.

Each job record has a status: Completed, Waiting, or Processing. When displayed, as shown in FIG. 10A, the status is shown as an inline static text block along with the other record fields. At the same time, each status text block is designated as a hyperlink and/or highlighted, and the user may activate the status text block in order to change the status.

Specifically, when the "Waiting" text (e.g., underlined) of one of the records having a displayed "Waiting" status is activated (S101), the browser activates a script that directs the server to send a "Start Job" page, described below with reference to FIG. 13A. The Start Job page displays the relevant job information, and when the User identification (access level) is suitable, offers a final opportunity to edit or change the job parameters before requesting confirmation that the job is to be started. In general, an operator would indicate. the beginning of a job in this manner. Once the job is confirmed as started, the status of the record in the database is changed to "Processing" (e.g., in progress), and the Schedule page is served again with the updated status.

When the "Processing" text (e.g., underlined) of one of the records having a displayed "Processing" status is activated (S10.14), the browser activates a script that displays a dialog (not shown) requesting confirmation that the job is complete. Once the job is confirmed as complete, the status of the record in the database is changed to "Completed", and the Schedule page is served again with the updated status.

When the "Completed" text (e.g., underlined) of one of the records having a displayed "Completed" status is activated (S10.10), the browser activates a script that displays a dialog (not shown) requesting confirmation that the job is to be shipped. Once the job is confirmed as to be shipped, it is eliminated from the list of jobs (e.g., the Job record is archived with all details and then deleted).

Figure 11A:
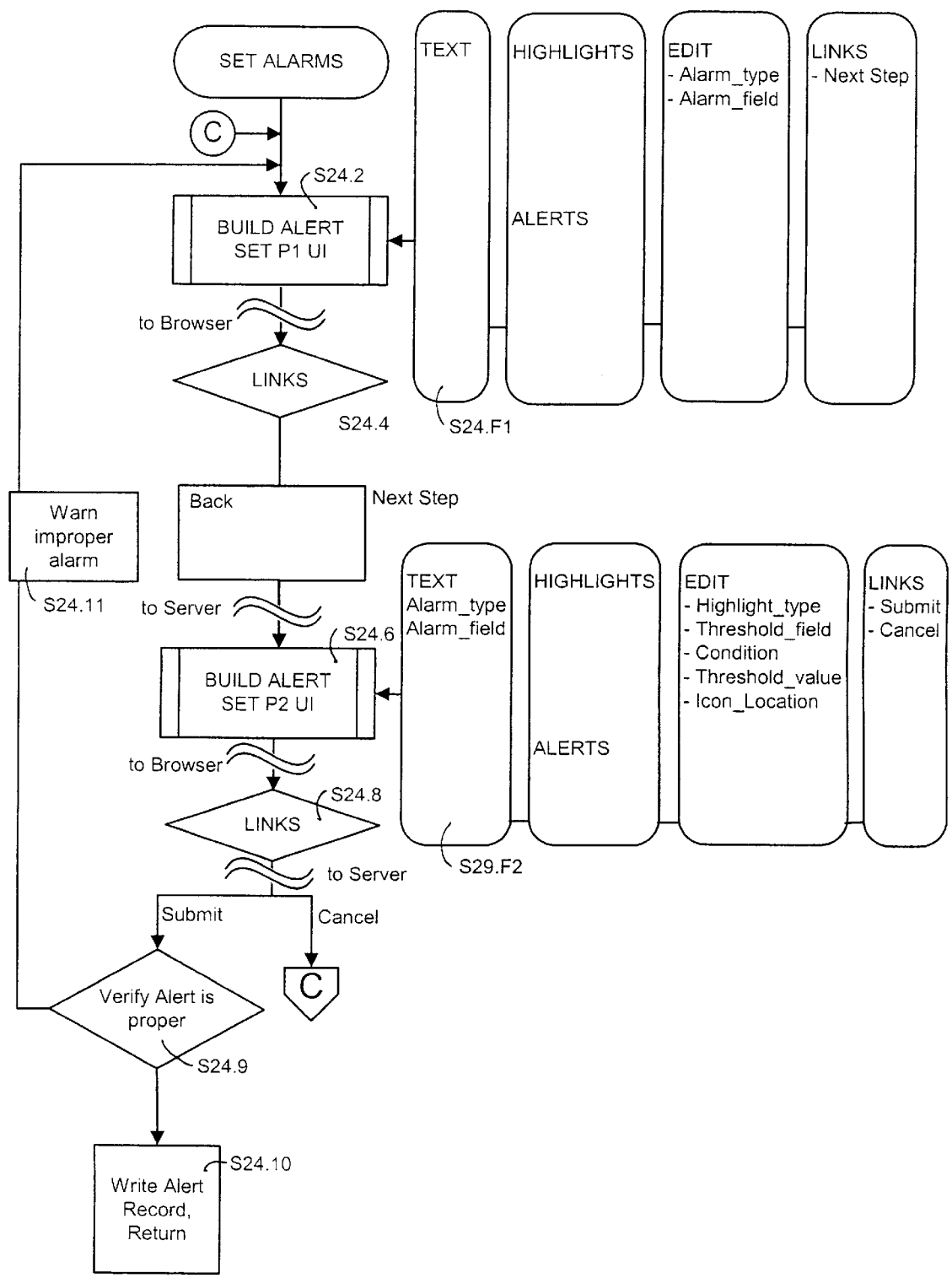
FIG. 11A is a flowchart showing process flow of an alarm set routine of the system.

FIG. 11A shows an exemplary flow for the process in which a set alarm page is assembled and served to a requesting browser, and in which the Web server 11 creates links for further action.

Figure 11B:
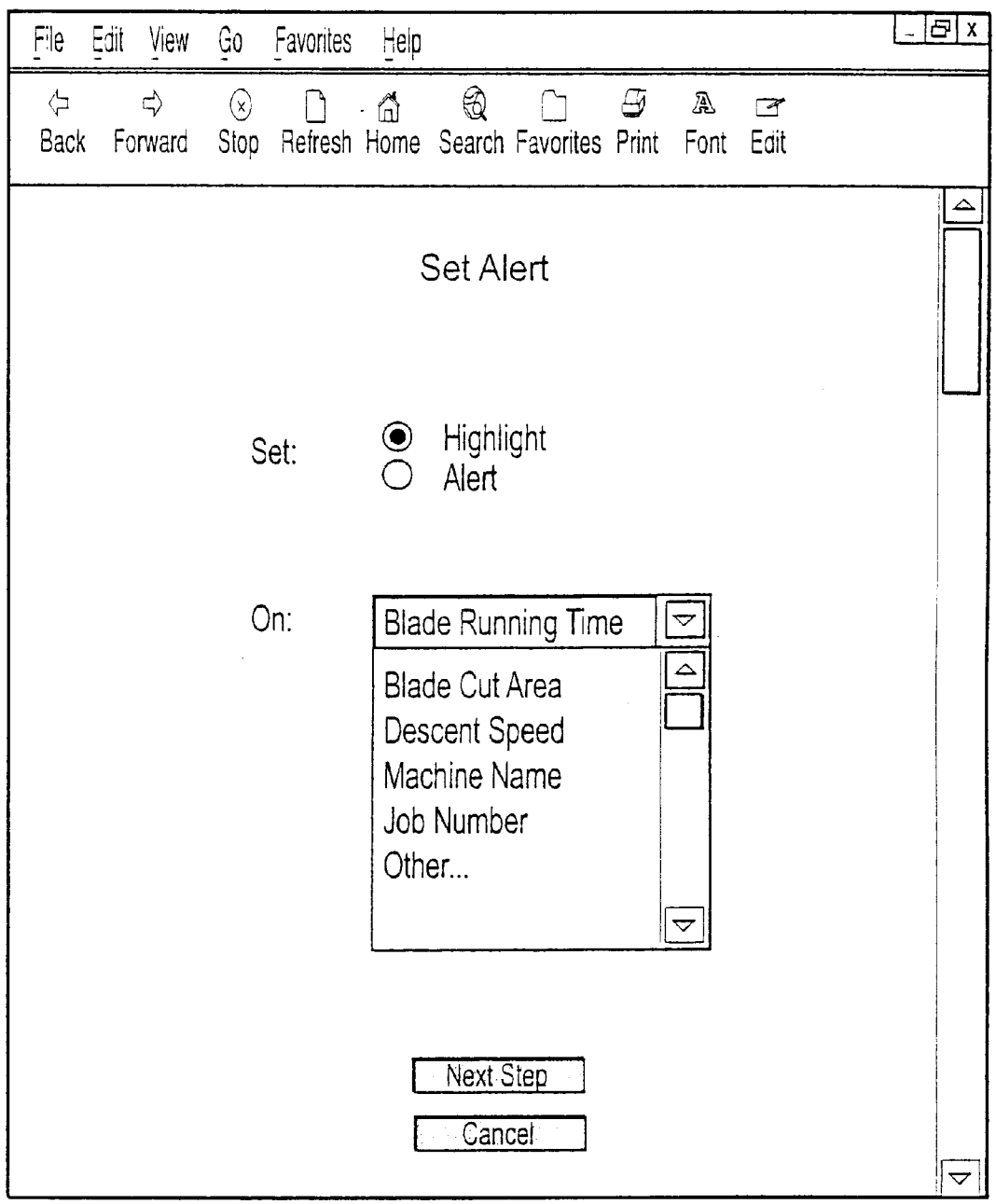
FIG. 11B shows a first page of an exemplary user interface generated by the alarm set routine of FIG. 11A.

In step S24.2, a build user interface (UI) routine, specifically for building a first page of user interface for the set alarm routine, is executed. The "build UI" routine generally corresponds to the routines discussed earlier in the specification with reference to FIG. 7. After the "build UI" routine is complete, the completed file is served to a browser that interprets its content as a form having the denoted information. An example of the appearance of a suitable form appears in FIG. 11B. As noted (S24.F1), "Edit" fields are provided for, corresponding to fields in the Alarms table (database tables in FIG. 6), Alarm type (Alarm_type) and Alarm field (Alarm_field). The Alarm_field is provided with a fixed list from which valid entries may be selected (e.g., Job_Number, Machine_Name, Blade Total_ CutArea, Blade Total_RunTime). It should be noted that the Alarm field is the database field, by name, to be modified when the user interface is displayed, and not the field upon which the alarm is conditioned.

When the form is displayed at the receiving browser, at least two hyperlinks are provided: "Next Step", and "Cancel" (S24.4). Cancel returns to the calling page. If Next Step is activated, a second page is served to the requesting browser (S24.6).

Figure 11C:
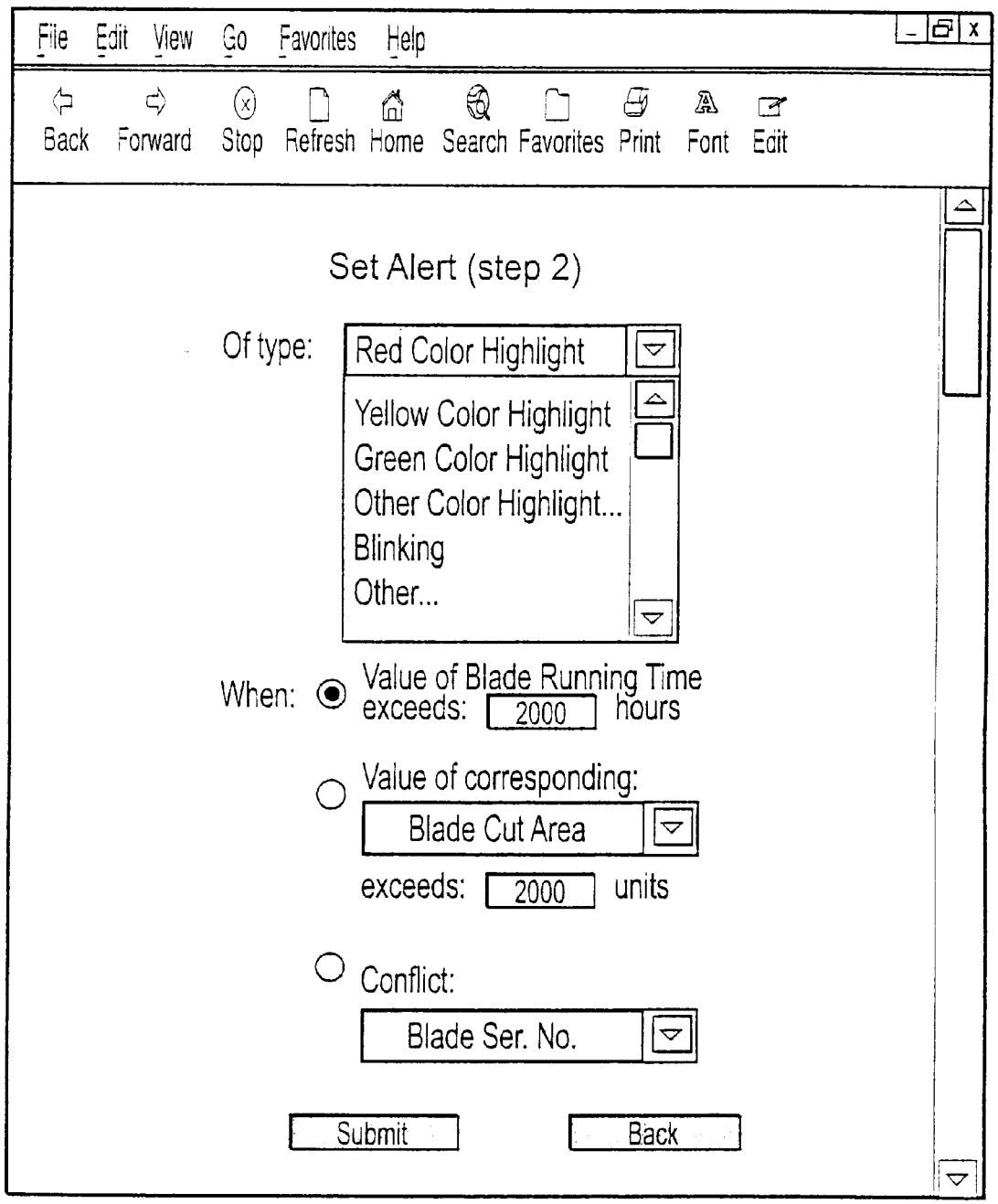
FIG. 11C shows a second page of an exemplary user interface generated by the alarm set routine of FIG. 11A.

An example of the appearance of the second page of a suitable form appears in FIG. 11C. As noted, "Text" fields include the previously entered Alarm type and Alarm field. "Edit" fields, corresponding to fields in the Alarms table, are provided for Highlight type (Highlight_type), Threshold field (Threshold_field), Condition (Condition), Threshold value (Threshold_value) and Icon location (Icon_location). If a "highlight", as opposed to an "Alert" was chosen in the first page, Icon_location is not used, since it indicates where a message or icon is to appear on an alarmed page. Appropriate highlight types are presented from a fixed list. At least three types of highlights/alerts are provided. For comparisons that are set by a user, alerts include a first type of highlight/alert where the Alarm field is the same as the threshold field, and is highlighted or alerted when it exceeds an input value (in which case, e.g., Condition would store ">" or greater than, and Threshold_value would store the input value); and a second type where the Alarm field is highlighted or alerted when the (different) threshold field exceeds a threshold value (e.g., Machine_Number would be highlighted when the Blade Total_RunTime for the blade on the corresponding machine exceeds the threshold value). Further, a conflict alarm may be set, where conflicts are detected (e.g., highlighting Machine_Name fields having the same Job_Number or Blade_Number in conflicting circumstances such as simultaneous processing). In the conflict case, Condition would store "=" and Threshold_ value would store "Conflict". Although only three types of alarms are shown here, the storage of appropriate conditions for numbers or text in the Condition field (<, >, =, includes, etc.) permits the detection of many conditions and notifications therefrom.

When the second page form is displayed at the receiving browser, at least three hyperlinks are provided: "Submit", "Back" (S24.8). The Back link, when activated, serves the first page of the job order form again, with the previously entered values in each field. In this manner, the user may edit both pages or return to the first page to cancel. When the Submit link is activated (S24.9), all of the data stored in each field is sent to the Web server 11, which checks the alarm for validity and writes the data, if proper, as a new record (S24.10) under an Alarm_ID in the Alarms table (FIG. 6). If the data does not specify proper alarms (e.g., negative values for the threshold field), the user is directed back to the first page (S24.11). It should be noted that when. a new Alarm record is entered, a unique Alarm_ID is created and written, and unused fields are given default or null values.

FIG. 11D shows an example of a conflict-type highlight as it appears in a served schedule user interface. In this case, two conflict alarms have been set, to highlight Job_Number and Machine_Name upon a conflict. The rules for "Conflict" in the case of each are the same—when any Machine_ Name has a Job: Status of "Processing".more than once. With respect to schedule routine shown in FIG. 10A, at the time when the Web server 11 assembles the page and checks for highlight and alert conditions (S10.4, S10.F1), any Job_Number and Machine_Name is highlighted—in this case with an Alarm type of highlight and a Highlight_type of blinking text.

Figure 12A:
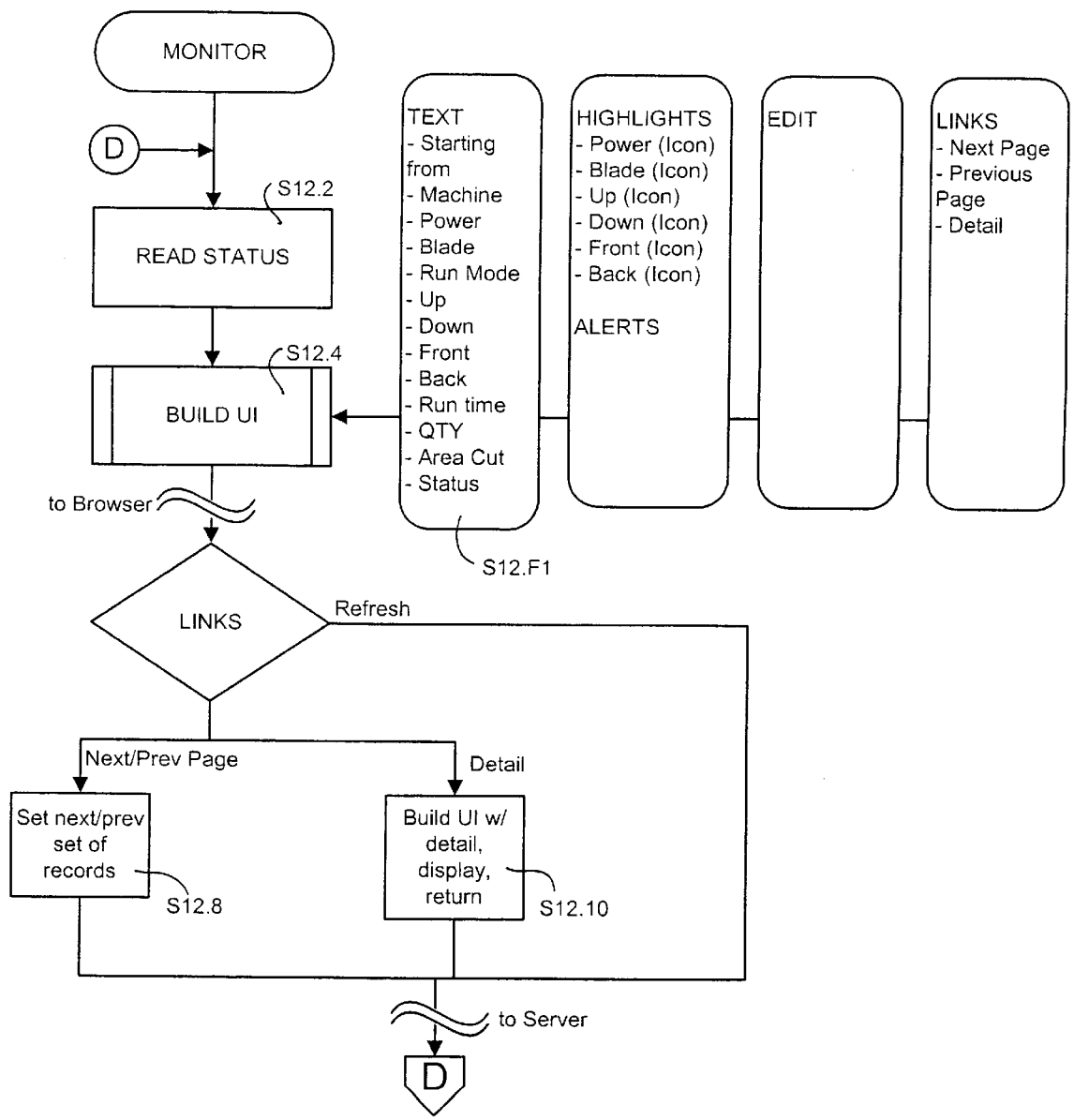
FIG. 12A is a flowchart showing process flow of a machine monitor of the system.

FIG. 12B (described later with reference to the machine monitor routines) shows an example of a highlight having a different Alarm field and Threshold field, as it appears in a served monitor user interface. In this case, an alert has. been set to appear on the bottom of the page when, e.g., Machine_Name is on the page and when Blade: Total_ RunTime exceeds a threshold value. The alert provides, e.g., an alert icon and an identification of the alarm with Threshold_field, Alarm_field, Condition, and Threshold_ value,with the text assembled by parsing the alarm conditions. With respect to the monitor routine shown in FIG. 12A, at the time when the Web server 11 assembles the page and checks for highlight and alert conditions (S12.4, S12.F1), the alert is appended according to Icon_location (bottom) and the alarm conditions when the alarm is tripped by the retrieved data (the Web server 11, in this case, checking Blade: Total_RunTime for each Machine_ Name).

As noted in the appropriate flow chart descriptions, some highlights and alerts are defaults to the system, and are always checked, e.g., Power, Blade, Up, Down, Front, and Back are always checked (via retrieved status from the MM component 7 rather than by reference to the database) on the monitor page.

FIG. 12A shows an exemplary flow for the process in which a machine monitor page is assembled and served to a requesting browser, and which creates links for further action. Examples of source ASP code and scripts that implement a machine monitor summary interface and responsive structure, similar to that in FIGS. 12A through 12C, may be found in the Microfiche appendix, Appendix B, as machine_status.asp; machine_status_view.asp; machine_status_data.asp; new_material_type.asp; delete_material_type.asp and machine_details.asp.

In step S12.2, the Web server contacts the MM component 7 to get current status of each machine. That is, any current status information, representative of signals D1–D22, is retrieved. As an example, current status includes Power, Blade Running/Idle, Up, Down, Front, and Back signals. Up and Down refer to the blade's vertical position ("Up" is before cutting and "Down" is after cutting the material all the way through), e.g., from an additional two "channels" to those shown in FIG. 3. Forward and Back refer to the material holding clamp positions for inserting the material into the cutting machine, e.g., from channel D21 of FIG. 3.

In step S12.4, a build user interface (UI) routine, specifically for building a user interface for the monitor page, is executed. The "build UI" routine generally corresponds to the routines discussed earlier in the specification with reference to FIG. 7. After the "build UI" routine is complete, the completed file is served to a browser that interprets its content as a form having the denoted information. It should be noted that the Web server 11 uses both the current status information retrieved from the MM component 7 and the most recent corresponding records from the database to assemble the UI. An example of the appearance of a suitable form appears in FIG. 12B.

As noted, "Text" fields are provided for Starting from (Start time), Machine, Power, Blade, Run Mode, Up, Down, Front, Back, Run time, Quantity (QTY), Area Cut and Status. Each appearance of Power, Blade, Up, Down, Front, and Back is highlighted according to the parameters specified in the record. In particular, an icon representing a status light is changed in color (e.g., green, white) depending on the status (e.g., On/True or Off/False). Each field value for all the machine records (drawn from various tables) is arranged on the page.

When the form is displayed at the receiving browser, a few hyperlinks are provided: "Next Page"/"Previous Page", and "Detail" for each record.

If there are more records than may be displayed on a single page, the first page only includes, e.g., the first 20 records. If the "Next Page" or "Previous Page" link is activated, records starting from the last record on the first page are designated, and the machine monitor page is built and shown again using the same routines, except that the subsequent records are shown.

The Detail links, one for each machine, are provided for the review of detailed information regarding the machine. If the Detail link is activated (S12.10), a user interface permitting the review of details for the record is served, and further details extracted from the database. FIG. 12C shows a suitable page for reviewing machine details.

Figure 13A:
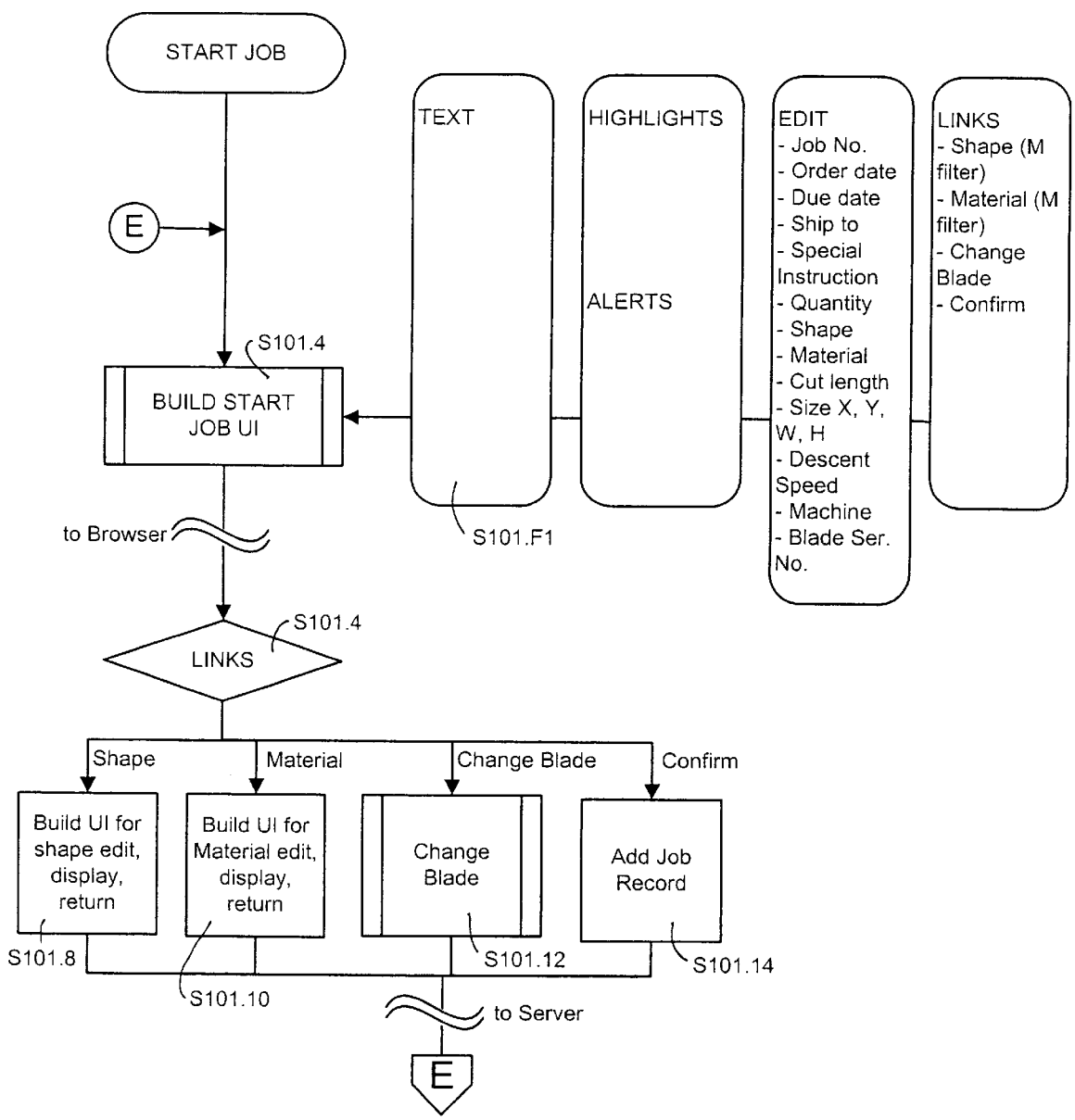
FIG. 13A is a flowchart showing process flow of a start job routine of the system.

FIG. 13A shows an exemplary flow for the process in which a start job page is assembled and served to a requesting browser, and which creates links for further action. Examples of source ASP code and scripts that implement a suitable start job interface and responsive structure, similar to that in FIGS. 13A through 13F, may be found in the Microfiche appendix, Appendix B, as startjob.asp; change_blade.asp; sd_change_blade.asp; delete_blade.asp; new_blade_type.asp; edit_blade_type.asp; sd_edit_blade_type.asp; delete_blade_type.asp; new_blade_brand.asp; delete_blade_brand.asp; edit_blade_brand.asp; sd_edit_blade_brand.asp; endjob.asp; lockjob.asp; and lockfail.asp.

In. step S101.2, a build user interface (UI) routine, specifically for building a user interface for the start job page, is executed. The "build UI" routine generally corresponds to the routines discussed earlier in the specification with reference to FIG. 7. After the "build UI" routine is complete, the completed file is served to a browser that interprets its content as a form having the denoted information. An example of the appearance of a suitable form appears in FIG. 13B.

"Edit" fields, drawn from the Job, Machine, Blade, and Job_Machine_Usage tables (database tables in FIG. 6), are provided for Job No. (Job_Number), Order date (Order_Date), Due date (Due_Date), Ship to (address or customer—Ship_To), Special Instruction (Special_Instruction), Quantity (Quantity), Shape (Shape), Material (Material), Cut length (Cut Length), Sizes (Size_X, Y, W, H), Descent Speed (via, e.g., Job_Machine_Usage: Machine_ID: FCV_Position), Machine. (Run_On_Machine), and Blade Serial No. (via, e.g., Blade: Blade_ID: Serial_Number. Accordingly, in this manner, the user may edit the job before it is started (with confirmation).

When the form is displayed at the receiving browser, several hyperlinks are provided: "Shape", "Material", "Change Blade" and "Confirm". The Shape and Material Links (S101.8, S110.10) behave identically to those previously discussed with respect to step S8.4, S8.8, and S8.10.

The Change Blade link is provided for the selection of an available blade from the source database, or the addition of a new blade to the database. If the Change Blade link is activated (S101.12), a user interface permitting the selection of an available blade is served according to the records in Blade: Blade_ID as described below with reference to FIG. 13C. If the Confirm link is activated (S101.14), the Job record (Job: Status) is confirmed as started. Once the job is confirmed as started, the "Status" in the Job table in the database is changed to "Processing" (e.g., in progress), and the Schedule page is served again with the updated Status.

Figure 13C:
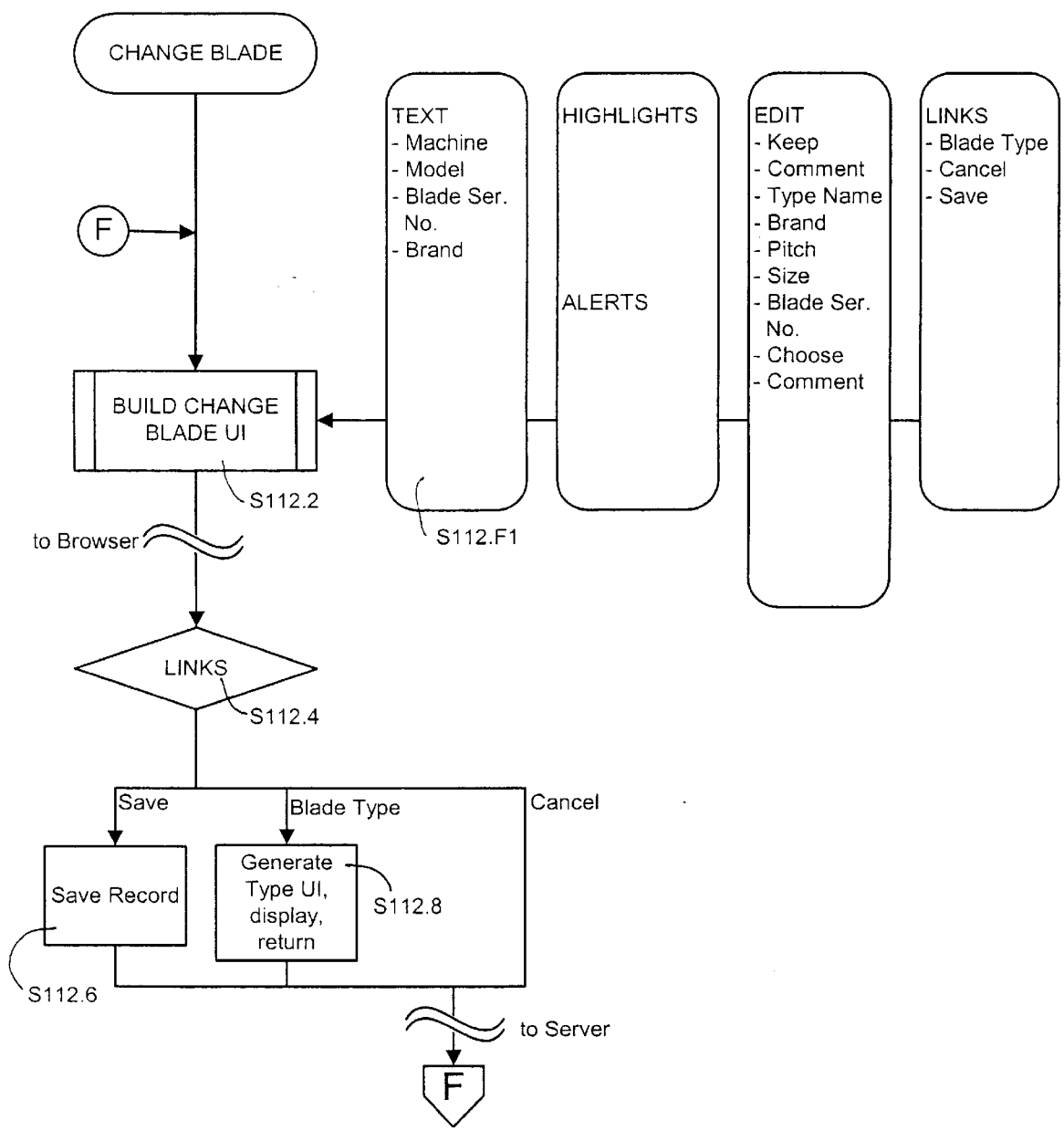
FIG. 13C is a flowchart showing process flow of a change blade routine of the system.

FIG. 13C shows an exemplary flow for the process in which a change blade page is assembled and served to a requesting browser, and which creates links for further action.

In step S112.2, a build user interface (UI) routine, specifically for building a user interface for the change blade page, is executed. The "build UI" routine generally corresponds to the routines discussed earlier in the specification with reference to FIG. 7. After the "build UI" routine is complete, the completed file is served to a browser that interprets its content as a form having the denoted information. An example of the appearance of a suitable form appears in FIG. 13D.

"Text" fields, drawn from the Machine and Blade tables, are provided for Machine (Machine_Name), Model name (Model_Name), Serial number (Blade: Serial_Number) and Brand (Blade: Blade_Brand). "Edit" fields, drawn from the Blade table tables, are provided for Keep (Keep), Comment (Comment), Blade type (Type_Name), Blade brand (Blade_Brand), Pitch (Pitch), Size (Size), and Serial number (Serial_Number). In the example shown in FIG. 13D, an additional radio button choice is generated to allow the user to select between choosing a blade in inventory or adding a new blade.

Changed fields are saved only when the "Save" link is activated, as described below. The user can directly change the status of the "Keep" field and "Comment" field, in the example shown in FIG. 13D, each generated with radio buttons according to fixed default lists (although a Comment may be entered directly as text). If the user chooses to add a new blade, the Blade type, blade brand, Pitch, and Size are recorded as a new entry in the Blade table. It should be noted that when a new Blade record is entered, a unique Blade_ID is created and written. The user may also choose to select a new blade from inventory, in the example of FIG. 13D from a list of blades in the Blade table.

When the form is displayed at the receiving browser, several hyperlinks are provided: "Blade Type", "Cancel", and "Save" (S112.4). If the Cancel link is activated, the Web Server returns to the calling page (e.g., the Job Start page).

Figure 13D:
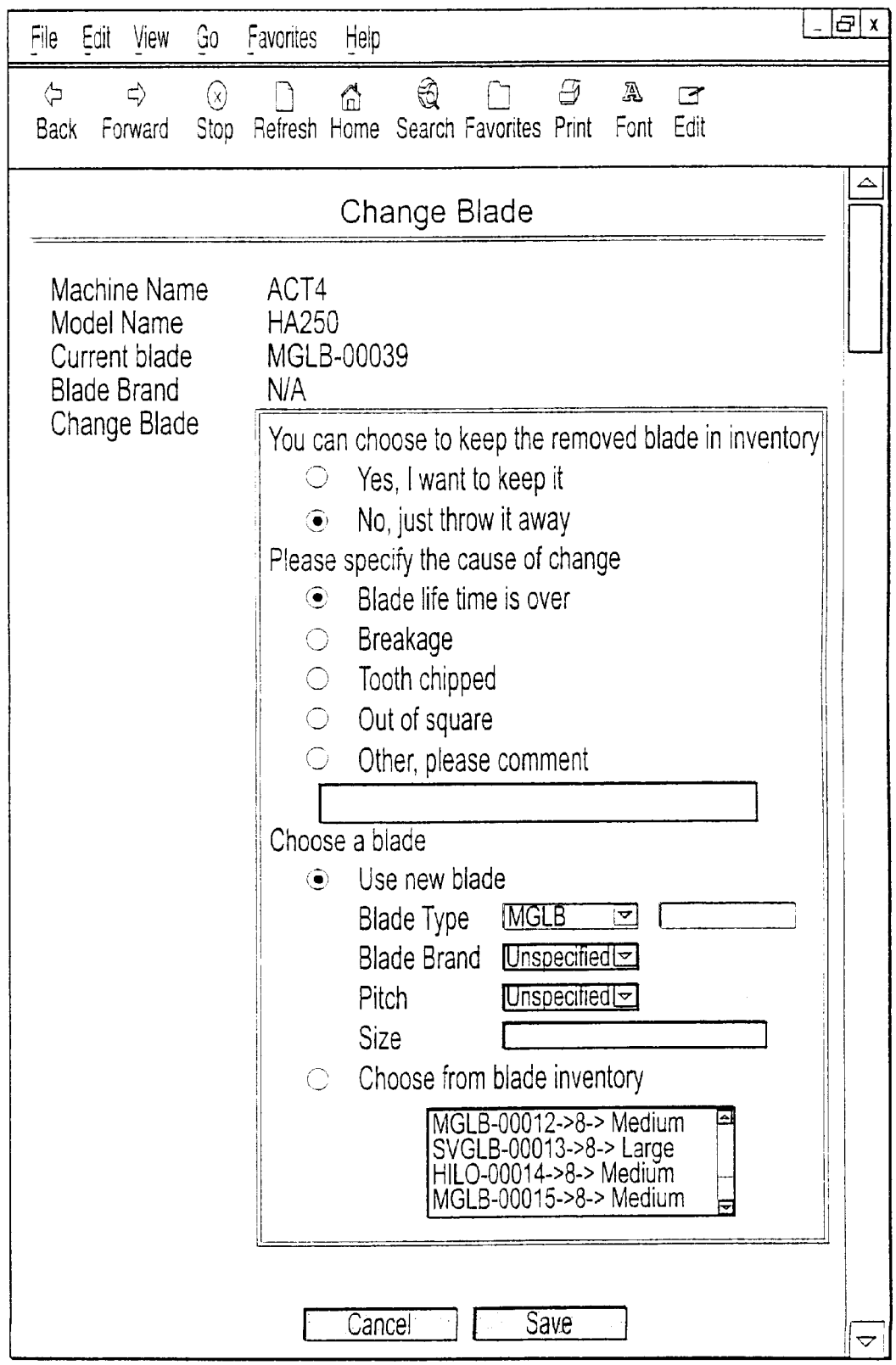
FIG. 13D shows an exemplary user interface generated by a change blade routine of FIG. 13C.
Figure 13E:
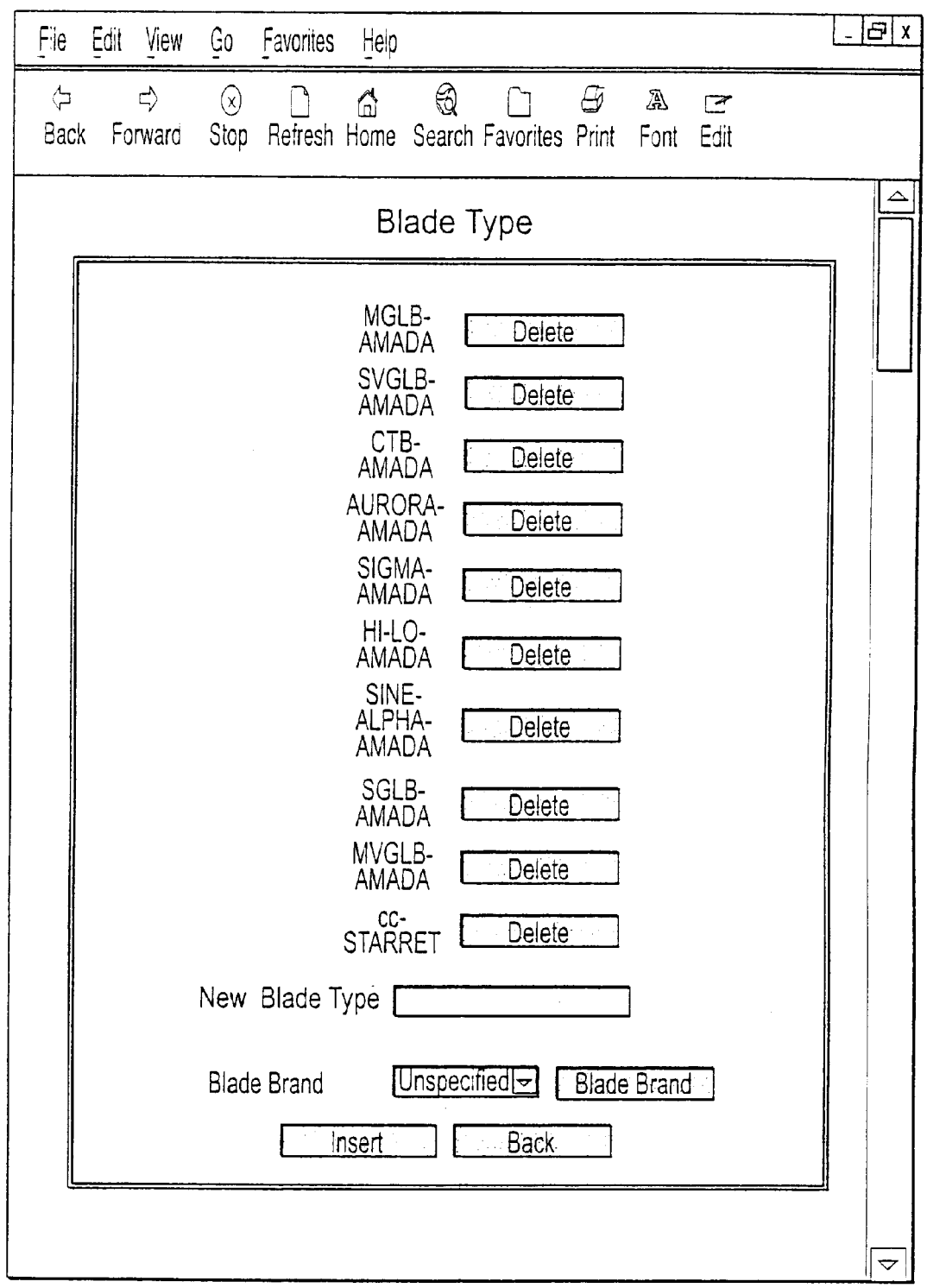
FIG. 13E shows an exemplary user interface generated by the new blade type routine of FIG. 13C.
Figure 13F:
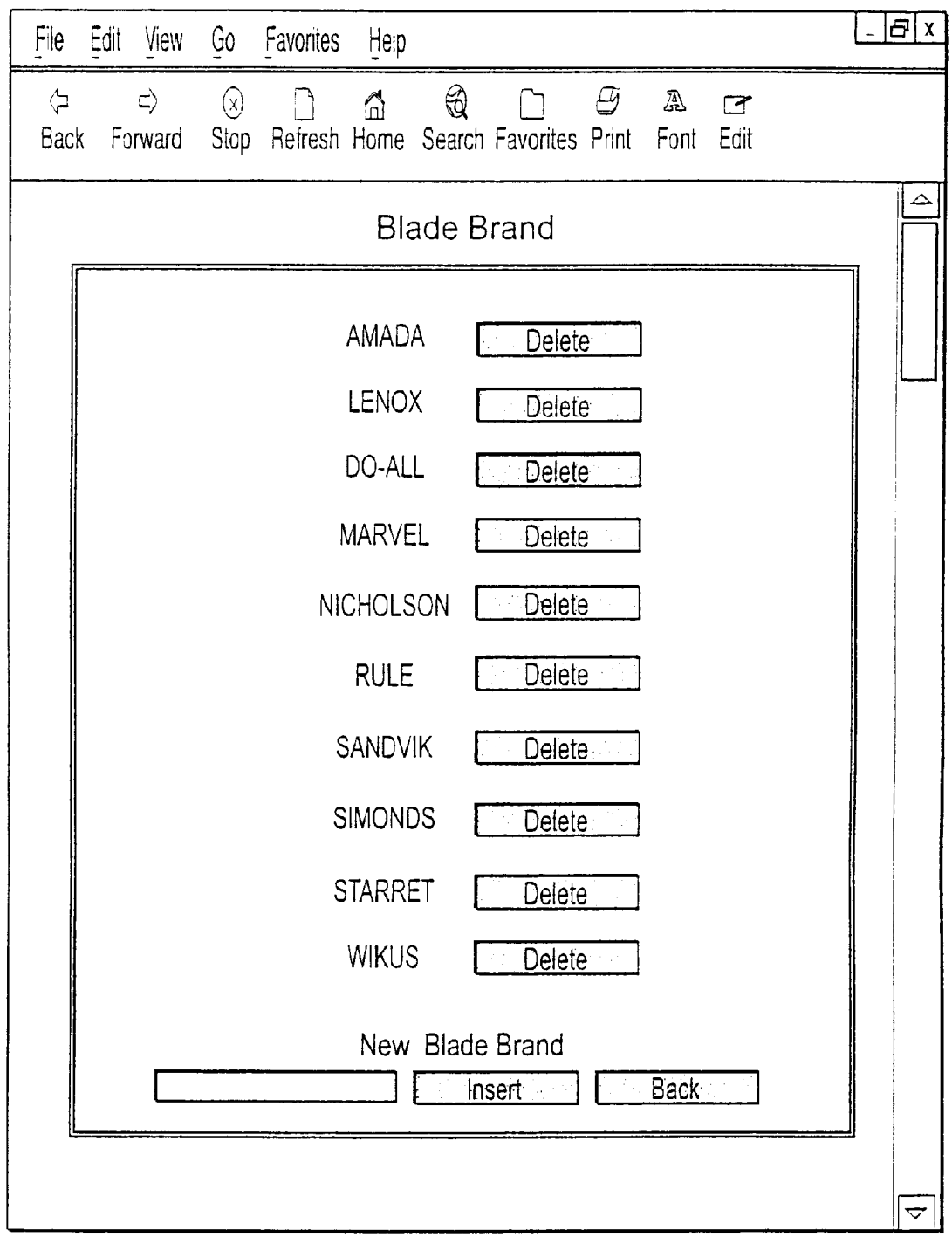
FIG. 13F shows an exemplary user interface generated by the new blade brand routine of FIG. 13C.

If Blade Type is activated (S112.8), a user interface permitting the entry of a new Blade Type record is served, according to the Blade_Type lookup table fields. FIG. 13E shows a suitable form for adding or deleting a new blade type. FIG. 13E also shows a link for adding a new blade brand, and FIG. 13F shows a suitable form for adding or deleting a new blade brand.

If the Save link is activated (S112.8), several actions are taken by the Web server 11. Any changes in status of the Keep or Comment fields are stored for the old blade by Blade_ID. A new record is entered in the Blade table if the user chose to enter a new blade, and further, the new Blade_ID is recorded in the corresponding Machine table as the blade in use. Blade-related fields in other tables are updated, and at least Blade: In_Use, Blade: In_UseBy, Blade: Add_Date, and Blade: Remove_Date for both the old (removed) blade and the new (installed) blade are updated as appropriate (the new blade being added and recorded as in use and by what machine, the old blade being removed and recorded as not in use). The Web server 11 then returns to the calling page (e.g., the Job start page).

Accordingly, detailed records are kept for each blade in inventory and in use, and can be reviewed (e.g., by the query routine described below) for the reason for removal or status of the blade. The logic of the system ensures that only one blade is in use on one machine, and for one job. All blades have a reason for removal recorded when they are no longer useful, and are recorded as available for further jobs if removed (e.g., when a new job requires a different blade, but the old blade is still useful.

Figure 14A:
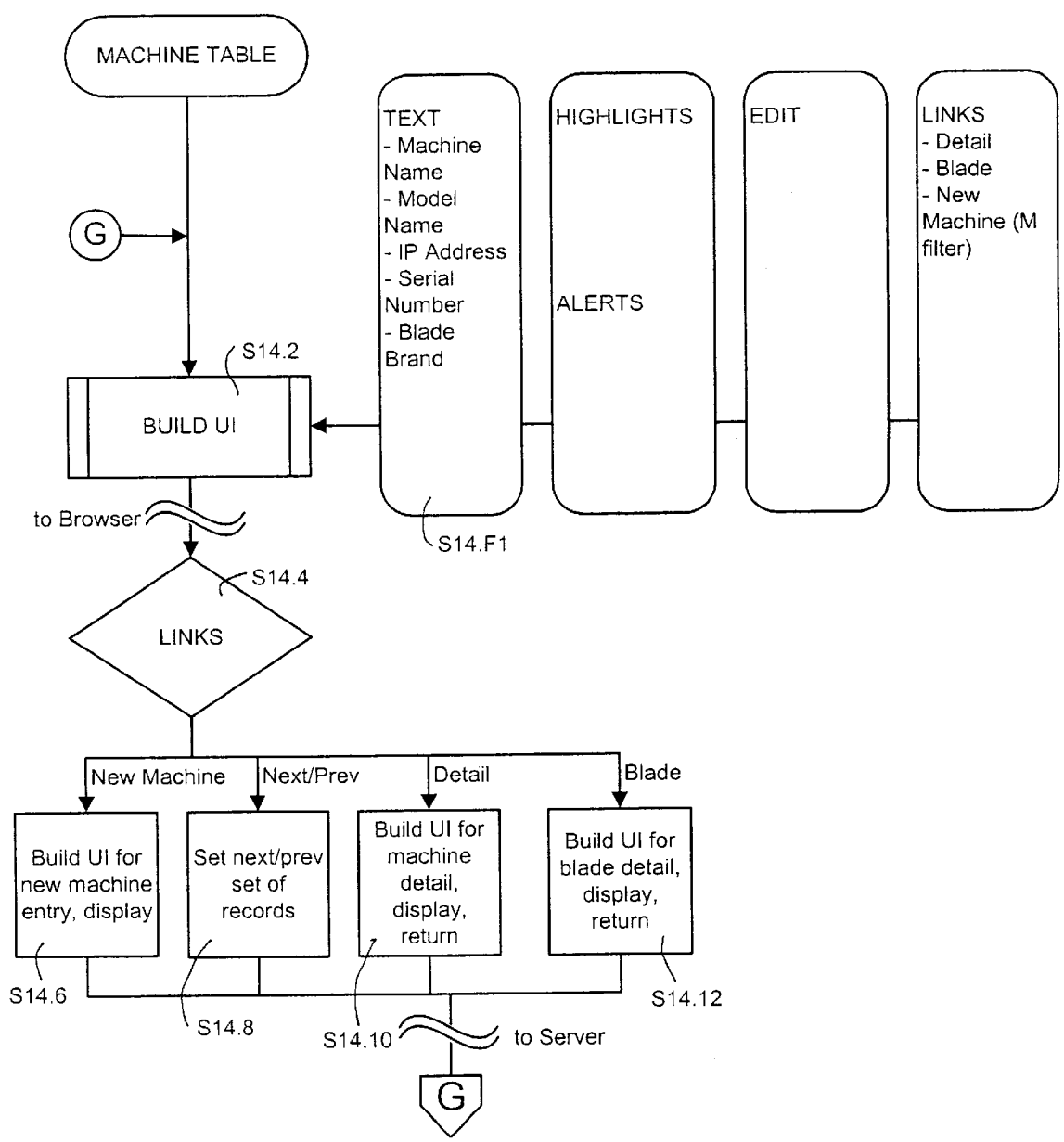
FIG. 14A is a flowchart showing process flow of a machine table routine of the system.
Figure 14C:
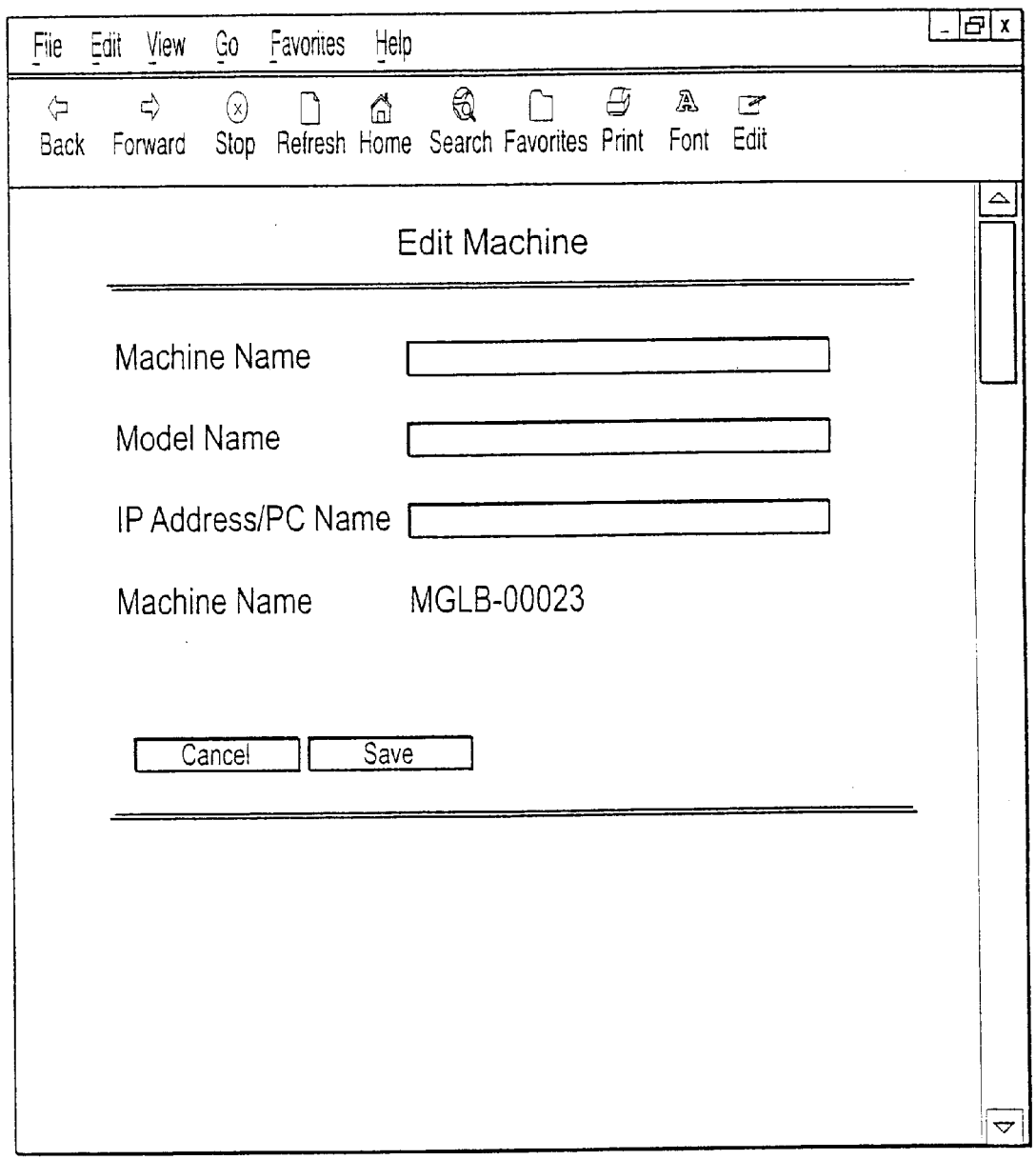
FIG. 14C shows an exemplary user interface generated by an edit machine routine of FIG. 14A.

FIG. 14A shows an exemplary flow for the process in which a machine table page is assembled and served to a requesting browser, and in which the Web server 11 creates links for further action. Examples of source ASP code and scripts that implement a suitable machine table interface and responsive structure, similar to that in FIGS. 14A through 14D, may be found in the Microfiche appendix, Appendix B, as machine_table.asp; editmachine.asp; sd_edit machine.asp; and delete_machine.asp.

In step S14.2, a build user interface (UI) routine, specifically for building a first page of user interface for the machine table, is executed. The "build UI" routine generally corresponds to the routines discussed earlier in the specification with reference to FIG. 7. After the "build UI" routine is complete, the completed file is served to a browser that interprets its content as a form having the denoted information. An example of the appearance of a suitable form appears in FIG. 14B.

"Text" fields are provided for, drawn from each Machine_ID record in the Machine table, Machine name (Machine_Name), Model Name (Model_Name), IP Address (Machine_IP), Serial Number (via Blade: Blade_ID: Serial_Number), and Blade Brand (via Blade: Blade_ID: Blade_Brand).

When the form is displayed at the receiving browser, at least three hyperlinks are provided: "Detail", "Blade", and "New Machine" (S14.4). The Detail and Blade links are provided for the review of Machine and Blade details from the source database.

The Blade link is provided for the changing of the blade in use from the source database. If the Blade link is activated S14.12, a user interface permitting the changing of the blade in use is served according to the records in the Blade table (by Blade: Blade_ID). FIG. 13C describes the routine used, and FIG. 13D shows a suitable form for showing the blade in use. If the Detail link is activated, (S14.10), a user interface showing the machine details is served, taken from the Machine table for that record (by Machine: Machine_ID). FIG. 14B shows a suitable form for showing Machine detail.

Figure 14D:
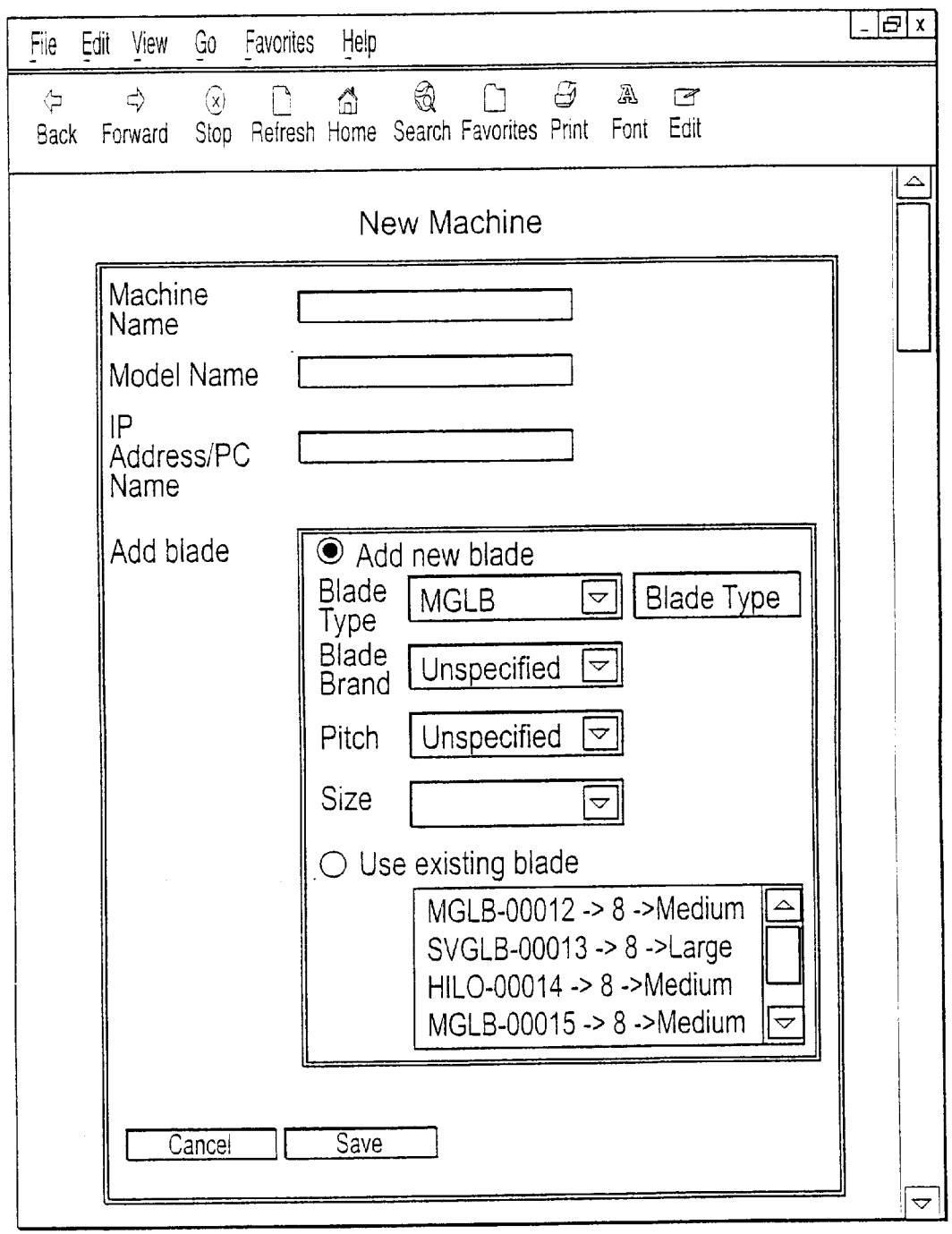
FIG. 14D shows an exemplary user interface generated by a new machine routine of FIG. 14A.

If New Machine is activated (S14.6), a user interface permitting the entry of a new Machine record is served, according to the Machine table fields (by Machine: Machine_ID). FIG. 14D shows a suitable form for entering a New machine record. It should be noted that when a new Machine record is entered, a unique Machine_ID is created and written.

Figure 15A:
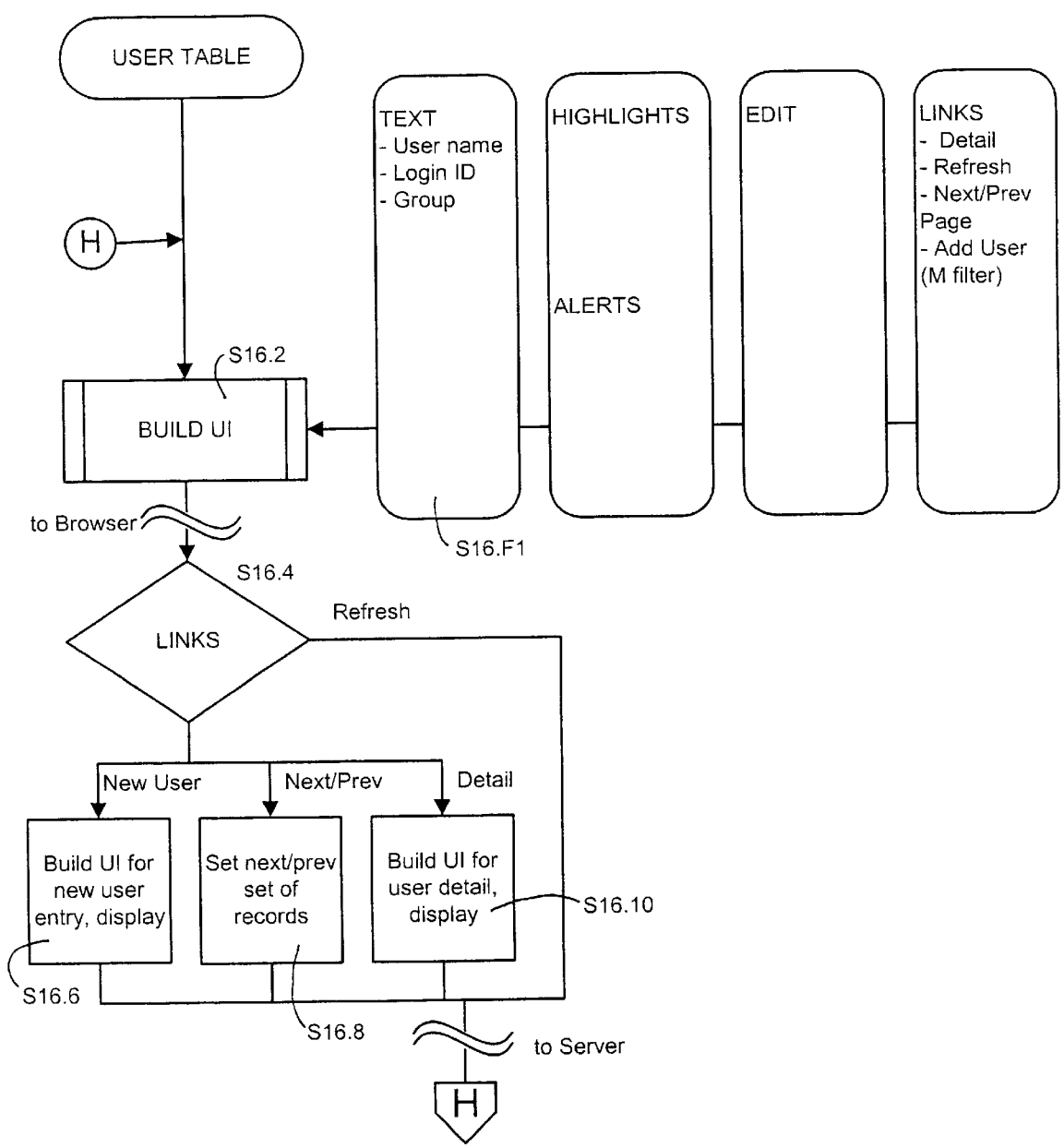
FIG. 15A is a flowchart showing process flow of a user table routine of the system.

FIG. 15A shows an exemplary flow for the process in which a user table page is assembled and served to a requesting browser, and in which the Web server 11 creates links for further action. Examples of source ASP code and scripts that implement a suitable user table interface and responsive structure, similar to that in FIGS. 15A through 15C, may be found in the Microfiche appendix, Appendix B, as user_table.asp; sd_edit_user.asp; delete_user.asp; and user.asp.

In step S16.2, a build user interface (UI) routine, specifically for building a first page of user interface for the user table, is executed. The "build UI" routine generally corresponds to the routines discussed later in the specification with reference to FIG. 7. After the "build UI" routine is complete, the completed file is served to a browser that interprets its content as a form having the denoted information. An example of the appearance of a suitable form appears in FIG. 15B.

"Text" fields are provided for, drawn from each Login record in the Machine table, User name (Fullname), Login ID (User_ID), and Access Level or Group (Duty).

When the form is displayed at the receiving browser, at least five hyperlinks are provided: "Detail", "Add User", "Refresh" and "Next/Previous Page" (S16.4).

Figure 15C:
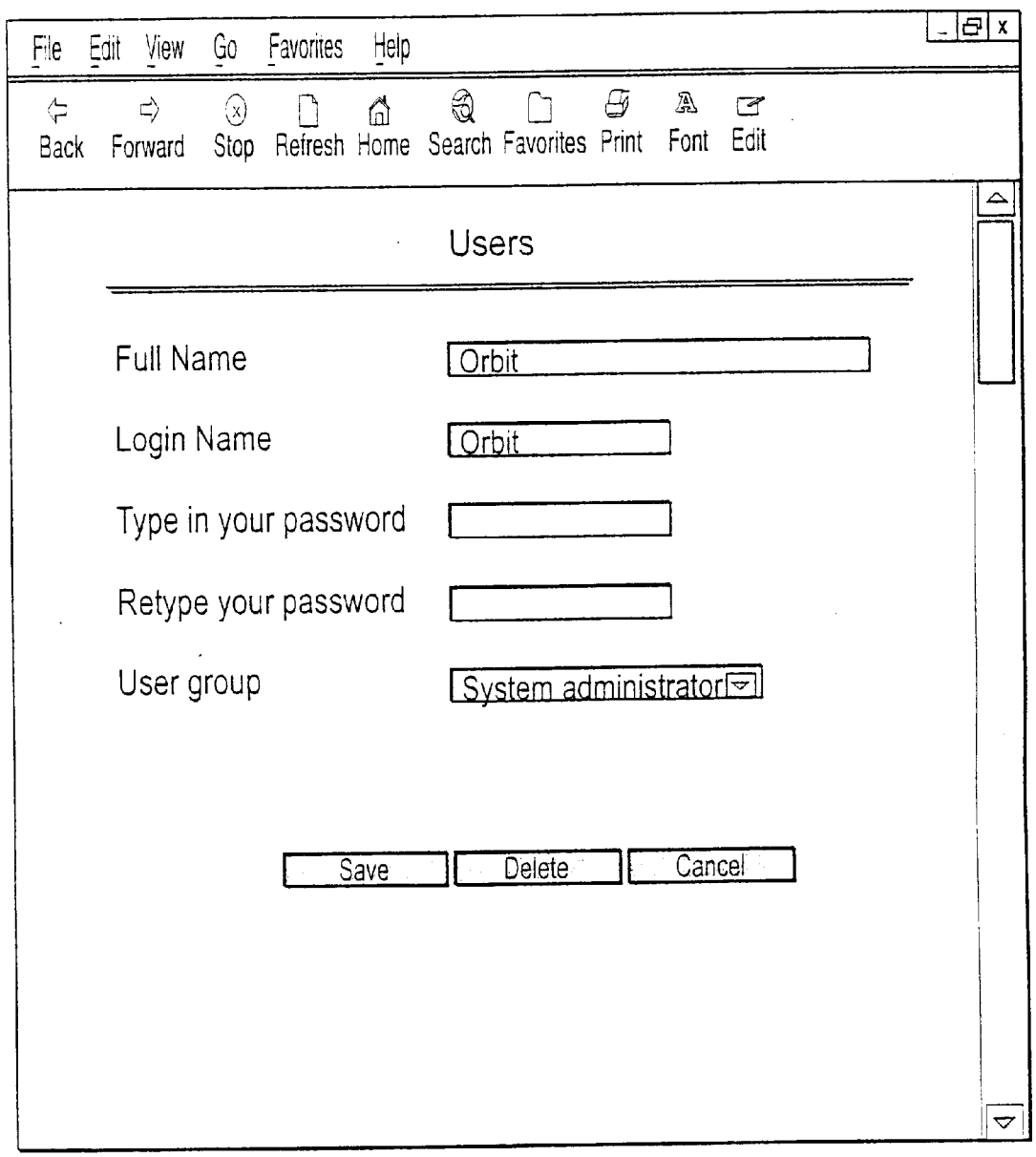
FIG. 15C shows an exemplary user interface generated by an add user routine of FIG. 15A (or user detail routine)

If Add User is activated (S16.6), a user interface permitting the entry of a new user record is served, according to the Username table fields (by Username: Login). FIG. 15C shows a suitable form for entering user details. It should be noted that when a new User record is entered, a unique Login identity is created and written.

The Detail link is provided for the review of the user from the source database. If the Detail link is activated (S16.10), a user interface permitting the review of the user is served according to the records in the Username table (by Username: Login). FIG. 15C is substantially the same form as that served, except that editable fields such as Full Name and Login Name appear with the User information corresponding to the inline Detail button.

If there are more records than may be displayed on a single page, the first page only includes, e.g., the first 20 records. If the "Next Page" or "Previous Page" link is activated, records starting from. the last record on the first page are designated, and the user table page is built and shown again using the same routines, except that the subsequent records are shown.

Figure 16A:
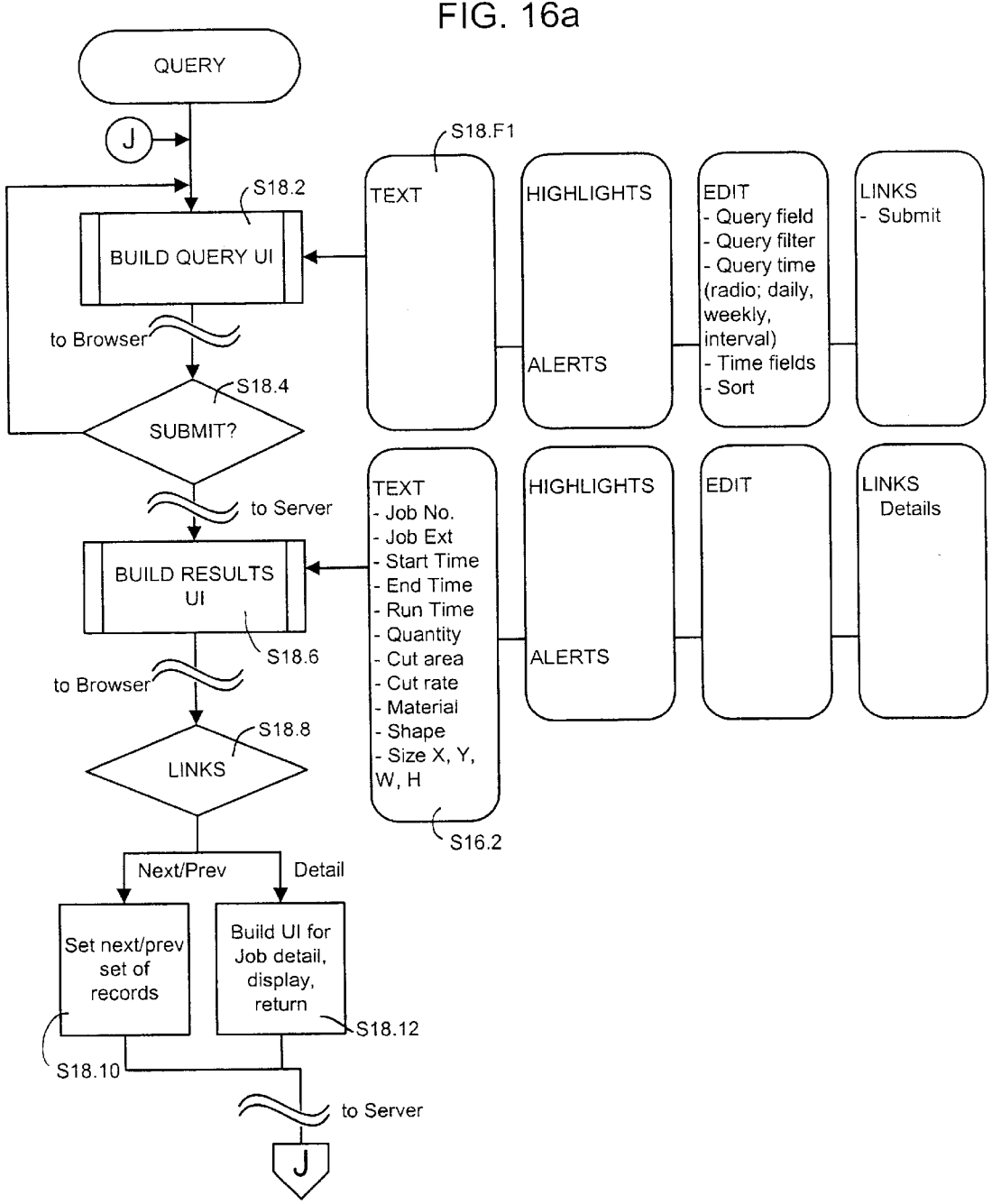
FIG. 16A is a flowchart showing process flow of a general query routine of the system.

FIG. 16A shows an exemplary flow for the process in which a query page is assembled and served to a requesting browser, and which creates links for further action. Examples of source ASP code and scripts that implement a suitable query interface and responsive structure, similar to that in FIGS. 16A through 16H, may be found in the Microfiche appendix, Appendix B, as summaryquery.asp; dosummaryquery.asp; jobdetail2.asp; bladequery.asp; dobladequery.asp; and blade_detail.asp.

In step S18.2, a build user interface (UI) routine, specifically for building a user interface for the query page, is executed. The "build UI" routine generally corresponds to the routines discussed later in the specification with reference to FIG. 7. After the "build UI" routine is complete, the completed file is served to a browser that interprets its content as a form having the denoted information.

Figure 16C:
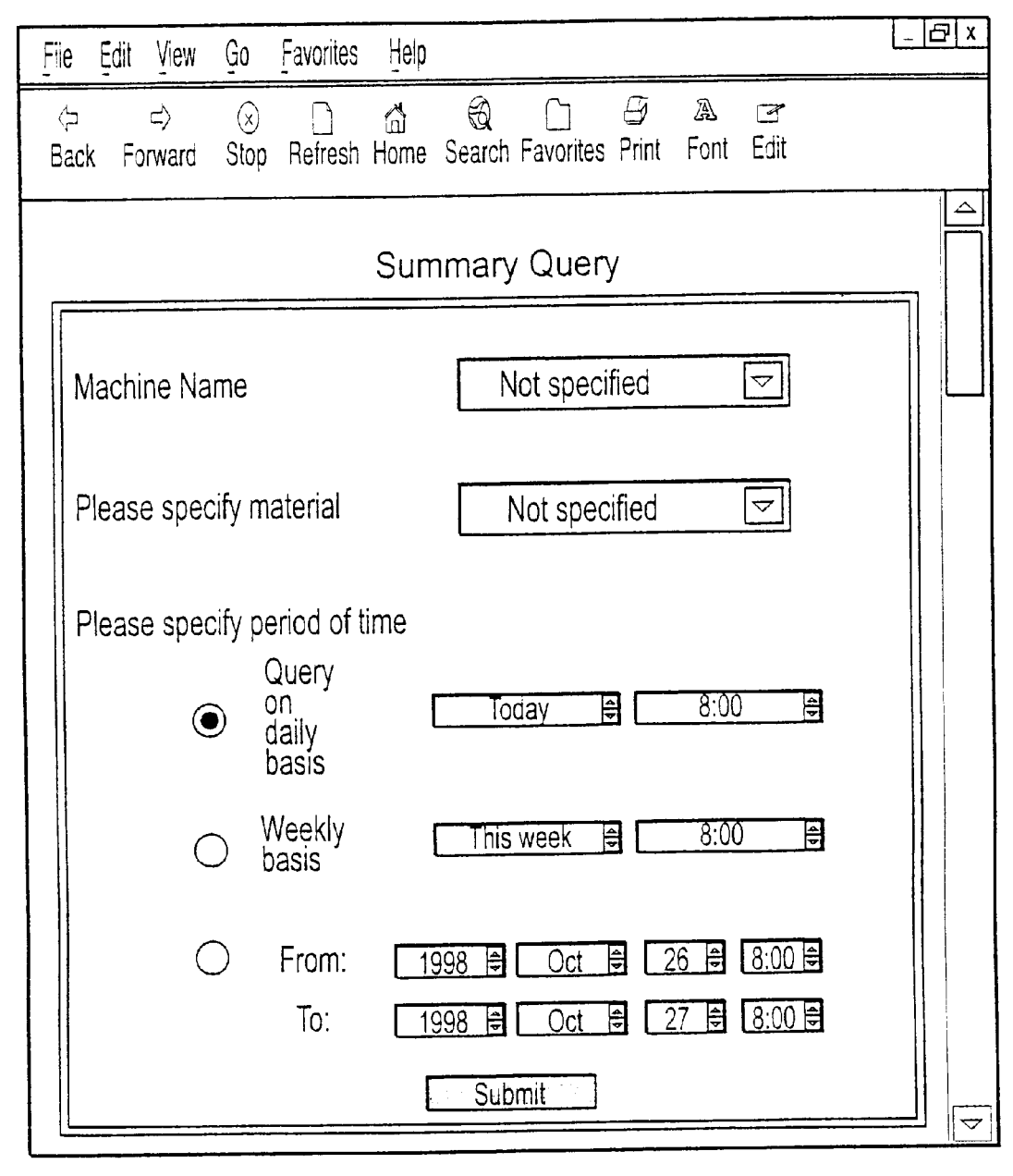

Queries may be performed-for any set of records, filter or condition in the database. For example, instead of a general query, in which any field and filter may be chosen, specific query pages may be provided for user, job, blade or machine. Examples of the appearance of suitable forms appears in FIGS. 16B, 16C, and 16G. For example, FIG. 16B shows a suitable form for a general query (keyed by any field), FIG. 16C shows a suitable form for a job summary query limited to Machine name and Material filters, and FIG. 16G shows a suitable form for a blade query limited to a Blade Type filter.

"Edit" fields are provided for Query fields (e.g., in the case of FIG. 16C, for Machine Name and Material), Sorting, Query filters (e.g., boolean or by condition), Query time (in this case, by daily basis, weekly basis, or arbitrary time), and Time fields as necessary (Day, Week, Time, Date, Year, etc.). For example, a "Sort" field may have a list of fields upon which a sort may be performed—in the case of FIG. 16B, a list of three fields (Material, Date, or Job. No.)—selectable. by "radio" button. Of course, the query page may be arranged to have multiple filters upon any field, e.g., multiple field conditions or values from which records are selected or excluded.

At least one hyperlink is provided, in this case, a Submit button that submits the query to the server (S18.4). When the results are submitted, the Web server sends the query in SQL syntax to the ODBC-compliant database server as described above.

When the Query results are returned from the database server and displayed, appropriate organization for the query results is provided. For example, when a query upon a Machine field is done on the Jobs table, selected records from the Job table (and other tables as necessary) are shown. FIG. 16D shows a results page for a query by Machine on the Jobs scheduled for that Machine, e.g., using a Job-specific query page such as that shown in FIG. 16C.

For example, with respect to FIGS. 16C and 16D, when a query is done for Jobs on a specific Machine, further filtered by specific material, is done, the query results are organized in a result UI according to Job_ID (S18.6). "Text" fields. corresponding to fields drawn from the Job and Job/Machine Usage tables, are provided for Job No. (Job_Number), Job Extension (Job_Extension), Start time (Job_Machine_Usage:Job_ID: Start_Time), End time (Job_Machine_Usage: Job_ID: End_Time), Run time (Job_Machine Usage: Job_ID: Run_Time), Quantity (Quantity), Cut area (Cutting_Area), Material (Material), Shape (Shape), and Sizes (Size_X, Y, W, H). Secondary values may be calculated therefrom, e.g., a cutting rate is calculated by dividing the cut area by the running time. Further, summations and averages: are provided for certain fields, as necessary. Exemplary summations for run time, quantity, and cutting area,. as well as an average for cutting rate, are shown in the results in FIG. 16D.

When the form is displayed at the receiving browser, several hyperlinks may be provided: "Next Page"/"Previous Page", and "Detail" for each record (S18.8).

If there are more records than may be displayed on a single page, the first page only includes, e.g., the first 20 records. If the "Next Page" or "Previous Page" link is activated (S18.10), records starting from the last record on the first page are designated, and the query results page is built and shown again using the same routines, except that the subsequent records are shown.

The Detail links, one for each record, are provided for the review of detailed information regarding the record. If the Detail link is activated (S18.12), a user interface permitting the review of details for the record is served, and further details extracted from the database. FIG. 16E shows a suitable page for reviewing details.

Figure 16F:
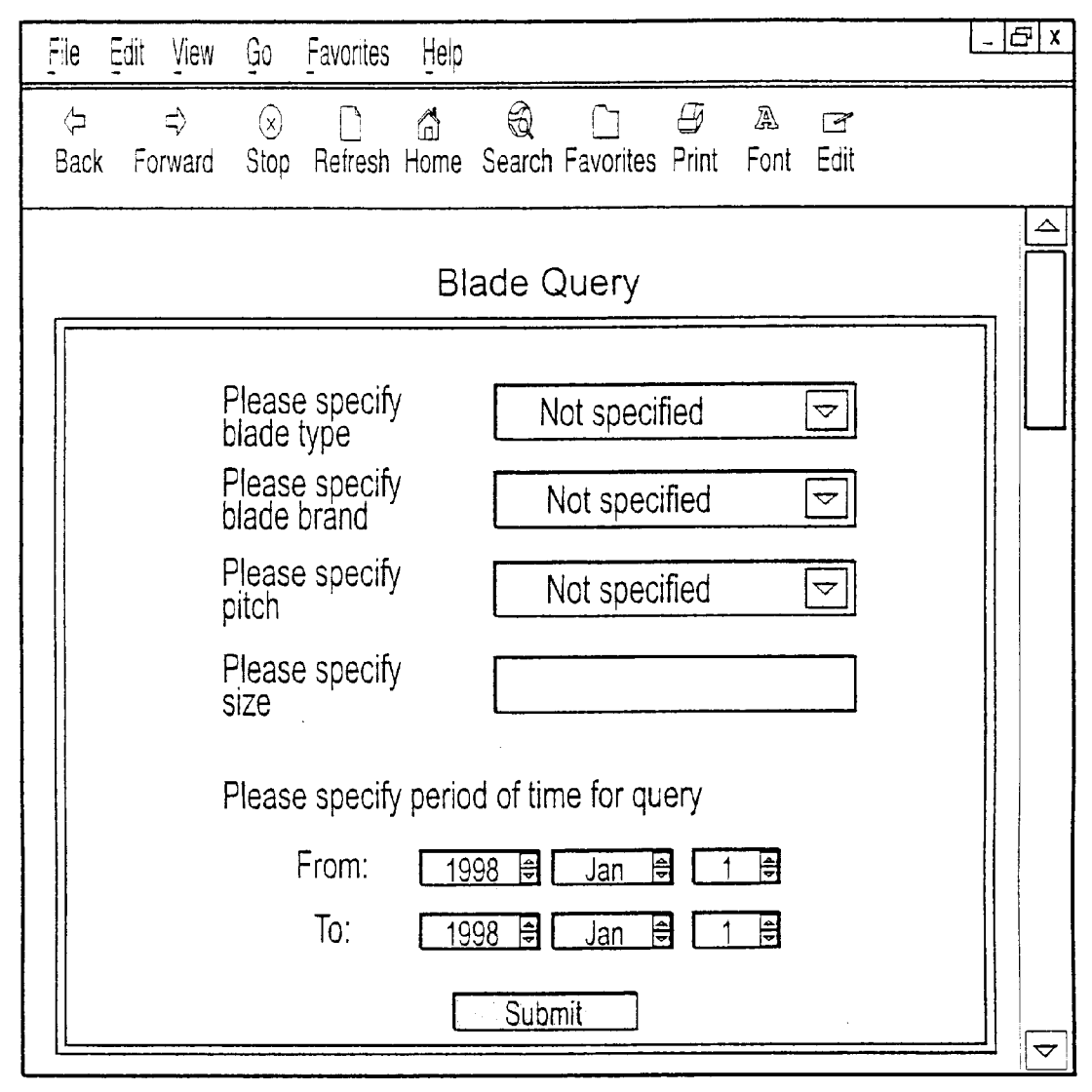
Figure 16H:
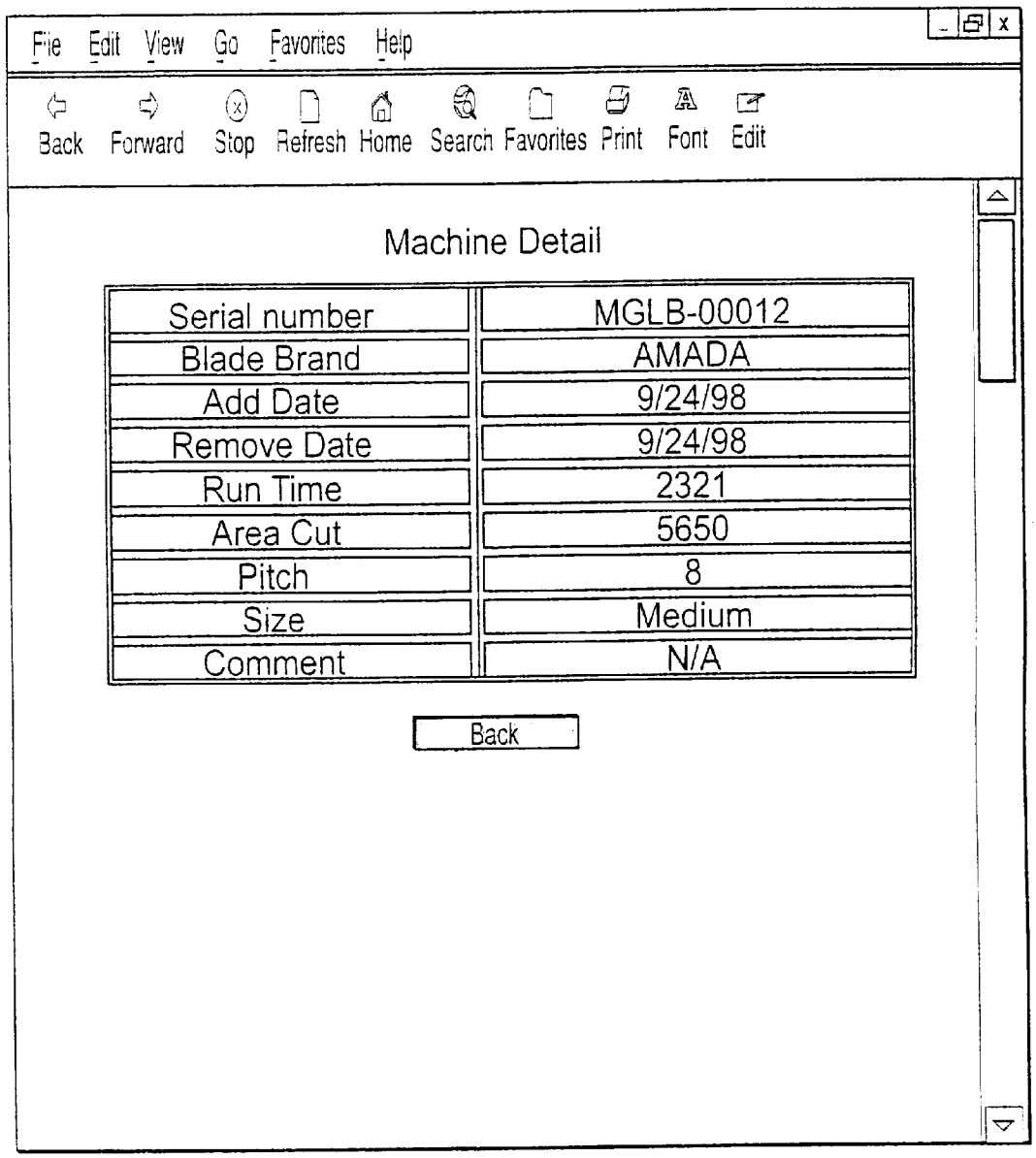
FIG. 16H shows an exemplary blade detail user interface generated as part of the interface of FIG. 16G.

As noted, FIG. 16F shows an example of a Blade-based query page with a Blade Type filter. This page is served using the routine of FIG. 16A, although all the fields appropriate for the input and output are not specifically shown in FIG. 16A. FIG. 16G shows an example of a Blade-based query result page corresponding to the query page of FIG. 16F and FIG. 16H shows an example of a Blade detail page that may be reached via the Blade-based query result page. The serving of the Blade-based query page, result page, and detail page are essentially similar to that of the general and/or Job summary query routines as discussed above, and exemplary fields of interest can be seen in the output pages.

Figure 17A:
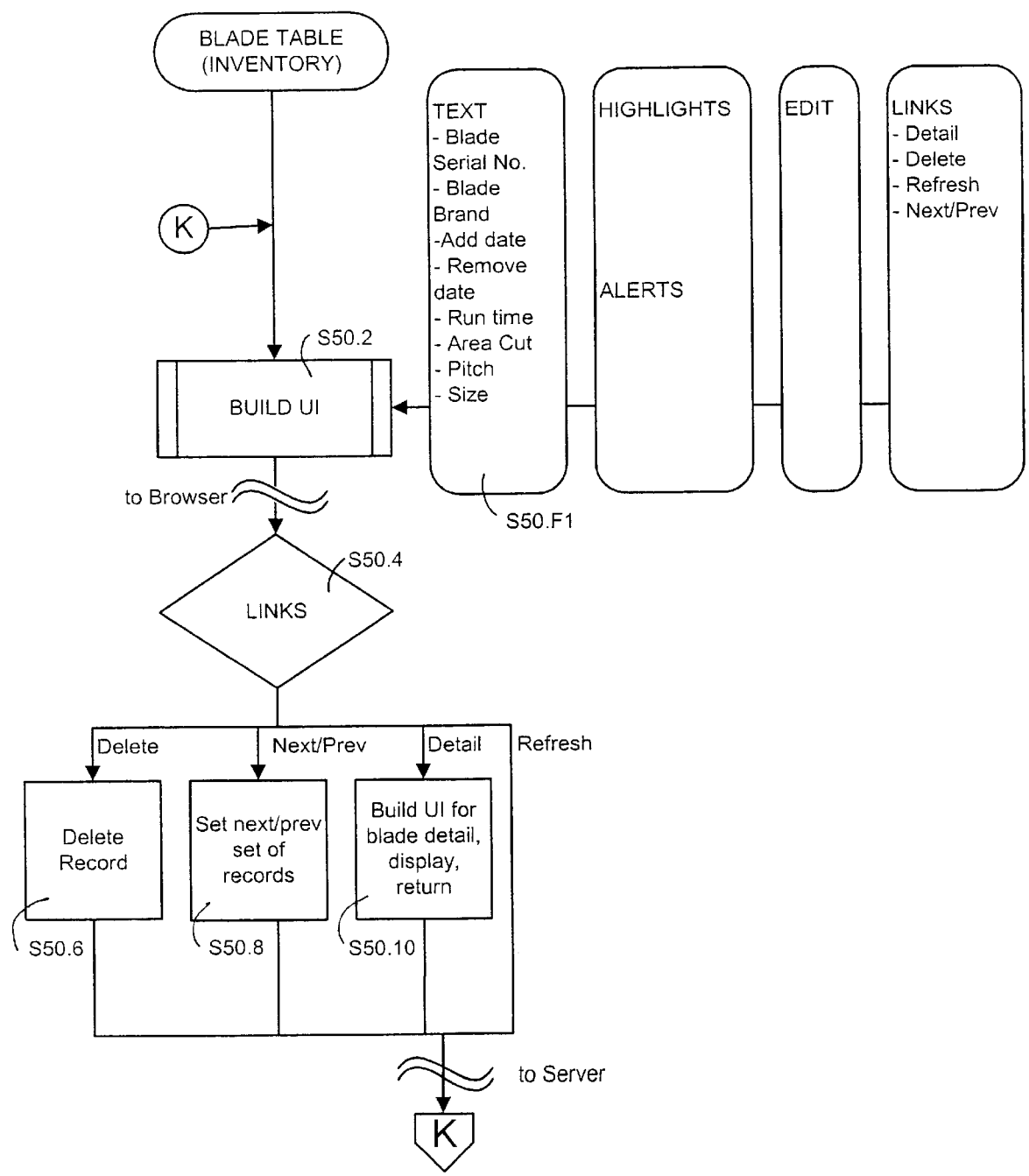
FIG. 17A is a flowchart showing process flow of a blade table routine of the system.

FIG. 17A shows an exemplary flow for the process in which a blade table (inventory) page is assembled and served to a requesting browser, and in which the Web server 11 creates links for further action. Examples of source ASP code and scripts that implement a suitable blade table interface and-responsive structure, similar to that in FIGS. 17A through 17C, may be found in the Microfiche appendix, Appendix B, as bladeinventory.asp; blade_maintenance.asp; blade_detail.asp; change_blade.asp; sd_change_blade.asp; edit_blade.asp; sd_edit_blade.asp; delete_blade.asp; new_blade_type.asp; edit_blade_type.asp; sd_edit_blade_type.asp; delete_blade_type.asp; new_blade_brand.asp; edit_blade_brand.asp; sd_edit_blade_brand.asp; and delete_blade_brand.asp.

In step S50.2, a build user interface (UI) routine, specifically for building a first page of user interface for the blade table, is executed. The "build UI" routine generally corresponds to the routines discussed earlier in the specification with reference to FIG. 7. After the "build UI" routine is complete, the completed file is served to a browser that interprets its content as a form having the denoted information. An example of the appearance of a suitable form appears in FIG. 17B.

"Text" fields are provided for, drawn from each Blade_ID record in the Blade table, Blade Serial No. (Serial_Number), Blade Brand (Blade_Brand), Add date (Add_Date), Remove date (Remove_Date), Run Time (Total_RunTime), Area Cut (Total_CutArea), Pitch (Pitch), and Size(Size).

When the form is displayed at the receiving browser, at least four hyperlinks are provided: "Detail", "Delete", "Refresh", and "Next" and/or "Previous Page" (S50.4). "Refresh" and "Next/Prev" (S50.8) links perform operations similar to those described previously.

Figure 17C:
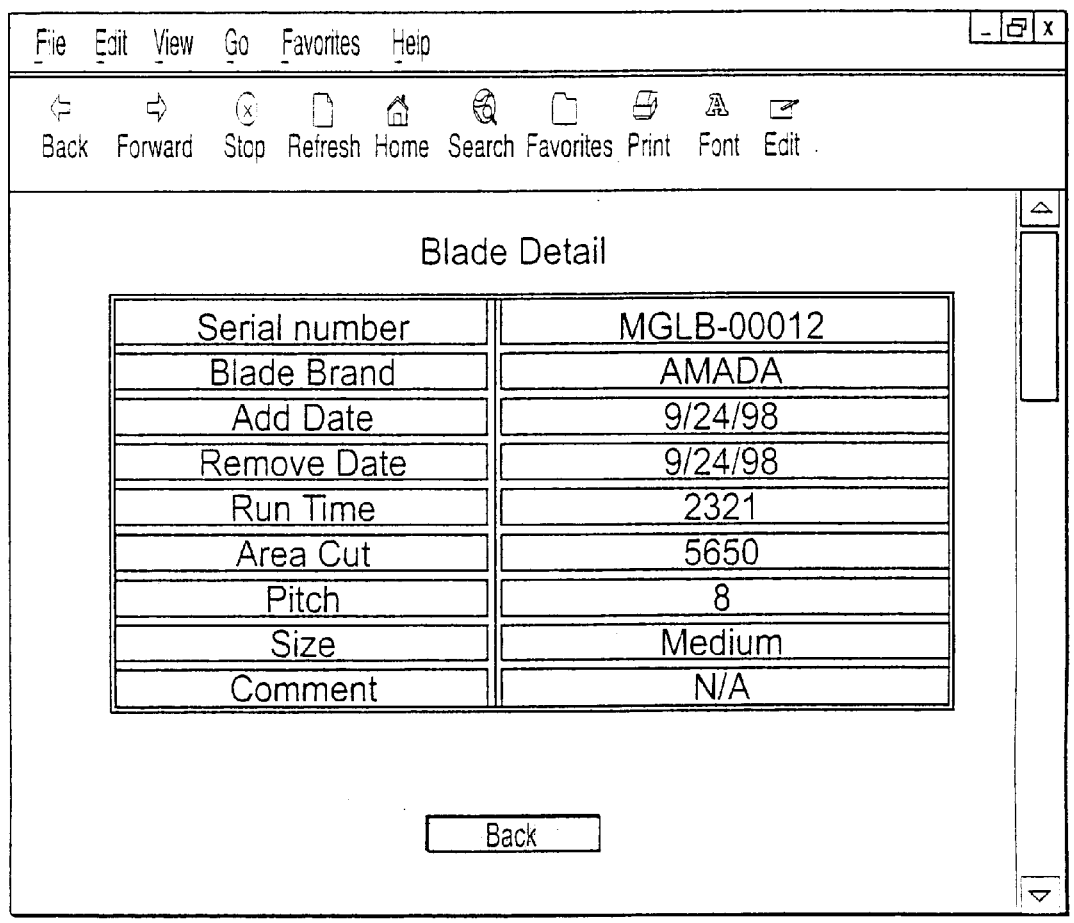
FIG. 17C shows an exemplary user interface generated by an blade detail routine of FIG. 17A.

The Detail link is provided for the review of Blade details from the source database. If the Detail link is activated (S50.10), a user interface permitting the review of the blade details is served according to the records in the Blade table (by Blade: Blade_ID). FIG. 17C shows a suitable form for showing the blade details.

If Delete is activated (S50.6) the corresponding (inline) blade record is deleted. The system may ask for confirmation (not shown).

Figure 18:
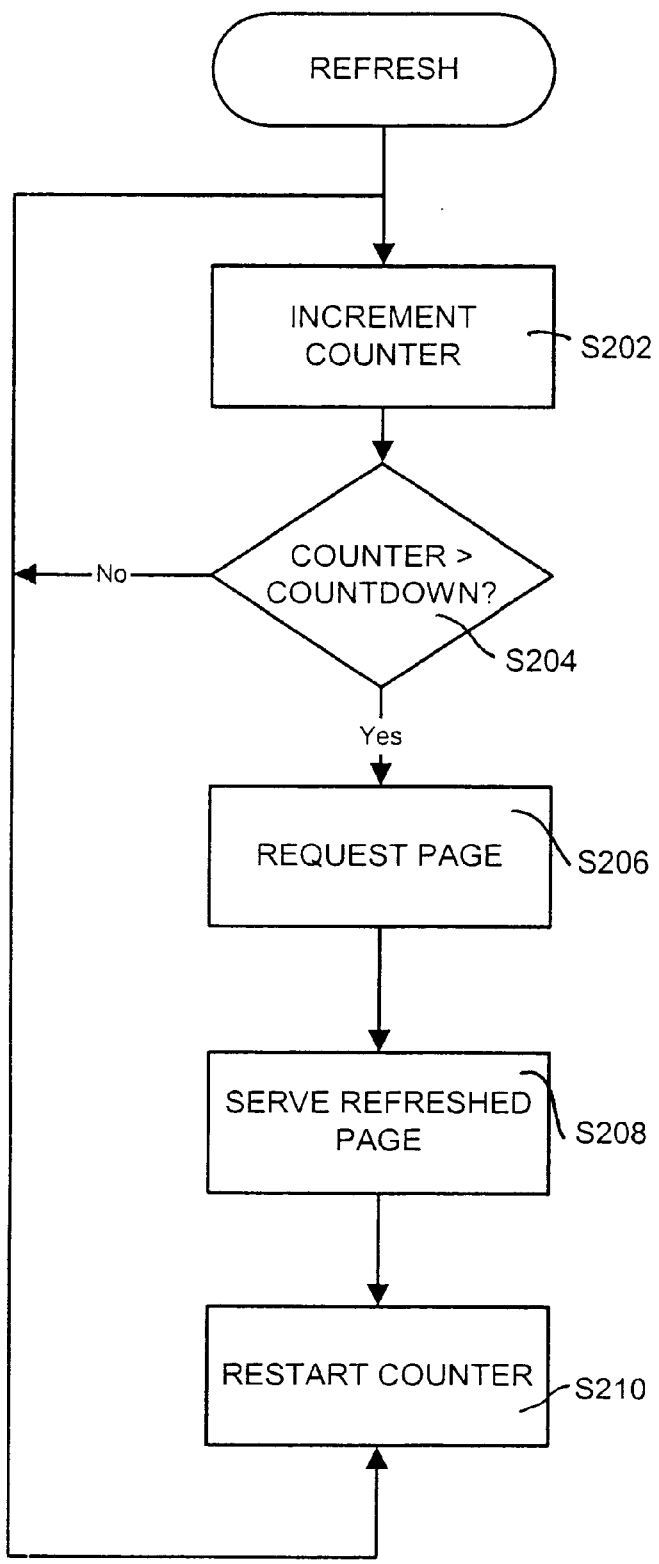
FIG. 18 is a flowchart showing process flow of an update or refresh routine of the system, which is run on an invisible frame at the client browser for certain served user interfaces.

FIG. 18 shows a routine for auto-refresh of a served user interface. This routine is served as an invisible frame (e.g., having display dimensions of negligible size or off-screen) along with designated user interfaces described above. In general, it is primarily useful with the schedule and monitor interfaces. Conventionally, browsers do not update displayed HTML pages until new action is taken by the user. By serving an invisible updating frame along with the schedule or monitor page, as long as these pages are displayed, the updating frame will periodically request a refreshed page from the Web server 1 . Examples of source ASP code and scripts that implement a suitable auto-refresh or update responsive structure, similar to that in FIG. 18, may be found in the Microfiche appendix, Appendix B, as machine_status_data.asp. In step S202, a counter is incremented. In step S204, the counter is checked to see if it reaches a countdown level (e.g., corresponding to 1 second, 10 seconds, etc.). When the counter reaches the assigned level, a request is sent from the browser to the Web server 11 for an refreshed page (S206). The Web server 7 follows the routines previously described, requesting updated information from either or both of the machine monitor component 7 or the DB server 13. The new page is served (S208), and the counter restarted (S210).

Accordingly, according to the present invention, the controlling software devices are components, distributed in nature, and can be placed on any convenient processor on a network. Each is provided with its own network address, or specific ports assigned thereto at a shared (IP) address, and the functionality of each component is executed without reference to its physical location on the network. In this manner, any component may be placed on the same processor with any other component, and such components thereby coexist via multitasking. Since each refers back to the network, the components communicate via their network addresses or ports, and not within the hosting processor or bus. If it becomes. necessary to redistribute the components to other processors, the components function exactly as before redistribution. Moreover, since the components are addressed as any other intranet or Internet device, the interconnecting network may share cabling and bandwidth with existing office or other networks. The virtual machine components handle the collection of data from cutting machines, while the machine monitor component collects the data from the virtual machine components. The machine monitor component creates and recreates the virtual machine components as necessary, e.g., addition of new virtual machines or subtraction of old virtual machines from the system parallels the addition of actual cutting machines to the system.

User interface interpreting and serving components are equally as portable, and a controlling user interface may therefore be accessed, viewed, and take user input wherever such tasks are most convenient. In this respect, since the user interface for each and every cutting machine is created at the same location (the user interface serving component or web server), such user interfaces may be centrally managed. If a new type of cutting machine is added, or one having more or less instrumentation, the user interface may be centrally changed and served according to the new demands. If new features and functions are added to the user interface at the serving component, they appear on the destination or client browsers instantly. The flexible user interface permits machines, jobs, materials, and cutting elements to be managed centrally, or from distributed locations in the facility or on the Internet at large.

In particular, cutting elements may be tracked for lifetime and for replacement reasons and other commentary data. Since the components at each cutting machine, in cooperation with the database accessible therefrom, track the usage (e.g., in hours or area cut) of any particular cutting element, when a cutting element is reused on the same or another machine, retired for any reason, or newly introduced into the database inventory, such records are automatically maintained for each and every blade. Alarms may be set on cutting element usage (or many other properties of interest), and when a cutting element is inappropriately used (e.g., past recommended lifetime), such information is brought to the attention of managers and operators via the flexible user interface. The user interface, since dynamically and centrally created, permits alarm information to be "attached" to almost any portion of the user interface—for example, a machine name, a job identification, etc. Accordingly, the alert or alarm information appears when relevant.

It should be noted that not all of the components, data tables and/or functions described in detail herein are necessary for a complete and functional expression of the invention. For example, the system may be used solely for management of cutting elements, or of machines, or of users, or of jobs, or any permutation or combination thereof. Further, the system may be used or configured solely for any of the discrete functions described herein, e.g., monitoring, querying, scheduling, job allocation, alarm setting, cutting element inventory control, etc. or any combination or permutation thereof. For example, no database is necessary for a monitoring-only embodiment, and no virtual machines are necessary for a scheduling-only embodiment. Still further, several embodiments of the distributed nature of the system are possible, with some or all components run by some or all processors in the networked embodiments—the distributed nature of the system resides in the different functions attributed to different and interacting components, and not necessarily to multiple processors at diverse locations (although this is true in at least one embodiment of the invention). No one or more of the preceding described elements is critical to the operation of the invention, except as explicitly described herein.

A portion of the disclosure of this patent document—in particular, Appendices A and B—contains material which is subject to copyright. protection. The copyright owner has no objection to the facsimile reproduction by anyone of the patent document or the patent disclosure, as it appears in the Patent and Trademark Office patent file records, but otherwise reserves all copyright rights whatsoever.

Although the above description sets forth particular embodiments of the present invention, modifications of the invention will be readily apparent to those skilled in the art, and the inventors expressly intend that the scope of the invention, as well as elements necessary for the invention to function, be determined solely by the appended claims. Changes may be made, within the purview of the appended claims, as originally submitted and as amended, without departing from the scope and spirit of the invention in its aspects. Although the invention has been described with reference to particular means, materials and embodiments, the inventors do not intend that the invention is to be limited to the particulars disclosed; rather, the. invention extends to all equivalent and/or insubstantially different structures, methods and uses such as are within the scope of the appended claims.

What is claimed is:

1. A system for management of cutting machines and allocation of jobs among the cutting machines, comprising:

a plurality of cutting machines, each cutting machine having a monitor input device through which monitor data indicating the status of the cutting machine is input;

a plurality of virtual machine components for collecting the monitor data, each virtual machine component corresponding to a cutting machine;

a database serving component for (i) communicating with a machine monitoring component, for (ii) recording and reading descriptive data including a machine table for describing the cutting machines and a job table describing jobs to be performed on the cutting machines, for (iii) associating the job table with the machine table, and for (iv) recording and reading usage data derived from the monitor data and descriptive data;

a machine monitoring component for retrieving the monitor data from all of the plurality of virtual machine component and for generating the usage data, said machine monitoring component providing the monitor data and usage data to the database serving component;

a user interface serving component for (i) communicating with the database serving component and the machine monitoring component, for (ii) serving dynamic interactive user interface elements containing portions of the usage data, monitor data and descriptive data, the content of said dynamic interactive user interface elements being different depending on the content of the usage data, monitor data and descriptive data; and at least one user interface interpreting component for displaying the dynamic interactive user interface elements.

2. The system according to claim 1, said system comprising a plurality of microprocessors connected via a network for running said components, each of said components hosted by one of said microprocessors, said components communicating with each other via a network transport layer of said network.

3. The system according to claim 1, wherein said descriptive data includes a cutting element table describing consumable cutting elements for the cutting machines, and wherein each of at least one job record and each of at least one machine record is selectively associated with a cutting element record, said machine monitoring component generating a cumulative running value for each cutting element record representative of the amount of use of a corresponding cutting element of the cutting machine.

4. The system according to claim 1, wherein said descriptive data includes a user table describing users of the system and operators of the cutting machine and wherein each of at least one job record and each of at least one machine record is selectively associated with an operator record.

5. The system according to claim 1, wherein said monitor data includes operating data representative of settings of each cutting machine.

6. The system according to claim 1, said monitor data including load detection data that indicate the operating load on the cutting machine.

7. The system according to claim 1, said monitor data including interlock detection data that indicate whether the cutting machine is capable of running or is locked and prevented from running.

8. The system according to claim 1, wherein each virtual machine component runs on a separate processor at the corresponding cutting machine.

9. The system according to claim 8, wherein the separate processor at the corresponding cutting machine further runs one of said at least one user interface interpreting components.

10. The system according to claim 8, wherein said monitor input device includes a data acquisition device for acquiring data connected to a plurality of detectors on the cutting machine, each data acquisition device being controlled by the corresponding separate processor.

11. The system according to claim 1, wherein the database serving component and user interface serving component are run on a same processor.

12. The system according to claim 11, wherein said same processor further runs the machine monitor component.

13. The system according to claim 1, wherein machine monitor component generates said virtual machines according to said machine table for describing the cutting machines.

14. The system according to claim 1, wherein each of said plurality of virtual machine components, said machine monitoring component, said database serving component, said user interface serving component, and said at least one user interface interpreting component has an identity, and wherein communication in said system is addressed according to said identity independently of location.

15. The system according to claim 14, wherein, in response to a request from said user interface interpreting component, said user interface serving component retrieves said monitor data from said machine monitor component and serves a monitoring user interface including said monitor data to said user interface interpreting component.

16. The system according to claim 14, wherein, in response to a conditioned query from said user interface interpreting component, said user interface serving component communicates with said database serving component, said database serving component sends records complying with said conditioned query to said user interface serving component, and said user interface serving component serves a result user interface including said complying records to said user interface interpreting component.

17. The system according to claim 1, wherein when a job record in the job table and a machine record in the machine table correspond, said user interface serving component generates a job usage record in a job usage table indicating a paired cutting machine and record.

18. The system according to claim 1, wherein said database further includes an alert table specifying alert conditions in said job table and said machine table, and whenever said user interface serving component serves a user interface to said at least one user interface interpreting component, said user interface serving component checks said alert table and attaches an alert indicator to specified records in said job table and said machine table meeting said alert conditions, said user interface interpreting component interpreting said alert indicator.

19. A cutting machine management network system, comprising:
  a variable number of instrumented cutting machines, each cutting machine including a processor with a virtual machine component that scans instrumentation on the cutting machine and maintains status information representative of the status of the instrumentation;
  a database server that maintains a database of descriptive information describing the instrumented cutting machines and that is responsive to queries;
  a machine monitor networked to each instrumented cutting machine, the machine monitor including a processor with a machine monitor component that scans the virtual machine components and maintains a status array including the status information from each virtual machine component;
  a web server for processing requests from distributed clients and serving hypertext documents;
  a dynamic content server for interpreting dynamic content markup documents including code segments, said dynamic content server querying the database server to retrieve the descriptive information, retrieving the status array from the machine monitor, and generating hypertext documents in response to requests from the distributed clients and internal interpretation of said code segments, wherein said hypertext documents include differing user interaction elements and displayed information depending on the content of the descriptive information and the status array.

20. A cutting machine management network system, comprising:
  a plurality of replaceable cutting elements for shaping workpieces;
  a variable number of cutting machines in which a cutting element may be installed to shape workpieces, each cutting machine associated with a processor having a virtual machine component that scans at least cutting element status on the cutting machine and maintains status information representative of the status of the cutting elements;
  a database server that maintains a database of information describing a plurality of instrumented cutting machines, that stores usage information for each cutting element, and that is responsive to queries;

a machine monitor networked to each cutting machine, the machine monitor including a processor with a machine monitor component that scans the virtual machine components, maintains a status array including the cutting element status from each virtual machine component, and generates said usage information depending on the status array;

a user interface serving component for communicating with the database server and the machine monitor, for serving interactive user interface elements containing the cutting element usage information; and at least one user interface interpreting component for displaying the user interface elements.

21. A cutting machine management network system, comprising:

an internet protocol network;

a plurality of instrumented cutting machines;

a plurality of machine-representative processors, each having a processor unit and at least one programmed component interpreted by the processor unit, each programmed component representing one of the instrumented cutting machines and communicating with instrumentation on the represented instrumented cutting machine, each programmed component having an addressable identity within the internet protocol network corresponding to the represented instrumented cutting machine;

at least one interface displaying station that receives local input of user access level information from a user that identifies an access level of the user, transmits within the internet protocol network requests that differ according to said user access level information and that request information descriptive of the represented instrumented cutting machines, and displays interfaces received from the internet protocol network;

a dynamic content server that receives said information descriptive of the represented instrumented cutting machines from the programmed components via the internet protocol network, and that serves, via the internet protocol network, privileged information to the interface displaying stations, said privileged information being a portion of said information descriptive of the represented instrumented cutting machines, the content of said portion depending on the content of the user access level information.

22. The cutting machine management network system according to claim 21, wherein said content of said privileged information includes at least: machine programming information content corresponding to an operator user access level; and job allocation information content corresponding to an administrative user access level.

23. The cutting machine management network system according to claim 21, wherein each interface displaying station is associated with and is located next to at least one of the represented instrumented cutting machines.

24. The cutting machine management network system according to claim 21, wherein said dynamic content server serves to the internet protocol network said privileged information including job allocation information content corresponding to an administrative user access level to an interface displaying station located next to and associated with an instrumented cutting machine when administrator user access level information is locally input to the interface displaying station located next to and associated with the instrumented cutting machine.

25. The cutting machine management network system according to claim 21, wherein said dynamic content server serves to the internet protocol network said privileged information including job allocation information content corresponding to an administrative user access level, and permits editing of said job allocation information content at said interface displaying station only when administrator user access level information is input.

26. A system for monitoring of cutting machines, comprising:

an internet protocol network;

a plurality of instrumented cutting machines;

a plurality of machine-representative processors, each having a processor unit and at least one programmed component interpreted by the processor unit, each programmed component representing an instrumented cutting machine and communicating with instrumentation on the represented instrumented cutting machine, each programmed component having an addressable identity on the internet protocol network corresponding to the represented instrumented cutting machine;

a database serving component that (i) communicates within the internet protocol network with the programmed components and that (ii) records and reads descriptive data including an alarm table specifying alarm conditions of said instrumentation of said plurality of instrumented cutting machines;

an alarm checking component, having access to the internet protocol network, that evaluates when the alarm conditions of the instrumentation of said plurality of cutting machines are satisfied;

a user interface serving component that (i) communicates with the database serving component within the internet protocol network, that (ii) serves, within the internet protocol network, an interface containing an alert indicator when an alarm condition is satisfied according to the alarm checking component; and at least one interface displaying station that receives the interface containing the alert indicator from the internet protocol network and displays the interface containing the alert indicator.

27. A system for monitoring of cutting machines, comprising:

an internet protocol network;

a plurality of instrumented cutting machines including instrumentation that detect alarm conditions of consumable material levels, said consumable material levels including at least one of a fluid level and a raw material level;

a plurality of machine-representative processors, each having a processor unit and at least one programmed component interpreted by the processor unit, each programmed component representing an instrumented cutting machine and communicating with instrumentation on the represented instrumented cutting machine, each programmed component having an addressable identity on the internet protocol network corresponding to the represented instrumented cutting machine;

a consumable monitoring system that communicates, within the internet protocol network, with a machine monitoring component, said consumable monitoring system including an alarm checking component that evaluates when the alarm conditions of the consumable material levels of the instrumentation of said plurality of instrumented cutting machines are satisfied; and an alert display instruction serving component, having access to the internet protocol network, that (i) communicates, within the internet protocol network, with the alarm checking component and that (ii) serves, within the internet protocol network, an alert display instruction when an alarm condition is satisfied; and at least one interface displaying station that receives, from the internet protocol network, the alert display instruction and that displays a consumable status alert indicator corresponding to the alert display instruction.

28. A cutting machine management network system, comprising:

an internet protocol network;

a plurality of instrumented cutting machines;

a plurality of machine-representative processors, each having a processor unit and at least one programmed component interpreted by the processor unit, each programmed component representing an instrumented cutting machine and communicating with instrumentation on the represented instrumented cutting machine to obtain status information, each programmed component having an addressable identity on the internet protocol network corresponding to the represented instrumented cutting machine;

a database server that maintains a database of information describing the instrumented cutting machines, and that stores usage information for each instrumented cutting machine according to said obtained status information; and a machine monitor networked via the internet protocol network to each machine-representative processor, the machine monitor including a processor with a machine monitor component that receives status information from the machine-representative processors and provides said status information for each instrumented cutting machine to said database server, each programmed component being a standalone component, independent of remaining components of said network system, that stores said status information until communication with said machine monitor is permitted.

29. The cutting machine management network system according to claim 28, wherein said plurality of instrumented cutting machines each operating together with a selected cutting element from an inventory of a plurality of cutting elements, and wherein said machine monitor receives cutting element status information from the machine-representative processors and provides said cutting element status information for each instrumented cutting machine to said database server, and said database server stores usage information derived from said received cutting element status information for each cutting element in said inventory of the plurality of cutting elements according to said received cutting element status information.

30. A cutting machine and cutting element management network system, comprising:

an internet protocol network;

a plurality of instrumented cutting machines that each operate together with a selected cutting element from an inventory of a plurality of cutting elements;

a plurality of machine-representative processors, each having a processor unit and at least one programmed component interpreted by the processor unit, each programmed component representing an instrumented cutting machine and communicating with instrumentation on the represented instrumented cutting machine, each programmed component having an addressable identity on the internet protocol network corresponding to the represented instrumented cutting machine;

a database server that maintains a database of information describing the instrumented cutting machines; and a machine monitor networked via the internet protocol network to all of the machine-representative processors, the machine monitor including a processor with a machine monitor component that receives machine status information and cutting element status information from the machine-representative processors and provides said machine status information and cutting element status information for each instrumented cutting machine to said database server, said database server storing usage information for each instrumented cutting machine and for each cutting element in said inventory of the plurality of cutting elements according to said received machine status information and said received cutting element status information.

31. A cutting machine management network system, comprising:

a local internet protocol network connected to the Internet;

a plurality of instrumented cutting machines;

a plurality of machine-representative processors, each having a processor unit and at least one programmed component interpreted by the processor unit that represents an instrumented cutting machine and communicates with instrumentation on the represented instrumented cutting machine, each programmed component having an identity on the local internet protocol network corresponding to the represented instrumented cutting machine;

a plurality of facility browser stations on said local internet protocol network, each facility browser station including an interface displaying component that receives an interface from the local internet protocol network and displays the interface together with an access level input component that receives input of user access level information from a user at the facility browser station; and a user interface serving component that (i) associates a selected programmed component that represents a selected instrumented cutting machine with a logged-in facility browser station on said local internet protocol network and that (ii) serves to said logged-in facility browser station, within the internet protocol network, an interface containing information representative of said selected programmed component that represents a selected instrumented cutting machine, said local internet protocol network receiving requests for extra-facility on-line information relating to said selected instrumented cutting machine from said logged-in facility browser station and forwarding the extra-facility request for on-line information to a designated station on the Internet.

32. The cutting machine management network system according to claim 31, said local internet protocol network receiving requests for information relating to said selected instrumented cutting machine from an extra-facility station on the Internet and returning requested information.

33. The cutting machine management network system according to claim 32, further comprising a web server component connected to the local internet protocol network and to the Internet that mediates interface presentation of said interface between the local internet protocol network and the Internet, wherein user access level information, and wherein said web server receives user access level information from within said local internet protocol network and from the Internet, and controls whether or not information is returned in response to at least one of (i) said requests for extra-facility on-line information from said logged-in facility browser station according to said user access level information input at said logged-in facility browser station and (ii) said requests for information relating to said selected instrumented cutting machine from said extra-facility station on the Internet according to user access level information input at said extra-facility station on the Internet.

34. A method for managing cutting machines in a network system, comprising:

representing an instrumented cutting machine by at least one programmed component interpreted by a processor unit, each programmed component having an addressable identity within an internet protocol network corresponding to the represented instrumented cutting machine;

communicating between instrumentation on a represented instrumented cutting machine and said at least one programmed component;

receiving, at a dynamic content server, information descriptive of the cutting machines from the programmed components via the internet protocol network;

receiving, at an interface displaying station, local input of user access level information from a user that identifies an access level of the user;

transmitting from the interface displaying station, within the internet protocol network, requests that differ according to said user access level information and that request information descriptive of the represented cutting machines;

serving, from the dynamic content server, and via the internet protocol network, privileged information to the interface displaying stations, said privileged information being a portion of said information descriptive of the represented cutting machines, the content of said portion depending on the content of the user access level information; and displaying, at the interface displaying station, interfaces received from the internet protocol network.

* * * * *